(12) United States Patent
Choi et al.

(10) Patent No.: US 10,521,566 B2
(45) Date of Patent: Dec. 31, 2019

(54) METHOD AND APPARATUS OF DRM SYSTEMS FOR PROTECTING ENTERPRISE CONFIDENTIALITY

(71) Applicant: MARKANY INC., Seoul (KR)

(72) Inventors: Jonguk Choi, Seoul (KR); Yongjin Lee, Seoul (KR)

(73) Assignee: MARKANY INC., Seoul (KR)

( * ) Notice: Subject to any disclaimer, the term of this patent is extended or adjusted under 35 U.S.C. 154(b) by 239 days.

(21) Appl. No.: 15/593,249

(22) Filed: May 11, 2017

(65) Prior Publication Data

US 2017/0329937 A1    Nov. 16, 2017

Related U.S. Application Data

(60) Provisional application No. 62/335,660, filed on May 12, 2016, provisional application No. 62/367,644, filed on Jul. 27, 2016, provisional application No. 62/368,145, filed on Jul. 28, 2016, provisional application No. 62/372,320, filed on Aug. 9, 2016.

(51) Int. Cl.
| | |
|---|---|
| *G06F 21/10* | (2013.01) |
| *H04L 29/06* | (2006.01) |
| *G06T 1/00* | (2006.01) |
| *H04L 9/08* | (2006.01) |

(Continued)

(52) U.S. Cl.
CPC .............. *G06F 21/10* (2013.01); *G06F 21/16* (2013.01); *G06F 21/602* (2013.01); *G06T 1/005* (2013.01); *H04L 9/088* (2013.01); *H04L 63/0428* (2013.01); *H04L 63/10* (2013.01); *G06F 2221/0733* (2013.01); *G06F 2221/0737* (2013.01); *G06T 1/0021* (2013.01); *G06T 2201/0051* (2013.01); *G06T 2201/0052* (2013.01); *G06T 2201/0062* (2013.01); *G06T 2201/0064* (2013.01); *H04L 2209/127* (2013.01); *H04L 2209/603* (2013.01); *H04L 2209/608* (2013.01)

(58) Field of Classification Search
CPC .................................................. H04L 2209/603; H04L 63/0428; G06F 21/10
USPC ....................................................... 713/165
See application file for complete search history.

(56) References Cited

U.S. PATENT DOCUMENTS

| | | | | |
|---|---|---|---|---|
| 2010/0299759 | A1* | 11/2010 | Kim | ......................... G06F 21/10 726/28 |
| 2012/0124675 | A1* | 5/2012 | Lee | ......................... G06F 21/10 726/28 |
| 2013/0080268 | A1* | 3/2013 | Gordon | .................. G06Q 30/02 705/14.73 |

* cited by examiner

*Primary Examiner* — Teshome Hailu
(74) *Attorney, Agent, or Firm* — Envision USA Inc.

(57) ABSTRACT

One aspect of the present invention discloses a client device for content security. The device includes: an application execution unit configured to control content in response to a content control command requested in a user level; a DRM agent configured to communicate with a DRM server and the application execution unit in the user level, to detect the content control command, to receive an encryption/decryption key and security policy for content from the DRM server, to provide the received encryption/decryption key and security policy to a client kernel module, and to transmit an encryption/decryption request; and the client kernel module configured to receive the encryption/decryption key and the security policy, to store the encryption/decryption key and security policy in a secure box of a kernel level, and to perform encryption or decryption on the content based on the encryption/decryption key and security policy in response to the encryption/decryption request.

18 Claims, 55 Drawing Sheets

(51) Int. Cl.
*G06F 21/16* (2013.01)
*G06F 21/60* (2013.01)

FIG. 2
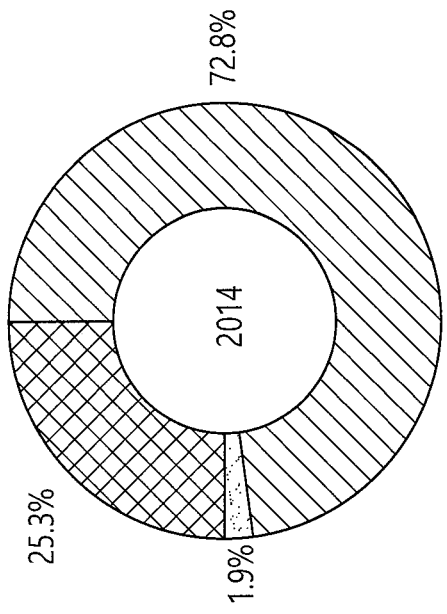
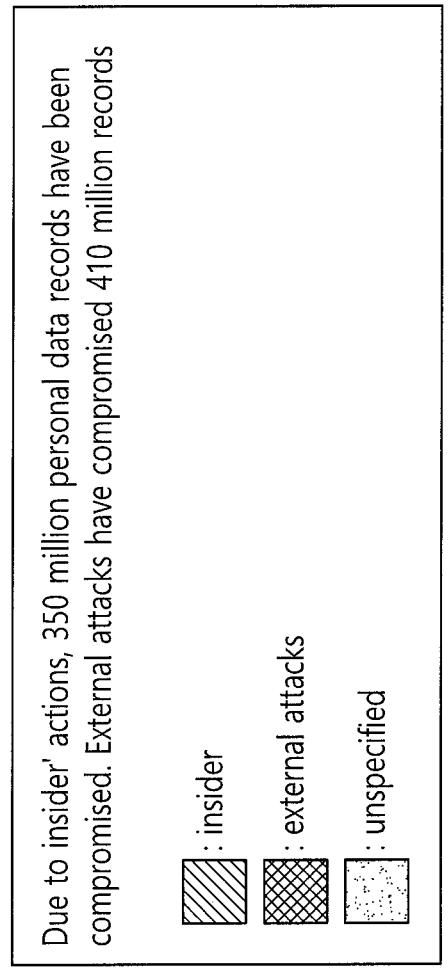
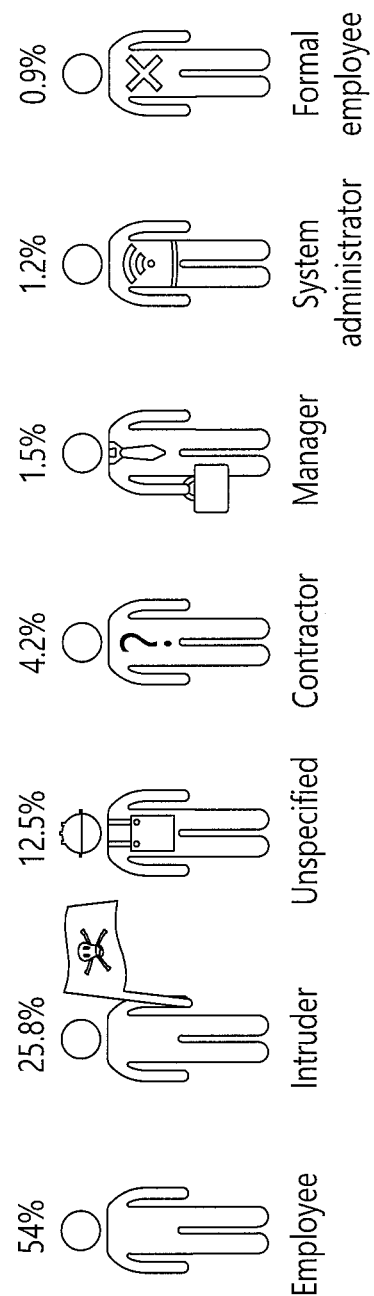

FIG. 3

Incident patterns by industry minimum 25 incidents (only confirmed data breaches)

| | Crimeware | Cyber espionage | Denial of Service | Everything Else | Stolen Assets | Misc. Errors | Card Skimmers | Point of Sale | Privilege Misuse | Web Apps |
|---|---|---|---|---|---|---|---|---|---|---|
| Accommodation (72), n=282 | | | | 1% | <1% | 1% | <1% | 95% | 1% | 1% |
| Educational (61), n=29 | | 7% | | 17% | 17% | 27% | | | 3% | 30% |
| Entertainment (71), n=38 | | | | | | | | 47% | | 50% |
| Finance (52), n=795 | 1% | <1% | <1% | 2% | <1% | 2% | 9% | | 4% | 82% |
| Healthcare (62), n=115 | 3% | 3% | | 11% | 19% | 22% | | 7% | 32% | 3% |
| Information (51), n=194 | 1% | 3% | | 4% | | 25% | | 1% | 11% | 57% |
| Manufacturing (31-33), n=37 | 3% | 47% | | 3% | | | | 3% | 24% | 21% |
| Professional (54), n=53 | 4% | 19% | | 25% | 4% | 15% | | | 21% | 13% |
| Public (29), n=193 | 12% | 16% | | 4% | 9% | 37% | | | 13% | 9% |

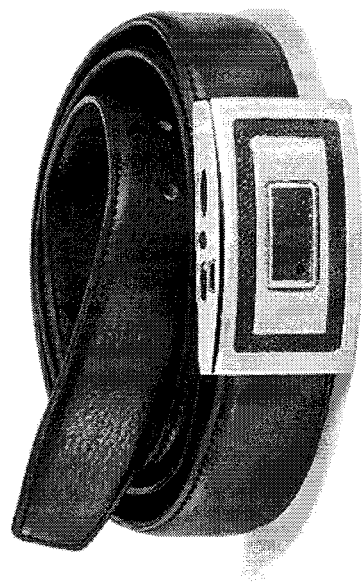
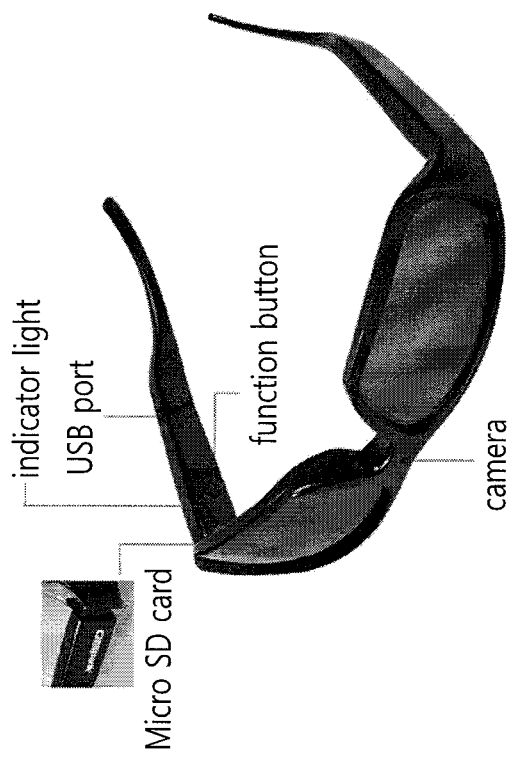
FIG. 4A

FIG. 20

The rapid progress of Internet technology and large development of computer networks makes copying and wide spreading of important information easy. Digital data could be intercepted, modified. In addition, fakery and forgery data can be used as a device of bad purpose. Therefore, securities of data using through the internet is considerable.

With MarkAny ePageSAFER, eGovernment could provide official papers through the internet. ePageSAFER puts a 2D barcode onto official papers with whole contents of the E-document and eSignature of the provider. 2D barcode is used when the papers from Internet were verified they are the original or not. MarkAny supports verification software and it is very easy to use.

Embedded User ID=GG NOH

The rapid progress of Internet technology and large development of computer networks makes copying and wide spreading of important information easy. Digital data could be intercepted, modified. In addition, fakery and forgery data can be used as a device of bad purpose. Therefore, securities of data using through the internet is considerable.

With MarkAny ePageSAFER, eGovernment could provide official papers through the internet. ePageSAFER puts a 2D barcode onto official papers with whole contents of the E-document and eSignature of the provider. 2D barcode is used when the papers from Internet were verified they are the original or not. MarkAny supports verification software and it is very easy to use.

Embedded User ID=DY LEE

FIG. 25

FIG. 26
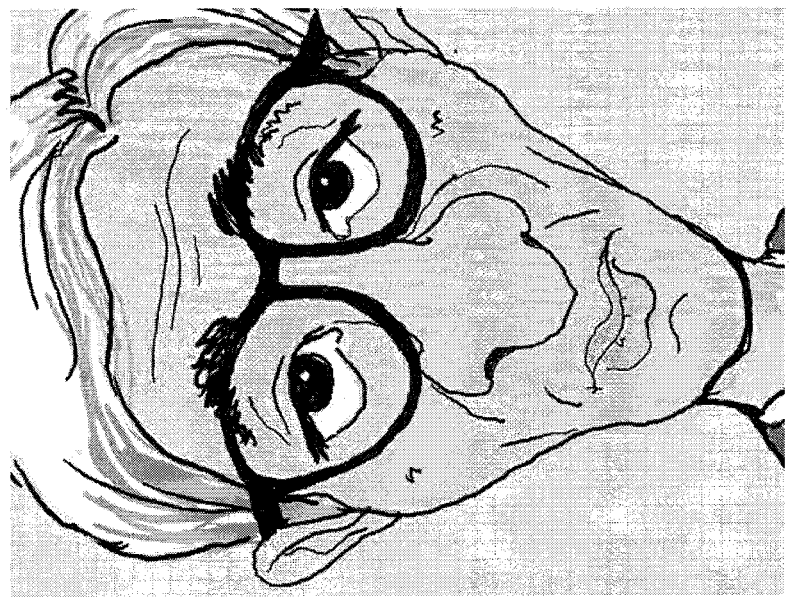
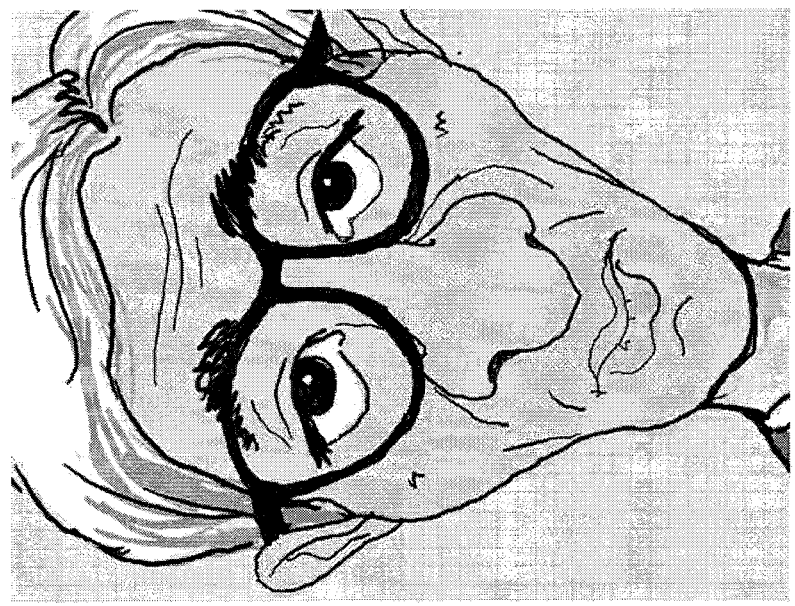

FIG. 29A

Original Text

Watermarked Text

Original Image

Watermarked Image
(IP, user ID, etc.)

FIG. 29B
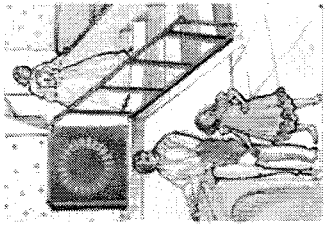
Watermarked Image
(IP, user ID, etc.)
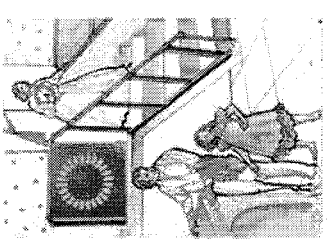
Original Image

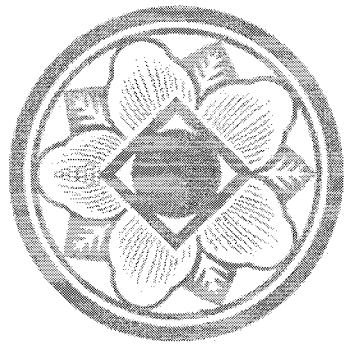
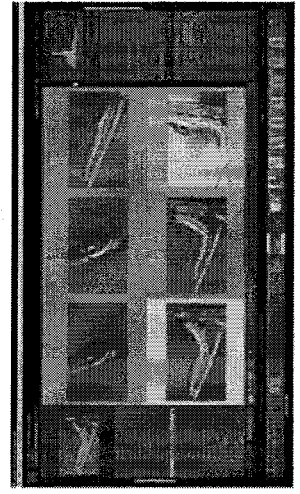
FIG. 36D ial Application Ser. No. 62/335,660, filed May 12, 2016, U.S.
METHOD AND APPARATUS OF DRM SYSTEMS FOR PROTECTING ENTERPRISE CONFIDENTIALITY

CROSS-REFERENCE TO RELATED APPLICATIONS

This application claims the benefit of U.S. Provisional Application Ser. No. 62/335,660, filed May 12, 2016, U.S. Provisional Application Ser. No. 62/367,644, filed Jul. 27, 2016, U.S. Provisional Application Ser. No. 62/368,145, filed Jul. 28, 2016 and U.S. Provisional Application Ser. No. 62/372,320, filed Aug. 9, 2016.

BACKGROUND OF THE INVENTION

Field of the Invention

The present invention relates to a content security system, and more particularly, to a DRM system for protecting enterprise confidentiality.

Discussion of the Related Art

Since commercial computer systems, such as IBM mainframe computer or DEC PDP minicomputer, came in the market in 1960s and 1970s, definition of computing devices has been continuously extended to include various autonomous machines. If Merriam Webster's definition of the computer as 'an electronic machine that can store and work with large amounts of information' is applied, many devices currently available in market can be categorized into computing devices. For example, even if driverless car, smart refrigerator, smart TV, drone, printing machine, smart phone, or ATM machine do not have features of commercial 'computer' requiring input of human being's data feeding and screen display, they can be classified as computer or computing devices.

Because of an advent of those machines classified as 'computer' and mobile computing environment, office works performed in a secluded cubicles, office building, or R&D labs, have moved into various different spaces and locations which have not classified as 'official working place' just 20 years ago. Popular availability of mobile work and VPN technology have sent already many office workers to home offices and then will let them work in driverless automobiles. In Silicon Valley or other areas well lined with start-up enterprises, the scene is very popular that many office workers are on their work with computers and smart phones in cafeteria or restaurants. The office works are moving from office building to home, restaurant, cafeteria, and driverless cars in the future. Also, with advent of 3D printing technology the manufacturing factories are moving into a small and narrow space from a huge factory building including design lab, casting room, foundry processing, and many long assembly lines. If anyone gets a design data, such as a 3D stl file, he or she can easily print or manufacture the same product, even if he or she does not know anything of the product design and even manufacturing.

In late 1990s, digital right management (DRM) technology appeared to protect copyright of digital content which was traded through portable storage medium, a floppy disk, a CD, a DVD and limited on-line distribution later. In order to protect copyright of digital content, mainly digital music at that time, encryption technology was adapted. Even if DRM technology was very effective in preventing illegal distribution of on-line digital content, appearance of various P2P sites, such as Napster, Gnutella, Gossip, Kazaa, SoriBada, and e-Donkey, made DRM technology less productive. In early 2000s, some efforts to utilize encryption component of DRM technology in protecting enterprise confidentiality were made, in the name of Enterprise DRM (E-DRM). Enterprise DRM applied encryption component to prevent illegal copy and distribution of confidential information, and then added application) control component for preventing un-allowed printing, modification, transfer, editing, or others. In other words, enterprise DRM (E-DRM) vendors proposed encryption mechanism and access control for protecting intellectual properties of enterprise. Enterprise DRM technology extended scope of access control of traditional DRM technology to include various control, not only function of 'display', but also 'print', 'edit', 'retention period', and 'transfer to the third party' etc.

E-DRM technology not only extended list of controlling application programs, but also moved focus of DRM technology, from encryption to access control. In preventing illegal copy and distribution of digital content, such as digital music, in the late 1990s and early 2000s, the required thing for DRM system was encryption with a limited control of 'play'. However, E-DRM technology had to control various functions already provided by various application programs. In other words, in contrast to simple function provided by a MP3 player or a CD player, various editing functions were already provided by application programs installed at desktop computer and lap-top computer at office, and therefore it should be controlled to prevent illegal editing and mailing function. In the beginning stage, E-DRM technology which can control various functions of application programs was a surprise to media. For example, enterprise DRM technology was praised as the following: "E-DRM's granular policy controls are impressive. In addition to the privileges you'd expect, such as open, print, copy and edit, E-DRM allows you to control the use of formulas, force change tracking and limit the ability of users to annotate documents, among other rights". In 2004, a DRM product of Authentica was also described as the following: "Information owners control who can access, edit, copy/paste, forward, and print documents, spreadsheets and presentations. These permissions can be changed on the fly, even after recipients have accessed and edited protected files". Also, a media article in 2006 admired technology of E-DRM, as the following: SealedMedia helps organizations maintain complete control, for the lifetime of a document, over who can use their most sensitive information and when they can use it. Its enterprise digital rights management software protects information wherever it is stored and used. Unlike conventional information management products that only manage information while it resides in servers, SealedMedia extends security, control and tracking to information on remote end-user desktops, laptops and mobile wireless devices (http://www.ebizq.net/news/7184.html). Basically E-DRM was described in 2002 as "With DRM, the content can be locked forever or limited to a one-time short peek. DRM can prevent content duplication via screen captures, forwarding or printing. Some DRM applications can even recall e-mail or files, pulling them completely out of a user's reach. It all depends on rules assigned by the content owner".

However, with rapid advancement of micro devices and popular use of smart phones, it has become evident that enterprise DRM cannot handle the evolving ICT environment and malicious attempts using a camera, a camcorder, spying devices, and smart phones. DRM technology is lacking of tracing capability required for printed contents, copied content, or photo-taken contents. Some enterprise DRM vendors provided excellent access control capability by developing their own viewer and embedding access control mechanism in the viewer. For example, Microsoft and Adobe can embed access control mechanism inside editing programs, such as a MS Office or a PDF viewer. However, if a user is allowed to print delivered content, he or she can scan the printed document to upload to P2P content sharing site, for example, Bit Torrent. With development of micro device technology, many tiny devices for video recording products are being sold in the shape of sports glass, USB storage, fountain pen, accessory to the cap, or ball pen, for the purpose of secret recording. Even smart phones popular among non-professionals can be used to take photo of confidential document) displayed on user devices, or quietly record conversation in a meeting room using airplane mode. The above contents are described in more detail below.

Encryption and DRM Needed to Protect Enterprise Confidentiality

FIG. 1 depicts a graph about increasing number of telecommuters in the States. Even in Japan and in Korea where traditional office hour is still very prevailing, the number of telecommuters are increasing. Telecommuting might be a future trend where workers can focus on communication and problem solving while liberated from burden of daily commuting.

Referring to FIG. 1, it shows that more office workers are turning into remote workers, because of advancement of computer technology and wide spread use of internet. In some survey of Gallup's annual work and education poll, Gallup reported that "thirty-seven percent of U.S. workers say they have telecommuted, up slightly from 30% last decade but four times greater than the 9% found in 1995" and "telecommuting is much more common among those who have had more formal education, those who are upper-income and those who have white-collar professions".

Another report found that remote work seems to be the wave of the future. A recent survey of business leaders found that 34% said more than half of their company's full-time workforce would be working remotely by 2020. More than 25% of the poll participants said more than three-quarters would not work in a traditional office by 2020, which is not some far off, futuristic era". In 2015, Fortune reported "remote work continues to trend upward, with 2014 posting a 26% increase in open remote job postings over 2013". Telecommuting is a future trend.

In the survey of 2014, the US Census Bureau found that the share of Americans telecommuting every day has increased from 2.3 percent to 4.4 percent in 2012 since 1980. The US Census Bureau, moreover, reports that 9.4 percent of people now work from home at least one day a week, up from 7 percent in 1994. (This trend is global; in the United Kingdom, telework increased by 13 percent between 2007 and 2012 and now represents about a tenth of the workforce.) (http://www.citylab.com/commute/2014/02/why-telecommuting-really-matters-6-charts/8227/, "Why Telecommuting Really Matters, in 6 Charts" citylab)

These trends of remote work mask the changing ways Americans are working from home. The Census notes that while home-based workers were mostly self-employed 30 years ago, they're now mostly employed by private corporations, CityLab report says. That evidence is backed by a comparison between telecommuting trends in rural areas and the nation's largest cities. Between 1970 and 2010, the share of workers telecommuting in the most agriculturally dependent states declined by more than 50 percent, while it more than doubled in the ten most populous counties. In other words, the profile of telecommuters is becoming more urban.

Counties with a higher share of people holding a bachelor's degree or higher are likelier to telecommute, and those with a higher percentage of "professional" workers as classified by the Census exhibit similar trends. (Professional workers include legal services, management, business support, and scientific research, among other occupations.) Other occupational categories have far less of a correlation to telecommuting. "It's not the availability of work nearby or the way Americans get to work that's making us telecommuters—it's the type of work we're doing", Citylab article claims.

On the other hand, an England press, The Guardian, reported that home workers made up 13.9% of all those in work in the UK during the first quarter of 2014—the rate is the highest since comparable records began (https://www.theguardian.com/news/datablog/2014/jun/04/proportion-of-employed-working-from-home-reaches-recorc-high, "Proportion of people working from home reaches record high"), citing a report of Office for National Statistics (ONS). The press claimed that "the number of home workers reached 4.2 m in January-March 2014—an increase of 1.3 m since 1998 when the figure stood at 2.7 m. Although the number of employed people in the UK has also risen over the same period, the percentage of those in employment who work from home has gone up from 11.1% in 1998 to 13.9% in January to March 2014".

In 2016, Toyota, a Japanese car maker announced that more than 25,000 employees out of 72,000 employees will be turned into remote workers. In Japan, Nissan automobile began remote working system for all employees except product line in manufacturing factory in 2010, while Mitsui began remote working system in 2016 for 3,700 employee. Japanese companies are well known as 'imposing strict office hours' for a long time. However, as Japanese society is struggling with low fertility and population aging and remote work can be fully supported by advancement of IT technology and network, Japanese companies are introducing remote working system.

Based on media reports and statistics of government organizations, it is sure thing that the number of remote workers is increasing. Especially, more office workers with talents and professional knowledge are choosing remote work, because of increased productivity and saving time required for daily commuting.

FIG. 2 depicts a schematic view of statistical data of information leakage cases reported in InfoWatch 2014. More than 72% of information espionage comes from insiders, and 25% of information leakage comes from external hackers. Based on this statistical data, tracing capability is becoming an essential part of enterprise security system to trace misuse of insiders.

As shown in FIG. 2, cyber espionage is prominent in manufacturing (47%), professional (19%), education (7%), and public (16%). It is found that cyber-espionage actors are predominantly state-affiliated groups. Competitors and nation states are also mixing it up and 90% of Cyber-espionage breaches capture trade secrets or proprietary information. Also, the vast majority of threat actors (around 80%) are external. There is very little collusion (around 2%), around 10% internal, and very little partner (~1%). Tripwire analysis reported.

In the report of DBIR and press articles, even if it is very far-fetched, a conclusion can be drawn that increasing number of remote workers in professional area and manufacturing area will be major target of external hackers, consisting of competitors and nation states, through phishing techniques to implant malwares and exfiltrate confidential information. At this point, Tripwire and other security institutes advise to "encrypt your data: If stolen devices are encrypted, it's much harder for attackers to access the data".

Even if there have been various attempts to detect APT attacks through SandBox model of FireEye, TrendMicro, Paloalto Networks, Fortinet, Checkpoint, BlueCoat, malware related to APT attack is very difficult to detect timely. Recently FireEye found that it takes 205 days successfully to malware on average. Considering various communications channels and computing devices including wearable devices and internet-connected TV, refrigerator, automobile, there are too many security holes. Therefore, White House report of cyber security strategy and implementation plan recommends Encryption and DRM as a critical measure to mitigate cyber-attacks.

The "memorandum for heads for executive department and agencies" entitled "Cybersecurity Strategy and Implementation Plan (CSIP) for the Federal Civilian Government" issued by White House in Oct. 30, 2015, says that strengthening the cyber security for federal networks, systems, and data is one of the most important challenges we face as a Nation" and "the CISP is the result of a comprehensive review of the Federal Government's cybersecurity policies, procedures, and practices by the Sprint Team. The goal was to identify and address critical cybersecurity gaps and emerging priorities, and make specific recommendations to address those gaps and priorities". In CISP report, potential service offerings are (1) identity, authentication, and authorization services, (2) mobile security services, (3) network segmentation services, (4) digital right management (DRM), and (5) encryption services. In the potential security services, the most important are mobile security service, DRM, and encryption service.

In White House report elaborated mobile security services as following: "mobile devices have become as powerful and connected as desktop and laptop computers, requiring the same level of attention to cybersecurity. Mobile security has unique challenges that require different solutions than existing programs offer. This service (or services) could address authentication, application management, device management, and encryption, and it may include approved tools, best practices, and implementation support". Also, Digital right management (DRM) system is elaborated by "A DRM shared service capability could enable a systematic approach to data-level protection across the Federal Government and help prevent unauthorized review, redistribution, and modification of sensitive Government information". While protection at network level remains essential, adding protection at the data level is critical to achieving defense in depth.

Encryption services is defined as a shared service could help ensure consistent application of security policies and potentially provide delivery of a range of cryptographic capabilities. If operationalized, this shared service could also leverage and require many updates to the existing Federal Public Key Infrastructure (PKI). Proposal for this service offering may also include new requirements for employing web encryption (HTTPS), digitally signed email, and default encryption for sensitive information held by Federal civilian agencies.

FIG. 3 is a schematic view of an analysis of information leakage cased which were reported in annual report of Verizon's DBIR (Data Breach Investigation Report). In the report, the data espionage is very prominent in the area of manufacturing, professional, and public sector. It should be noted that the number of telecommuters is very rapidly increasing in knowledge intensive area and cyber-espionage activities in professional area, manufacturing, and public sectors are very prominent.

Referring to FIG. 3, DBIR shows trends of espionage and malware. This report, in its ninth year of publication, entitled by "2016 Data Breach Investigations Report" analyzed more than 2,260 confirmed data breaches and more than 100,000 reported security incidents in 2015. Based on Verizon's DBIR report, PRNewswire found that "cybercriminals are exploiting human nature—the highest since the report's inception in 2008". In the article, PRNewswire pointed out that "one area that has picked up dramatically over the prior year is phishing i.e. where end users receive an email from a fraudulent source. Alarmingly, 30 percent of phishing messages were opened—up from 23 percent in the 2015 report—and 13 percent of those clicked to open the malicious attachment or nefarious link", quoting statistical data of DBIR. PRNewswire article tried to explain why exploiting human nature is the highest trend in data breach and espionage.

In prior years, phishing was only a leading attack pattern for cyber-espionage and has now spread to seven of the nine incident patterns in the 2016 report. Its popularity has risen because it is an amazingly effective technique and offers attackers a number of advantages such as a very quick time to compromise and the ability to target specific individuals and organizations.

Adding to the list of human error is because of those caused by end users of an organization. 'Miscellaneous errors' take the No. 1 spot for security incidents in the report. These can include improper disposal of company information, misconfiguration of IT systems, and lost and stolen assets such as laptops and smartphones. In fact, 26 percent of these errors involve people mistakenly sending sensitive information to the wrong person.

According to DBIR report, in 93 percent of cases, it took attackers minutes or less to compromise systems and data exfiltration occurred within minutes in 28 percent of the cases. Even if sixty-three percent of confirmed data breaches involve using weak, default or stolen passwords and most of attack exploits are known vulnerabilities, those vulnerabilities have never been patched despite being available for months, or even years. In fact, the top 10 known vulnerabilities accounted for 85 percent of successful exploits, DBIR found.

The process of infecting user device with malwares for data breach and espionage goes through the following steps. Through user devices, lap-top computer, smart phones, or even wearable devices, hackers send a phishing emails with a link pointing to the malicious website, or malicious attachment. Then, malware is downloaded on an individual's PC that establishes the initial attack base, and additional malware can be used to find secret and internal information to steal confidential information or encrypt file for ransomware. A smarter way of cyber-attack described in DBIR is to go around a watching tower by attacking gate with fire while the attackers try to go over wall-fence. In SearchSecurity's article, the manufacturing industry saw the majority of incidents from DoS (33%) and the nebulous "everything else" category (33%), but breaches were from cyberespionage (47%), privilege misuse (24%) and Web app attacks (21%). The article of SearchSecurity explains that "It just sets people's hair on fire, because if you're having a DDoS attack and you see your traffic slow down or come to a grinding halt on your site, you turn all your attention to that. And, meanwhile, someone is walking up the backdoor through malware and taking out your intellectual property or your customer data and they've smoke-screened you," Richmond said. "That's the thing that is so maddening for security personnel, because you can't always tell where the fire is".

Based on these findings, it should be noted that most industrial espionage of confidential information can be done through hacker's attacks on individual's devices. It can be easily related to trend of increasing number of remote workers in professional area. Tripwire, a computer security company in US pointed out that "a majority of the attackers behind this year's incidents were external actors motivated by financial gain. They went about their attacks by means of hacking, malware distribution, and phishing, with social engineering attacks" and "30 percent of phishing messages were opened by the target across all campaigns last year. It took a recipient an average of one minute 40 seconds to open the email and three minutes 45 seconds to click on the malicious attachment".

Threat of Micro Devices, Malicious Users, and Hackers

FIG. 4A to FIG. 4C depict various spying devices which are in sales in the market.

Referring to FIG. 4A to FIG. 4C, spying devices available in internet market show that the confidential information in enterprise is being threatened by various devices and malicious attempts. Because of advancement of micro device technology, the spying devices already become smaller enough in size, while they are powerful enough in malicious functions. The spying devices can be used to take photos or take video-shots of confidential document, or record conversation very quietly and secretly. These digital spying devices which can provide voice recording, video capturing, and even real-time data transmitting can be in the form of ball-pen, fountain pen, neck tie, sports glass, belt buckle, USB, radio or alarm clock, car key rings, portable bag, or even shoes. In general, the devices are too tiny and in various shapes that it is very difficult to detect.

Smart phones have already moved into daily life. Most smart phone vendors provide functions of high-quality resolution camera, video, and voice recorder with a mass storage capability. Thus, malicious users in enterprise offices or remote offices can take photos, video shots, or record conversation in meeting room. Then, wearable computers which have mobile communication function and photo-taking camera inside are also moving into daily life, as in Google Glass, Apple's iWatch, Samsung's Gallexy Gear, Olympus's MEG 4.0, Baidu's Baidu Eye, and others. Those devices, including smart phones, wearable computers, and micro devices provide photo-taking function and voice recording function. As shown in FIG. 4A to FIG. 4C, there are so many micro devices available in the market at a price range of 40-60 USD. Considering that most smart phones are equipped with high-quality camera and voice recorder, there are no ways to prevent from exfiltration of internal documents shared by intranet.

In other words, those technologies which have provided so far very effective ways to prevent illegal copy from computer systems and transfer to third parties through wired or wireless networks, or storage devices, including DRM and DLP, cannot provide any protection mechanism in the age of micro devices and smart phones. Traditional DRM technology, because of encryption functions and access control function, can make copied content useless at the third party's computer. However, when the content is taken photo by smart phones or scanned after printing, there is no effective way to prevent display on third party's terminal. It may explain why recently many enterprises are adopting Mobile Device Management (MDM) technology to keep confidentiality of digital assets and to prevent illegal information leakage.

However, when a user utilizes 'air mode' of smart phones, it is very hard to prevent silent operation of recording voices in meeting room and of taking photos, videos of confidential documents displayed on user terminal screen. That is why tracing capability should be added to existing DRM systems to enhance security capability. In near future tracing module might become an essential part of DRM system in addition to encryption and access control.

FIG. 5 depicts a case of leakage of confidential information. Even if DRM system is already in place to prevent illegal information leakage from a financial investment firm, an employer would print confidential document and then scan it before uploading to P2P site, BitTorrent.

Referring to FIG. 5, a case of information leakage shows that DRM systems were already deployed in various enterprise computing environment, but cannot prevent all attempts to transfer valuable information to the third party. Because enterprise DRM systems traditionally rely on encryption and controlling user application programs, a legitimate user prints confidential document and then scans it before uploading it to P2P site, Bit Torrent. This is DRM system's failing case in which legitimate users purposefully take actions allowed by existing DRM system and then take advantages of security holes.

For example, a financial analysis firm distributes various reports to multiple groups of internal or external users to help investment or M&A decision making. The firm adopted a popular DRM system which provides encryption and a limited access control function with document conversion. An author of an important document of financial analysis in this firm sent the document for review of investment decision-making, or further in-depth analysis to internal users or external investors. One of the legitimate users printed and uploaded the document after scanning to P2P site, BitTorrent, which made a devastating effect in terms of reputation and financial loss.

Even if access control function of DRM or DLP (Data Loss Prevention/Data Leakage prevention) technology is employed in preventing illegitimate activities by blocking 'printing' 'transfer to the third party' or 'make on portable storage devices', or by encrypting document in work or in storage, it cannot prevent information leakage conducted through legitimate activities. Furthermore, if the malicious users make copy of the confidential information using micro devices, or smart phones at remote offices, mainly home offices, or offices of partner companies, there is no practical measure to prevent those activities.

That is why a new DRM system should be equipped with tracing mechanism to protect enterprise confidentiality in the age of micro devices, or print-scan-uploading, which are available to everybody.

SUMMARY OF THE INVENTION

An object of the present invention is to provide a method for protecting enterprise confidentiality and copyright using encryption algorithms and controlling access on protected contents. Enterprise confidentiality include business plan, budget, customer's information, reports to management, design data of advanced technology companies, experimental data mainly in the domain of science and technology, long-term business plan, confidential contracts with partners, and etc. As the content of enterprise is shifting from document and data to multimedia, video and 3D content, such as virtual reality presentation should be included in the category of 'content'.

In accordance with an embodiment of the present invention, a client device for content security may comprise: an application execution unit configured to control content in response to a content control command requested by a user in a user level; a DRM agent configured to communicate with a DRM server and the application execution unit in the user level, to detect the content control command generated by the application execution unit, to receive an encryption/decryption key and security policy for content of an associated user from the DRM server, to provide the received encryption/decryption key and security policy to a client kernel module, and to transmit an encryption/decryption request for the content according to the content control command to the client kernel module; and the client kernel module configured to receive the encryption/decryption key and the security policy from the DRM agent, to store the received encryption/decryption key and security policy in a secure box of a kernel level, and to perform encryption or decryption on the content based on the encryption/decryption key and security policy stored in the secure box in response to the encryption/decryption request.

The secure box of the kernel level may comprise a storage region for preventing access from an operating system (OS) by indicating that a specific empty region of a disk is used in a file system region.

The client kernel module may be configured to attach two encrypted headers comprising access rights and a security policy to encrypted content upon encryption, and first decrypt the encrypted headers and then decrypt the encrypted content based on header information upon decryption.

A user personal key, an enterprise key or a set of group keys may be stored in the secure box or extracted from the secure box in response to a request from the DRM agent.

The DRM agent may comprise a cipher module configured to perform control so that the encryption and decryption of the content is performed in the kernel level; an application control module configured to control the content based on whether the content control command according to the security policy and authority information of the user is suitable while monitoring the content control command; a tracing module configured to insert security information into the content in order to prevent and trace content leakage; a DRM interface module configured to comprise a user interface between the user and the DRM agent and a server interface between the DRM agent and the DRM server; and a DRM core configured to control an operation sequence of the cipher module, application control module, tracing module and DRM interface module, to allow data to be exchanged between the modules, and to confirm access rights of the user for the content based on the security policy and the authority information of the user.

The user interface may trace a content control command according to a user input and provide the traced content control command to the DRM agent, and the server interface provides user authentication information from the DRM agent to the DRM server and provide the encryption/decryption key and data related to the security policy from the DRM server to the DRM agent.

The application control module may comprise a session agent module configured to monitor the content control command, to transfer the content control command to a client interface manager, and to provide an encryption/decryption request related to the content control command to the client kernel module; a client interface manager configured to manage a user authentication procedure, to manage the encryption/decryption key and security policy based on communication with the DRM server and log data, and to perform the security policy when access rights of a content recipient are confirmed; an application monitoring module configured to confirm the access rights of the user for the content and to transmit the confirmed information to the session agent module; and a security component module configured to manage a user request and menu manipulation for access memory for control of the content.

The application control module may comprise a service launch module configured to install the application monitoring module on each application program.]

The session agent may initialize the service launch module in order to search for information about a user behavior and installs a command filter on each process.

The DRM agent may be configured to execute operations of the command filter and the application monitoring module in response to a user request other than content distribution or login, activate the session agent module for decryption of the content, and adjust an operation of security components.

The session agent module may be configured to drive the application monitoring module in response to an open request for a previously stored content file, determine suitability of at least one of decryption, display, edit, capture, print, sharing, copy, and delete operations for content of a user in order to confirm access rights of the user for the content file, and perform a content decryption procedure within the client kernel module using a personal key or an enterprise key.

The client interface manager may be configured to execute a content sharing tool to specify a user group for content sharing in response to a user request related to the content sharing, and manage access rights of each group for content received through a physical storage medium or the DRM server.

The DRM agent may be configured to request that a plurality of steps for encryption be executed in the kernel level based on the encryption/decryption key extracted from the secure box when a user request related to content storage is permitted by the application monitoring module, and request that a plurality of steps for decryption be executed in the kernel level based on the encryption/decryption key extracted from the secure box when a user request related to content read or print is permitted by the application monitoring module.

The client interface module may perform user authentication, a transfer of the encryption/decryption key and the security policy, a management of user log data, and a management of content sharing through communication with the DRM server.

The content control command may comprise at least one of a sharing command for sharing the content with another user apparatus, a capture command for capturing the content, a copy command for copying the content, a print command for printing the content, a read command for reading the content, and a playback command for playing back the content.

In accordance with another embodiment of the present invention, an operating method of a client device for content security may comprise controlling content in response to a content control command requested by a user in a user level; detecting the content control command generated by an application execution unit in the user level; receiving an encryption/decryption key and security policy for content of a user associated with the content control command from a DRM server and providing the received encryption/decryption key and security policy to a client kernel module; receiving the encryption/decryption key and the security policy from a DRM agent and storing the received encryption/decryption key and security policy in a secure box of a kernel level; transmitting an encryption/decryption request for the content according to the content control command to a client kernel module; and performing encryption or decryption on the content based on the encryption/decryption key and security policy stored in the secure box in response to the encryption/decryption request.

In accordance with another embodiment of the present invention, a DRM server apparatus for content security may comprise a server agent configured to perform user authentication based on user authentication information received from a client in a user level; and a server kernel module configured to extract an encryption/decryption key and security policy for the authenticated user from a secure storage of a kernel level and to encrypt the extracted encryption/decryption key and security policy in the kernel level. And the server agent receives encrypted information from the server kernel module and transmits the received information to the client in the user level.

The server kernel module may be configured to generate personal keys, a group key, and a security policy for users in the kernel level, store generated information in the secure storage, and transmit the generated information to the client through the server agent of the user level.

User log data is stored in a database of the user level.

In accordance with another embodiment of the present invention, an operating method of a DRM server apparatus for content security may comprise performing user authentication based on user authentication information received from a client in a user level; extracting an encryption/decryption key and security policy for the authenticated user from a secure storage of a kernel level and encrypting the extracted encryption/decryption key and security policy in the kernel level; and transmitting encrypted information received from a server kernel module to the client in the user level.

BRIEF DESCRIPTION OF THE DRAWINGS

FIG. 2 depicts a schematic view of statistical data of information leakage cases reported in InfoWatch 2014.

FIG. 3 is a schematic view of an analysis of information leakage cased which were reported in annual report of Verizon's DBIR (Data Breach Investigation Report).

FIG. 4A to FIG. 4C depict various spying devices which are in sales in the market.

FIG. 20 depicts sample of text watermark application.

FIG. 25 depicts a first example of image watermark.

FIG. 26 depicts a second example of image watermark.

FIG. 29A and FIG. 29B depict examples of watermark embedding to document.

FIG. 36A through FIG. 36E depict examples of $2^{nd}$ watermarking for printing.

DETAILED DESCRIPTION OF THE EMBODIMENTS

Figure 1:
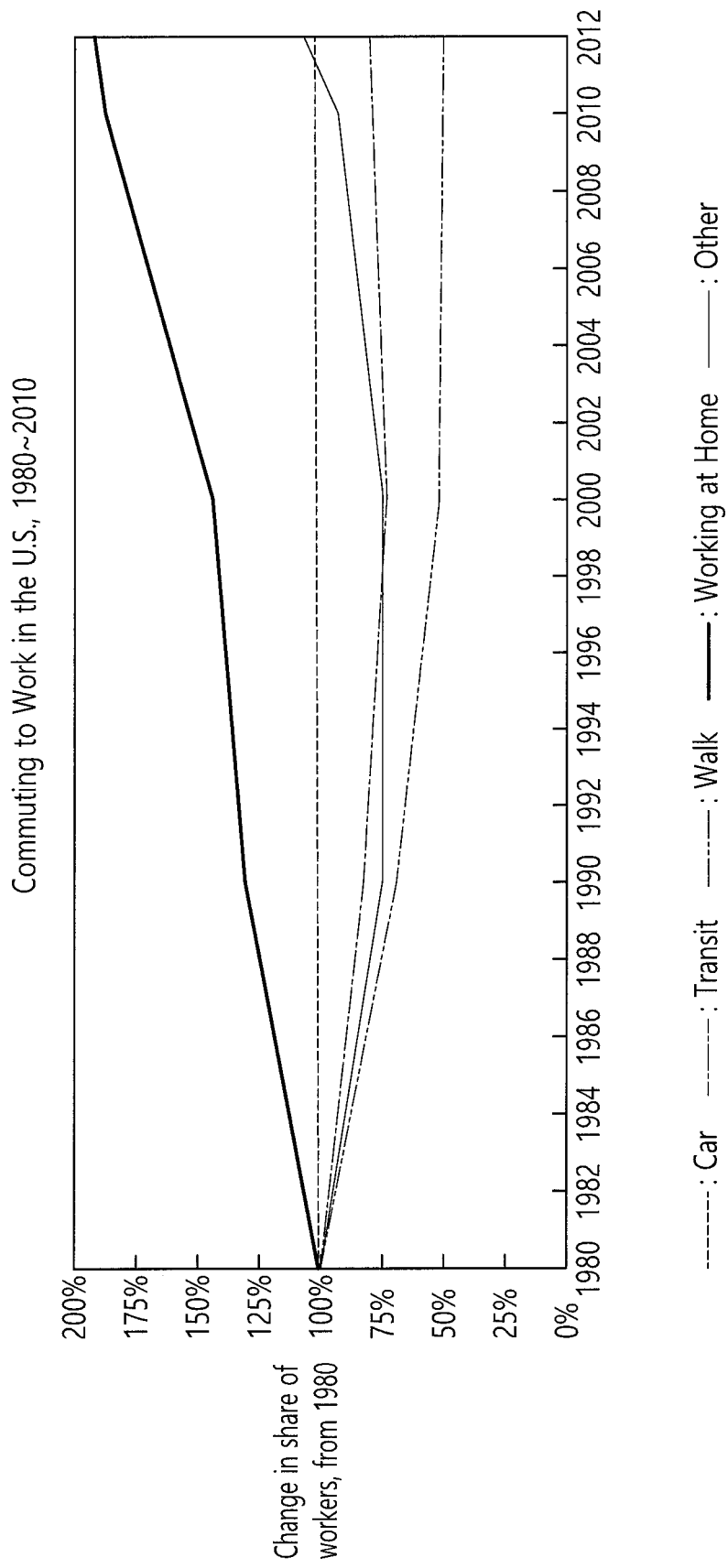
FIG. 1 depicts a graph about increasing number of telecommuters in the States.

The present invention may have various modifications and various embodiments and specific embodiments will be illustrated in the drawings and described in detail.

However, this does not limit the present invention to specific embodiments, and it should be understood that the present invention covers all the modifications, equivalents and replacements included within the idea and technical scope of the present invention.

Terms such as first, second, and the like may be used to describe various components and the components should not be limited by the terms. The terms are used only to discriminate one constituent element from another component. For example, a first component may be referred to as a second component, and similarly, the second component may be referred to as the first component without departing from the scope of the present invention. A term 'and/or' includes a combination of a plurality of associated disclosed items or any item of the plurality of associated disclosed items.

It should be understood that, when it is described that a component is "connected to" or "accesses" another component, the component may be directly connected to or access the other component or a third component may be present therebetween. In contrast, it should be understood that, when it is described that an element is "directly connected to" or "directly access" another element, it is understood that no element is present between the element and another element.

Terms used in the present application are used only to describe specific embodiments, and are not intended to limit the present invention. A singular form may include a plural form if there is no clearly opposite meaning in the context. In the present application, it should be understood that term "include" or "have" indicates that a feature, a number, a step, an operation, a component, a part or the combination thereof described in the specification is present, but does not exclude a possibility of presence or addition of one or more other features, numbers, steps, operations, components, parts or combinations thereof; in advance.

If it is not contrarily defined, all terms used herein including technological or scientific terms have the same meanings as those generally understood by a person with ordinary skill in the art. Terms which are defined in a generally used dictionary should be interpreted to have the same meaning as the meaning in the context of the related art, and are not interpreted as an ideal meaning or excessively formal meanings unless clearly defined in the present application.

Hereinafter, preferred embodiments of the present invention will be described in detail with reference to the accompanying drawings. In describing the present invention, like reference numerals refer to like elements in the drawings for easy overall understanding and a duplicated description of like elements will be omitted.

In the embodiment of the present invention, proposed is a new DRM architecture in which tracing function is added to two main functions of traditional DRM system, encryption and access control, in order to cope with threats caused by advancement micro device technologies, smart phones, and sophisticated hackers.

Digital right management (DRM) technology has relied on encryption and access control mechanism to protect enterprise confidentiality. However, because of rapid development of various applications available to end-users and wide spread use of new IT functions, DRM system should evolve to include tracing mechanism in order to strengthen security level in protecting confidential information of an enterprise. In other words, with advancement of digital convergence technology and popular use of mobile devices and micro devices, tracing mechanism has become an essential component in distributing enterprise digital content.

Target device of an embodiment of the present invention can be a personal computer (PC), lap-top computer, mobile phone unit, auto-mobile systems, television unit, or other devices on which user application programs operate and also can be connected through wired or wireless network to multi-tenant server. Types of user devices may be continuously expanded and therefore, definition of user devices should not be restricted to currently available computing devices or playing machines. Already some devices including cell phones, driverless cars, intelligent robots, and smart TVs can be target devices of the embodiment of the present invention, even though a document cannot be created, edited, reviewed on these devices, right now. However, various devices and machines related to the embodiment of the present invention have voice recognition capability and automatic document editing function triggered by human's voice.

Widespread use of smart phones and advancement of micro device technologies is related to the embodiment of the present invention of tracing technologies. Because of advancement of digital technology and spread of computer network, not only creation and distribution of digital document have become much easier than before, but also illegal distribution of document through un-allowed copy, phototaking, scanning, uploading become much easier. Encryption and access control of traditional DRM cannot cope with these evolution and advent of new DRM technologies.

Furthermore, in an embodiment of the present invention, the term "content" may include a document, text, an image, a moving image or a document or image of a combination of them. A control command for content may include a control command for copying a block within corresponding content, copying a document, printing a document, storing a document, and reading, generating or editing a document, but is not necessarily limited thereto.

DRM System and Tracing Module

Figure 6:
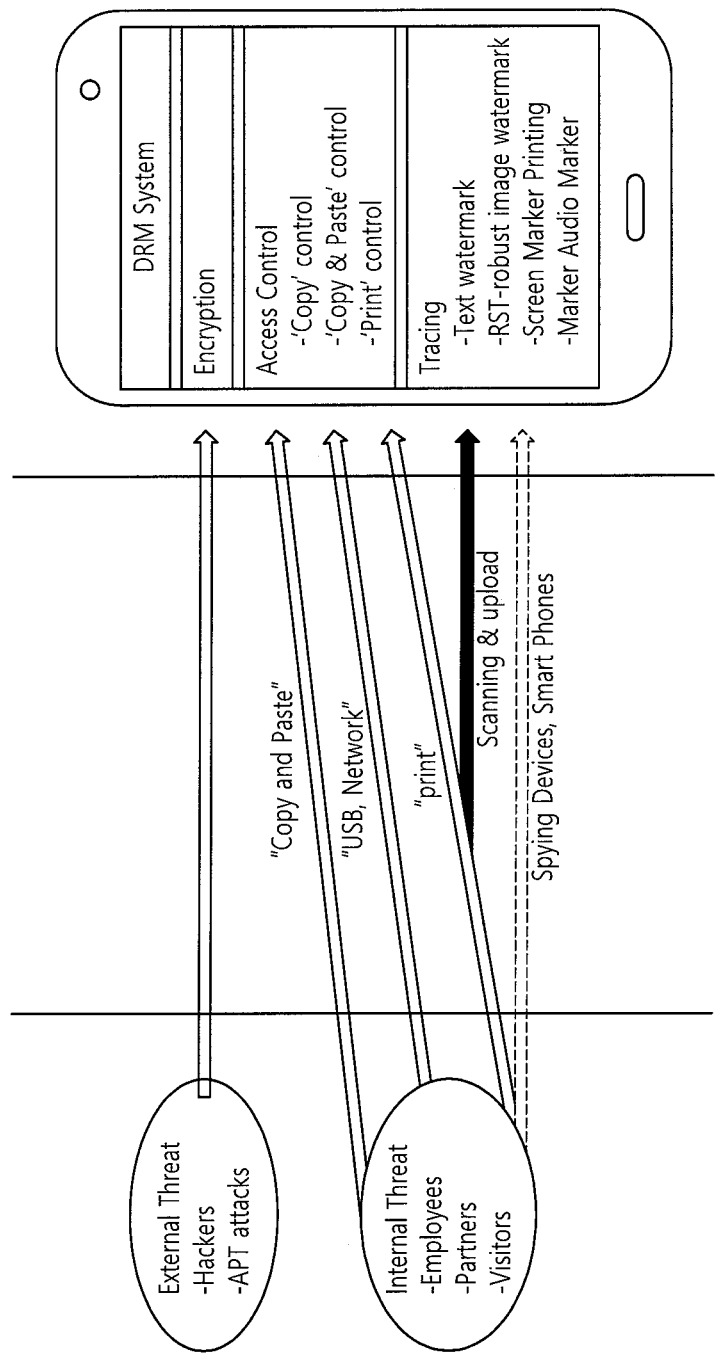
FIG. 6 depicts a block diagram schematically illustrating components and structure of a new DRM system according to an embodiment of the present invention.

FIG. 6 depicts a block diagram schematically illustrating components and structure of a new DRM system according to an embodiment of the present invention. As shown in FIG. 6, in the new DRM system, access control and encryption is employed for preventing illegal information leakage, while tracing is provided to trace back path of information leakage and identify persons involved in the leakage.

Referring to FIG. 6, the new DRM system according to an embodiment of the present invention for enterprise security may provide tracing capability in case confidential information is leaked out, through mailing functions or SNS activities using a network, through photo-taking or video-capturing using spying devices or smart phones, through quiet and secret recording conversation in meeting rooms, or through sophisticated manipulation of user devices of hackers by transmitting data to remote servers.

The actors involved in information leakage might be (1) internal employees, (2) employees of partner companies and (3) sophisticated hackers. The activities related to information leakage are (1) file copy on potable storage (USB, HD, SD of smart phones), (2) file editing to transfer contents to other files or create new file, (3) file transfer through network (intranet, public network, wired network, wireless network), (4) printing (regular printer, virtual printer, network printer), (5) capture tool and print screen function, (6) legitimately printing and scanning for uploading to a public web site, and (7) use of spying devices (taking photo or video of displayed screen). Even if the list of information leakage is comprehensive as far as current IT technology is involved, the list might get longer as the technology evolves.

DRM technology may effectively prevent information leakage in case of un-allowed (1) file copy on portable storage and take to the third party (USB, HD, SD of smart phones) which is prevented by access control of DRM system, (2) file editing to transfer contents to other files or create new file, which is prevented by access control of DRM system, (3) file transfer through network, which is invalidated with DRM's encrypting all sensitive files and access control, (4) printing and taking printed document to third party, which is prevented by access control, (5) capture tool and print screen function, which is prevented by access control of DRM systems. Most threats can be prevented using encryption and access control function of the DRM systems. However, in case of (6) legitimate printing and then scanning to upload to P2P site, and (7) use of spying devices and smart phones to take photo or video shot of displayed document, there is no effective way to prevent user's activity. Also, in a confidential meeting room, a user attempts to record conversation using spying devices and smart phones, some existing DRM systems cannot prevent those activities. In addition, as discussed in FIG. 3, 90% of cyber espionage breaches capture trade secrets or proprietary information. Very importantly, the vast majority of threat actors (around 80%) are external. Through phishing technique or malware penetration technique, the external actors stole confidential information from manufacturing, professional areas, public organizations, or higher education institutes. Therefore, one of the threats considered in designing enterprise security system is hacker's attack via malware penetration and phishing attempt.

An exemplary object of the present invention is to provide tracing capability to DRM system in case of (1) legitimate printing and scanning before uploading or transferring to third party, (2) illegitimately taking photo or video-taping displayed document, (3) legitimate or illegitimate transferring document to third party, or (4) illegitimate recording confidential conversation. The tracing capability can be employed as a complimentary function to encryption and access control of the DRM system to enhance security level of enterprise confidentiality.

That is, the DRM system according to an embodiment of the present invention may include a powerful encryption function in order to prevent an external threat, such as a hacker or an APT attack, and an access control function based on the rights of a user by detecting control (for example, 'copy control, 'copy & paste control' and/or 'print control') of a document in order to handle an internal threat from employees within an enterprise, partners or visitors. Furthermore, the DRM system may include a tracing function for handling a scanning and upload request for content with respect to an internal threat. The tracing function may include a text watermark-related function, an RST-robust image watermark-related function, a screen marker, a printing marker, and an audio marker-related function. Such a tracing function is suitable for handling an attack using a spying device or a smart phone.

Figure 7:
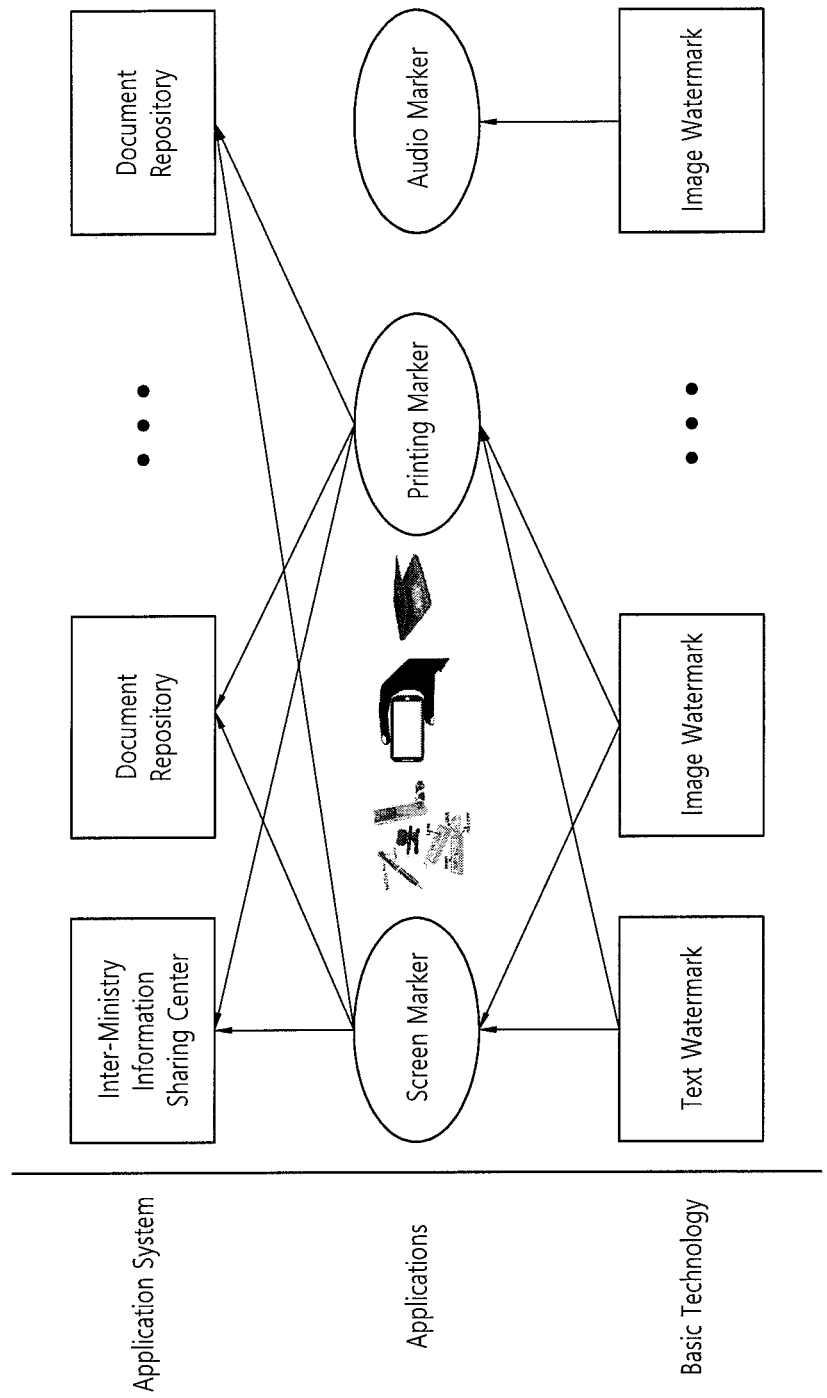
FIG. 7 depicts a block diagram schematically illustrating functions of leakage tracing and basic components involved in the tracing.

FIG. 7 depicts a block diagram schematically illustrating functions of leakage tracing and basic components involved in the tracing. As shown in FIG. 7, an application system related to the DRM system according to an embodiment of the present invention may include an inter-ministry information sharing center, a document repository, and a document sharing system.

Referring to FIG. 7, basic technologies and application of tracing mechanism describe relationship between basic component technologies and applications derived from the basic components. In other to provide tracing capability in alliance with the DRM technologies, in the embodiment of the present invention proposed are (1) text watermarking which can hide each user ID information in the text, displayed, printed, or edited for format converted document, (2) image watermarking which can embed invisible information in graphic data, or image data for format converted document or original document, and (3) audio watermarking which hides secretly inaudible information into recorded conversation in meeting room. On top of these basic components, information tracing applications are developed including (1) text marker which can hide user ID information inside text document to trace when the document is leaked out through network or portable devices, (2) screen marker which can hide invisible information into displayed text, graphics, or image data included in the format converted document to trace information leakage when the document is photo-taken, or video taken, (3) printing marker which can hide the user ID into the text, graphic, image data displayed in a printed document, which is file format converted or original, to trace when the printed document is transferred to the third party through scanning, photo-taken, or video-capturing, or other ways, (4) audio marker which can embed inaudible information of location and time data into recorded conversation.

Even if these proposed technologies and applications cannot cover all the possible security holes, most information leakages can be traced using the applications. As discussed above, the sources of information leakage related to the embodiment of the present invention are trying to trace (1) legitimate printing and then scanning before uploading or transferring to third party, (2) illegitimately taking photo or video-taping displayed document, (3) legitimate or illegitimate transferring document to third party, or (4) illegitimate recording confidential conversation.

First, the legitimate printing and uploading to P2P site after scanning can be traced using text marker, or printing marker which hides invisible user ID in the printed document. Even when the printed documents are photo-taken, video-captured, or scanned, the user ID invisibly hidden is very easily identified through detector. Second, when a document displayed on a user screen is phot-taken, or video-captured, the user ID hidden by screen mark included in the document leaked out can be disclosed by RST adjustment and information extraction using text watermarking, and image watermarking technologies. RST adjustment may be needed before identifying the user ID hidden in text, graphics, and image to make the document readable and detectable. Third, the text marker is very useful when a user in an organization legitimately sends confidential information to wrong hands, by identifying the user ID through extracting hidden information from the digital document. Fourth, when important conversation is quietly and secretly recorded using spying devices or smart phones, the information of location, time, and others can be traced back where and when the conversation was recorded by audio marker. Even if there is no very effective way to prevent the secret recording, this tracing function of the audio marker can discourage quiet and secret recording in meeting room or private places, because a limited information of meeting time and location extracted from recorded conversation can disclose who joined the meeting and probably can lead to easy pointing to suspected participants.

The tracing application programs, text marker, screen marker, printing marker, and audio marker according to the embodiment of the present invention may be deployed in various situations. Especially, in distributing confidential information three tracing applications might be very useful: text marker, screen marker, and printing marker. Even in private sectors, law firms where various confidential documents should be circulated for information sharing between lawyers and clients can protect their confidential information from possible leakage. Also, some financial analysts groups or private banking groups can protect their confidential information from illegal leakages. A document repository system for public service or an enterprise information sharing system can share important information with various groups without serious worries of information leakages. In this system according to the embodiment of the present invention, as in the content sharing system for 3D printing design data clearing center or music sharing center, some users may upload media data or document, while others can download document or media content for their own use. However, the downloader are supposed to comply the license condition or enterprise security rules, for transferring, printing, or editing. When the downloader violates the compliance rules, there should be tracing function to identify who was involved in the violation.

Figure 8:
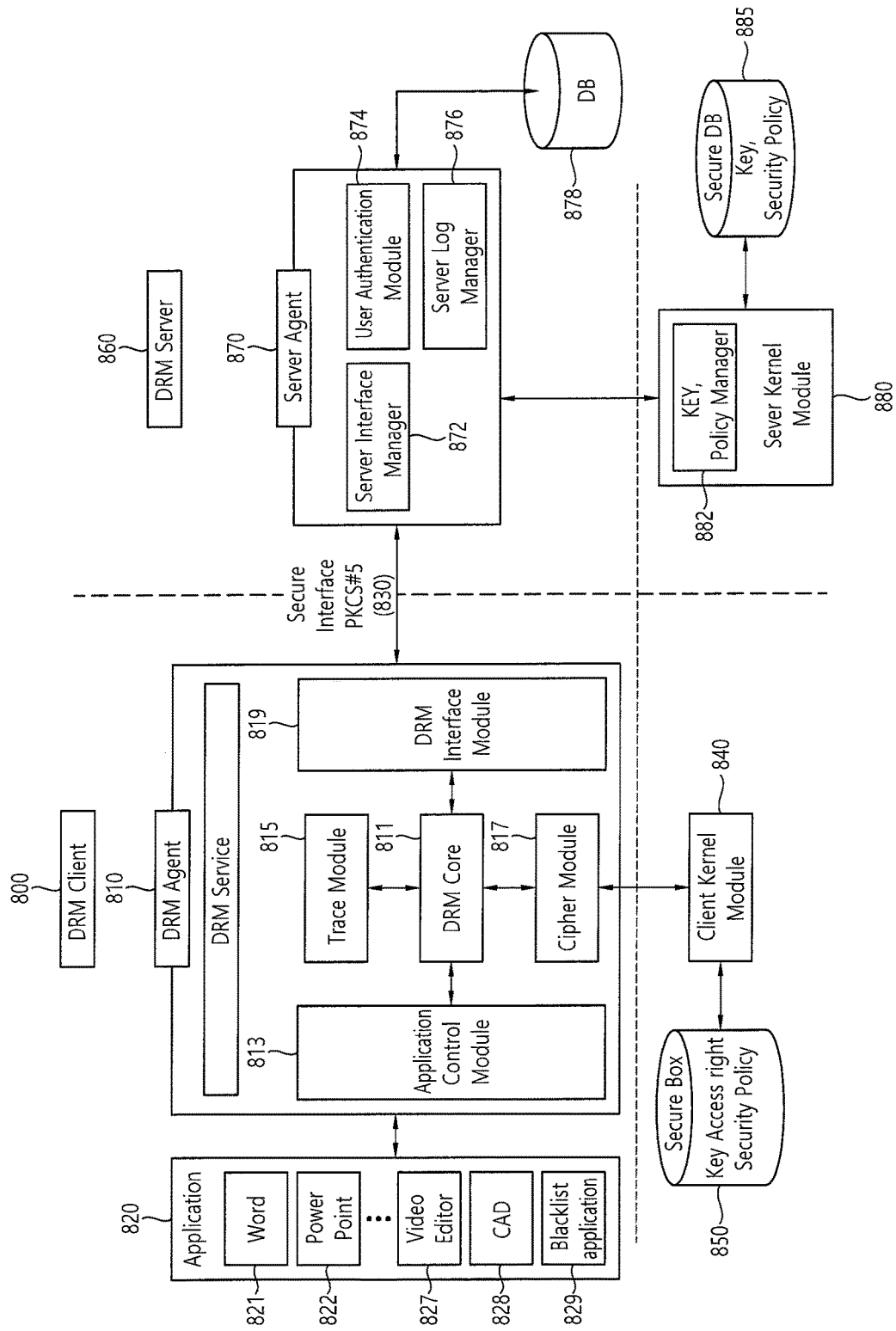
FIG. 8 depicts a block diagram schematically illustrating new DRM system according to an embodiment of the present invention.

FIG. 8 depicts a block diagram schematically illustrating new DRM system according to an embodiment of the present invention. As shown in FIG. 8, the DRM system according to the embodiment of the present invention may include a DRM client 800 and a DRM server 860. And the DRM client 800 may include a DRM agent 810 and a client kernel module 840, and the DRM server 860 may include a server agent 870 and a server kernel module 880.

Referring to FIG. 8, the DRM system may include a client-server system. The DRM client 800 may be a terminal (for example, a PC or a laptop) which is connected to the DRM server 860 over a network and on which a DRM platform within an enterprise has been installed. The DRM client may generate a document including enterprise confidentiality using the installed platform, and may share the generated document with other users. In this case, a DRM function according to an embodiment of the present invention may be applied to processing, such as the generation, edit, storage and sharing of the document.

The DRM client 800 may include the DRM agent 810 and the client kernel module 840. In this case, the DRM agent 810 may include a DRM core 811, a DRM application module 813, a tracing module 815, a cipher module 817, and a DRM interface module 819. In the new DRM system of the present invention, the tracing module 815 is added to basic main functions of encryption and access control. Because of advancement of micro device technologies and popular use of portable devices, tracing capability becomes important components of enterprise security system. In the DRM architecture of the embodiment of the present invention, encryption/decryption is conducted in kernel level, while application control module 813 processing user's access control for the digital content is located at user level. Then, the tracing module 815 is also added at user-level.

The tracing module 815 may be required, becoming an essential component in protecting enterprise confidentiality. DRM technology, especially enterprise DRM has simple encryption technology, and includes access controlling mechanism to reflect trend of IT development.

Even though DRM system has been effective in preventing information leakage through encryption and access control, new threats came up to enterprise work places. Some existing DRM system cannot prevent information leakage from sophisticated hackers, malignant employees with smart phones, disgruntled employees at telecommuting offices, or employees of partner corporations with spying devices.

Therefore, the new architecture of DRM system according to the embodiment of the present invention may be consisted of a DRM client 800 and a multi-tenant DRM server 860. In this scheme, the DRM agent 810 and application programs 850 of the DRM client in user level may create content, save it on its storage or in remote storage, manage encrypted contents and log data, and control usage of the content according to user's access right, while the DRM server 860 generates a set of key and security policy, manages log data, and modifies access right of recipient, in case of content sharing. In the embodiment of the present invention, the DRM agent 810 at user devices may receive content from other devices or users through the DRM server 860 for 'play', 'read', 'copy', 'save', 'print', 'modify', or 'share' content. Possible operations at the user device will not be limited to those specified above.

Communication between the DRM agent 810 and the DRM server 860 occurs based on safe communication methods and channels when a user logs into the content security system through a business platform, a content delivery system, a 3D printing distribution system, or others. When a user attempts to distribute the created content, again the communication between clients and a server occurs using a content sharing tool.

Encryption/decryption may be accomplished at user-level or kernel-level. Some examples of operating system of the embodiment of the present invention provide the most strong security protection for encryption/decryption in kernel. Even though encryption/decryption of the DRM system may be optional, done in user-level, or done in kernel level, in the exemplary embodiment of present invention, kernel-level encryption/decryption may be employed to show highly secured operation of a DRM system.

As described above, the DRM agent 810 may control access right of a user for multiple contents and tracing illegal content leakage and distribution configured to authenticate a user to multi-tenant server and manage log data. And the DRM agent 810 may get content keys and security policies from the DRM server 860 when a user logs into the multi-tenant server 860, and encrypt/decrypt the newly created contents or the delivered content in kernel level. And DRM agent 810 may inject a user command filter module into each process to monitor user activity, handle requests of access right specified in content file by calling application control module 813 for initiating security component modules of image capturing, block copy, print, and menu control, and communicate with the kernel-level client agent 840 for encryption and decryption of contents by retrieving keys from a secure box 850. And it may embed tracing information into digital content displayed on a user terminal, or a printed paper, or a PDF converted document, or security information into a recorded audio file using a audio signal generator and embedder, and handle user's request of content distribution in the networks or physical storage media using content sharing tools.

The client kernel agent 840 may store user's confidential information and perform encryption/decryption configured to get contents keys and security policy from the DRM server 860 through the client user agent 810. And the client kernel agent 840 may store contents keys and security policy data into the secure box 850 in kernel level and encrypt the content with a randomly generated content key. And it may attach two encrypted headers to the encrypted content, or decrypt sequentially encrypted headers and then the content body.

Four components in the DRM agent 810, including an application control module 813, a trace module 815, a cipher module 817, and a DRM interface module 819 are coordinated and managed by the DRM core 811. Mainly depending on access right of each user and security policy of copyright owner or enterprise, the DRM core 811 determines sequence of calling programs and effectively puts them into order. For example, when a highly sensitive confidential document should be shared with a few partner groups, it can be distributed with access control of 'limit printing to 1 time', 'limit open 2 times', 'prevent 'save' on user device', 'prevent screen capture', 'embed invisible screen marker', 'embed yext mark', and 'embed invisible printing mark'. In this embodiment, the DRM core 811 may arrange activities of the DRM agent 810 in the sequence of open control (the application control module 813), decryption cipher (the cipher module 817), text mark for trace (the trace module 815), screen mark for trace (the trace module 815), block 'Save' for control (the application control module 813), block 'print' for control (the application control module 813), embed print mark for trace (the trace module 815), and possibly block 'print' for control (the application control module 813) and block 'save' for control (the application control module 813) again. In another embodiment of the present invention, 3D design content may be distributed with access right of 'open unlimited times', 'can be modified and saved on user device', 'not allowed to be transferred to third party', 'not allowed to print', 'not trace mark for screen', 'not allowed to transfer to mobile device', and 'not allowed for sharing licensing'.

In distributing enterprise confidential content, when a new content is created and saved on a user device, the access right shall be determined by a combination of user's specification of security level and security policy specified for the user and created content, which should be monitored and controlled by the DRM core 811. However, when a content delivered from the DRM server 860 or other users through networks or personal delivery, the access right of the user for the content may be disclosed to the DRM core 811 before properly controlled and managed. In the process of 'save' the content on the user device or remote storage, the DRM core 811 may arrange implementation of the cipher module 817 and the DRM interface module 819. In case the user's access request to the delivered content is delivered to the DRM agent 810, it may be managed and controlled by coordinated activities of the cipher module 817, the application control module 813, and the trace module 815 with assistance of the DRM core 811. When a user tries to share the created content or delivered content with colleagues or external users, the DRM core 811 may call the DRM interface 819 which may be assisted by the DRM server 860. When a user prints a document, then the DRM core 811 may handle the request using coordinated activities of the application control module 813, and frequently using the trace module 815. In this architecture, the DRM core 811 may play the most important roles in realizing features of the DRM system according to the embodiment of the present invention including 'encryption, control, and tracing'.

The application control module 813 of the DRM agent 810 may play important role in controlling and managing user's request to comply with enterprise's security policy or copyright owner's license policy by monitoring, rejecting illegitimate request, or accepting legitimate request. That is, the application control module 813 may control and manage user's request to enforce the enterprise security policy or copyright owner's license policy, by injecting multiple command filters in each process to monitor application programs, by making decisions based on user's request and access right information determined beforehand, and by taking actions through activating corresponding application control modules.

The application control module 813 operates in conjunction with an application execution unit (not shown) for executing the application program 820. The application execution unit may execute the application program 820, such as Word 821, PowerPoint 822, a video editor 827, CAD 820, and a blacklist application 829. The application control module 813 may detect a user request generated while an application is executed and process the detected user request in accordance with a DRM policy.

Figure 9:
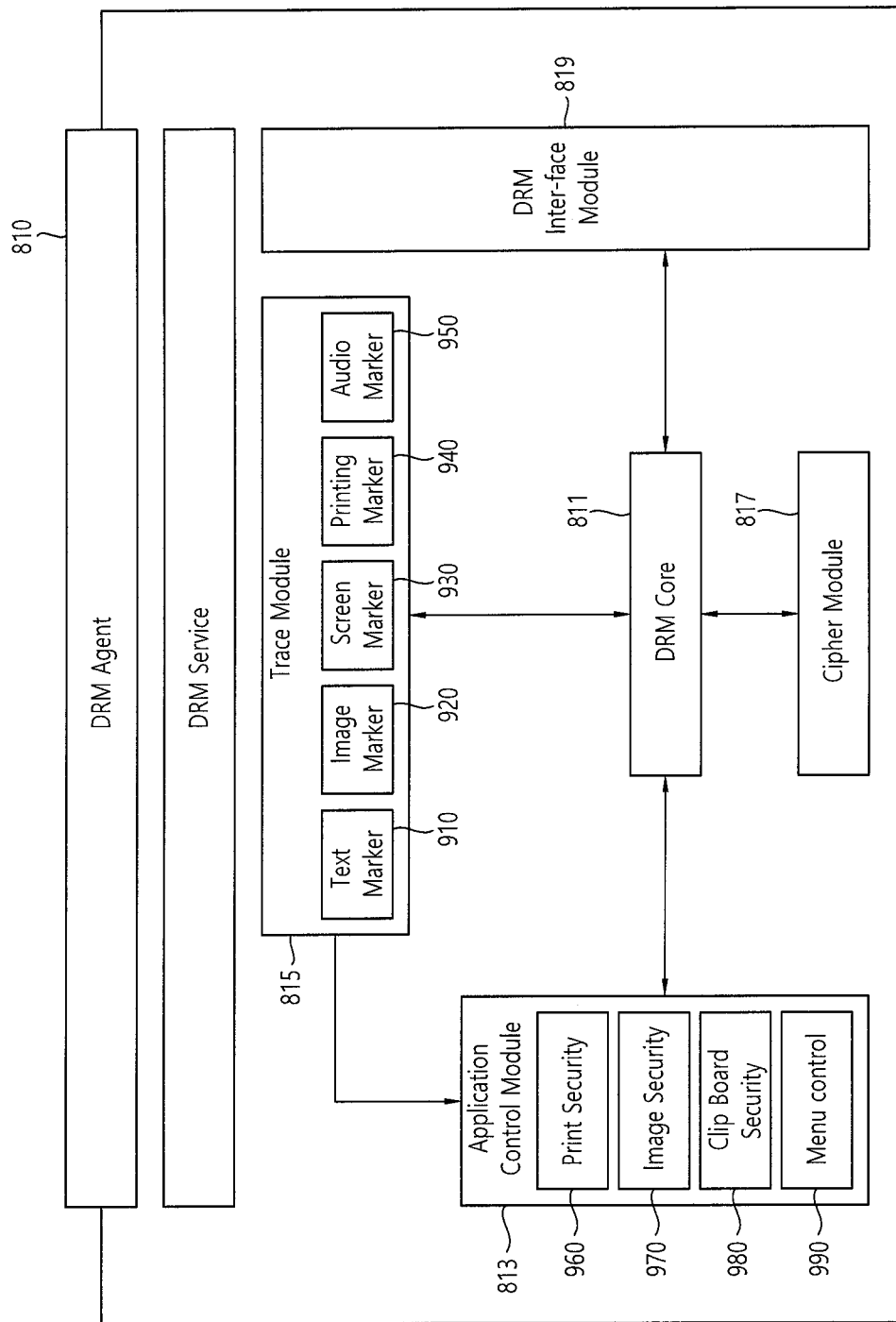
FIG. 9 depicts a block diagram specifically illustrating a tracing module including a text marker, a image marker, a screen marker, a printing marker, and an audio marker.

In the exemplary embodiment of the present invention, 4 sub modules may be employed to control request of a user, including print a security submodule 960, an image a security submodule 970, a clipboard security submodule 980, and a menu control submodule 990, depicted in FIG. 9. Then, the trace module 815 may trace illegitimate user's activity by embedding visible/invisible mark into the text marker 910, the screen marker 920, the printing marker 930, and the audio marker 940 depicted in FIG. 9. Also, in order to implement secure encryption and secure content distribution, the DRM interface module 819 may operate for exchange of authentication data, secure delivery of a set of keys, activating content sharing tool, and enabling secure distribution of content. In this scheme, the DRM core 811 coordinates activities of 4 components and interactions between components.

The trace module 815 of the DRM agent 810 may trace or prevent illegitimate content leakage by embedding visible or invisible security information into logo, image, symbols which are printed in the background of papers, by displaying security information on user device by overlapping security information layer with content layer, by creating text watermark through adjusting inter-character distance and modifying font size and type to represent user's information. And then the trace module 815 may also trace or prevent illegitimate content leakage by reflecting those modification into file format converter for displaying and printing, by generating audio signal to represent security information such as location and time in confidential area and then embedding the aforementioned information into recorded audio signal for tracing recording location and time, by arranging aforementioned activities into the process of saving and converting created content, in displaying content, or in printing content.

The cipher module 817 of the DRM agent 810 enables confidential enterprise content or important content be encrypted and decrypted in kernel level, and therefore be accessible to limited number of legitimate users. The cipher module 817 may encrypt/decrypt digital content created or delivered by monitoring initialization and termination of each process, and interrelationship between processes, by protecting essential processes from external attacks via forcible termination of specific window service and processes, by protecting specific directories, files, and registries, and by collecting event log data generated in kernel level and in the encryption/decryption process, by providing flow control between a file filter driver and a directory cache, by providing encryption/decryption service using various symmetric key encryption/decryption algorithms and asymmetric encryption/decryption algorithms, by maintaining the state of the block in different caches and enforcing through serialization, and by storing and retrieving encryption/decryption keys and security policy in safe storage.

The DRM interface module 819 of the DRM agent 810 may provide an interface between user and the DRM agent 810, by retrieving user's request delivered from application programs, and then delivering the request to the DRM agent 810 for decision-making and action-taking, an interface between the DRM agent 810 and the DRM server 860 by sending user's authentication data from the DRM agent 810 to the DRM server 860, by retrieving and delivering a set of keys and security policy from the DRM server 860 to the DRM agent 810, by collecting user's log data and delivering to the DRM server 860, an interface between the DRM agent 810 and the content sharing tool by retrieving a set of user specified data for sharing content created by the user or delivered from other users, by incorporating input data and the security policy into creating file headers, by attaching a file header to encrypted content body, by delivering integrated content to the user portable device or the DRM server 860 for delivery, and an interface between the content sharing tool and the DRM server 860, by delivering encrypted content with the file header for delivering contents to other users in the internal network or external network.

The DRM client 800 communicates with the DRM server 860 by exchanging user authentication data and multiple keys for content encryption/decryption, but also for adjusting access right of a user. Besides, the DRM agent 810 controls and manages user's activities in response to user request and the predefined access right of a user. the access control is accomplished by triggering the application control modules 813, including a print security submodule 960, an image security submodule 970, a clipboard security submodule 980, and a menu control submodule 990, while encryption/decryption can be accomplished in the client kernel module 840. The DRM agent 810 interacts with the application programs 820 in user level executed by application execution unit. Even if user's activities are triggered by the applications programs 820 or operating system calls, they may be controlled by the DRM agent 810 in user level based on each user's access right and security policies.

The client kernel module 840 is in charge of encrypting or decrypting contents created by the user or delivered through a server system, or physical storage system, by performing ciphering activities in kernel level and by utilizing security storage mechanism implemented in the secure box 850. In this case, the secure box 850 of a kernel level may include a storage region for preventing access from an operating system (OS) by indicating that a specific empty region within a disk is used in a file system region. That is, common access to a specific empty region within a disk is impossible because it is indicated to be used by a file system.

When the content is displayed and manipulated at user device, as it is decrypted before being displayed and manipulated in user level, it can be target of external user's snatching or hacking. That is why the kernel level encryption/decryption is required to protect content while it is displayed or manipulated in decrypted form. In the secure box 850, personal key, enterprise key, and a set of group keys can be stored and retrieved by request of the cipher module 817.

The DRM Server 860 manages authentication, generates and delivers a set of keys and security policy, and controls key changes and access right information, based on organization structure of an enterprise or network structure of client groups. The DRM server 860 may include a server agent 870 and a server kernel module 880. Furthermore, the server agent 870 receives user authentication information from the DRM agent 810 in a user level and performs an operation, such as user authentication. The server agent 870 may include a server interface manager 872 that is an interface with a client device, a user authentication module 874 for performing user authentication, and a server log manager 876 for managing communication with a server and authentication records. The server agent 870 operates in conjunction with a DB 878 for maintaining user login information (for example, a user ID and a password).

Furthermore, the server kernel module 880 may include a secret key regarding client users, a key for managing a security policy, and a policy manager 882.

In the exemplary embodiment of the present invention, even if authorization of a user's involvement in distributing content to other users are allowed to maximum extent, in some embodiments, if necessary, the DRM server 860 may modify access right of content recipient which is specified by the sender. In the area of content distribution, the sender of a content might be a creator of the content or content service provider who holds all the right to the contents. Like DRM client 800, the DRM server 860 keeps important information, including keys, security policy, and access right of each user group or each user, in a secure storage, called secure DB 885.

When a user logs in the multi-tenant DRM server 860, the user goes through multiple steps of authentication process, and then receives a set of keys and the security policy. Authentication process requires the user to verify who claims for a user ID is exactly the user and which can be done by the user ID and a password, or finger printing data, or other bio data to prove that the user is the person who claims to be the user. After user log-in process, all user activities may be controlled and managed by the DRM client 800.

Importantly, in both computing units, the DRM client 800 and the DRM server 860, there are two separate working spaces: user-mode and kernel mode. Because memory in user-mode is generally sharable by various application programs 820 and processes, there is a risk that a hacker can copy a portion of memory in user-mode and then moves the content to other computing device or storage. However, with development of operating systems and advancement of security mechanism, recently the memory of kernel level can be protected from hacker's attack to copy memory content. In FIG. 8, it should be noted that both of client system and server system employ the secure storage for keeping user keys and the security policy in client side in the name of secure box 850, and for generation and keeping user's keys and security polices in server side, in the name of secure DB 885. In fact, the operating system of the embodiment of the present invention can provide this feature of security to confront evolution of malware attacks. User's provided data, such as document body, key to the content, certificate, or the security policy decrypted and manipulated in kernel level may be protected in various operation systems related to various embodiments of the present invention.

Some of window kernel is protected from buffer overflow attacks or other malware attacks. On 64-bit versions of window, the kernel model code signing policy enforces use of cryptographic key assignment to 64-bit device drivers. Thus, regarding some of window kernel, the system wide data structure and memory pools in kernel mode system components can be accessed only while in kernel model and therefore user-mode threats cannot access these memory. Furthermore, if user mode threats attempt to access memory in kernel mode, hardware generates a fault, which in turn the memory manager reports to the threat as an access violation. Based on digital signature and PKI structure, the operating system blocks any applications that are not signed by specific software vendors, the windows app store, and an enterprise itself.

Like the trend of computing technology and devices realized by increased memory capacity, diversified functions, and faster processing speed, protection of user data may be implemented by many other operating systems or peripheral devices according to various embodiments of the present invention. Security features of OS may be different from kernel level memory protection of each operating systems. However, based on sandboxing, library randomization, and EX (execute disable) function, the OS provides security for 'safe box'. The OS utilizes sandboxing to block attackers from tampering with sensitive processes. Library randomization technique can be adopted in the name of Address Space Layout Randomization (ASLR) which dynamically changes the memory locations where different parts of an app are stored. ASLR makes it difficult for an attacker to predict memory ordering and inject some malicious code. Also, built right into the processor, the XD (execute disable) feature creates a strong wall between memory used for data and memory used for executable instructions. This protects against malware that attempts to trick the Mac into treating data the same way it treats a program in order to compromise system.

In the embodiment of the present invention, besides of OS level of protection, the system may have secure location to keep user's key, or certificate. One of the system is related to establishment of TPM (Trust Platform Module) project initiated by a consortium of Trusted Computing Group (TCG). In TPM specification, a binding function encrypts data using TPM bind key which is offered from storage key while sealing function encrypts data in a similar manner to binding. TPM is implemented at a specialized chip in endpoint device that stores RSA encryption keys specific to the host system for hardware authentication. One exemplary TXT (Trusted Execution Technology) defends against software-based attacks aimed at stealing sensitive information by corrupting system and/or BIOScode, or modifying the platform's configuration. Target of TXT is protected execution and memory spaces where sensitive data can be processed out of view of any other software. Also, in TXT, sealed storage shields encryption keys and other data from attack while in use or stored. As in Trusted Execution Environment (TEE), TXT enhances hardware platform security level.

In the embodiment of the present invention, the DRM architecture may be implemented in the environment related to TEE. TEE is a secure area that resides in the main processor of a smart phone (or any smart device) and ensures that sensitive data is stored, processed and protected in a trusted environment. The TEE's ability to offer safe execution of authorized security software, known as 'trusted applications', enables it to provide end-to-end security by enforcing protection, confidentiality, integrity and data access rights. Devices developed according to the recommendations of the TrustZone Ready Program and utilize TrustZone technology, deliver a platform that is capable of supporting a full TEE and security aware applications and secure services.

Although the embodiment of the present invention currently is described as relying on a few implementation of operating systems and hardware storage approaches, a secure location can be provided by various operating systems, hardware vendors, or device vendors in the present invention. Thus, encryption/decryption mechanism in kernel level shown in FIG. 8 according to the embodiment of the present invention can be implemented using other operating systems or hardware freely.

FIG. 9 depicts a block diagram specifically illustrating a tracing module including a text marker, an image marker, a screen marker, a printing marker, and an audio marker. According to these sub tracing modules according to the embodiment of the present invention, the text marker 910 and the image marker 920 are basic building sub modules, while screen marker 930 and printing marker 940 are configured on top of those basic sub modules. The audio marker 950 is configured to trace illegitimate recording of meeting conversation based on audio watermarking technology. In the application control, image security, clipboard control, print security, and menu control may be included.

Referring to FIG. 9, the trace module 815 in the DRM system may handle interactions between sub components of the trace module 815 and, the DRM agent 810 or the application control module 813. Because of diversified functions of user devices and versatile capability of the computing system, encryption and controlling user activity cannot prevent all possible security holes. Furthermore, hackers and malicious users come to possess advanced computing technology and sophisticated techniques that many security flaws have been discovered too late to protect important digital asset. An example of this security flaw was found in a financial analysis firm where DRM system had been deployed and very strong security policy had been enforced. In a case of that DRM deployment, an analyst created very confidential analysis report, and then converted it into a PDF file for circulation, which should be protected by DRM's encryption and access control. However, it was found that an employee in the analysis firm printed an analysis report and then scanned to upload it to some BitTorrent site, a P2P site. That is why DRM system needs trace capability to protect enterprise confidential content or copyright of commercial content.

The DRM systems according to the embodiment of the present invention may provide better security in protecting confidential enterprise content than a DLP (Data Loss Prevention) system by allowing only limited number of users to properly access delivered content, because of encryption and access control mechanism. It is evident that better security can be gained when the content is properly displayed, played, or revealed to only limited number of users, as in DRM systems, than the content is played, disclosed by all the participants in an organization or user group as in the DLP system. However, even if an enterprise content is properly displayed on an authorized user device, there can be security flaws. First of all, a malicious but authorized user can take photo of the content using camera, micro devices, smart phones, etc., as in FIG. 4A to FIG. 4C. Second, a printed content can be delivered to third party, revealing intellectual properties. Or, as described in aforementioned case, the printed content can be scanned and then used to generate a new file, or can be uploaded to other web sites. Third, confidential conversation in a meeting room can be quietly recorded and sent to third party as in FIG. 37.

In the embodiment of the present invention, 4 different sub modules of the trace module 811, including the text marker 910, the image marker 920, the screen marker 930, the printing marker 940, and the audio marker 950 are shown in FIG. 9.

The Text marker 910 may require content converter, such as a PDF file converter, to hide user's information inside text file or file of other forms. The image marker 920 hides confidential information of a user in an image file or a photo file.

The screen marker 930 embeds invisible information or visible information into logo or other symbols displayed somewhere on screen. Frequently, user's information may be displayed on the screen to prevent screen shot using micro devices, camera, or smart phones. The screen marker 930 may be implemented based on text watermark technology and image watermarking with two layered security overlapping technology. The printing marker 940 embeds invisibly user's information into a logo or image symbols which are printed in the background of paper. In other embodiment of the present invention, user's information can be printed visibly in the back ground of the paper. As in the screen marker 930, the printing marker 940 may generate a printing mark on top of text watermarking technology and image watermarking technology with two-layered overlapping information of place and time (location, time) through a generated audio signal.

Even if those sub modules operate independently, they may be used together. The DRM agent 810 enforces the security policy by coordinating activities of each sub module. If an enterprise security policy says that all documents printed through internal printers should employ visible screen mark, the sub module of the screen marker 930 and the printing security sub module 960 of the application control module 813 may be aligned to show visible screen mark on user screen. Furthermore, like the printing security submodule 960, the application control module 813 includes an image security submodule 970, a clip board security submodule 980 and a menu control submodule 990 for controlling menus. These security components modules are consisted to manage user's request of access memory for image capturing, printing, block copying, and menu manipulation.

According to another embodiment of the present invention, the application control module 813 may also comprise a session agent module (not described in FIG. 9) configured to install command filters into each process, monitor user's request through application the command monitoring modules, relay user's request of log-in through a client interface manager, send request of encryption/decryption to the kernel-level client agent, arrange initialization of the security component module, and handle a request of content distribution through the content sharing tool. And the application control module 813 may also comprise a service launch module (not described in FIG. 9) configured to install the application monitor module to each application program, and the client interface manager (not described in FIG. 9) configured to manage user authentication process, delivery of keys and security policy, log data in a communication with a multi-tenant server, and manage user's request of content sharing by displaying the content sharing tool and enforce security policy in specifying access right of content recipients. In addition, the application control module 813 may also comprise an application monitoring module (not described in FIG. 9) configured to check access right of a user for a content and send information to the session agent module.

The session agent module in the application control module 813 may install the command filter in each process with initialization of the service launch module to retrieve information of user activity. And regarding the session agent module, user's request, other than log-in and content distribution triggers activity of the application monitoring module and the command filter in a process, and activates the session agent module for decrypting the content file, if it is allowed, and for arranging appropriate actions of the security components.

And the request of saving a newly created content automatically leads to encryption in kernel level with the randomly generated content key, the access right determined in a combination of the security policy, the attributes enforced by the server system and user specified security level, and it also leads to encryption of the content key with one of the groups key into content header, and encryption of key index number into base header with PKI-private key or enterprise key.

In addition, the request of opening an existing content file triggers activity of the application monitoring module to check access right of the user for the content, whether the content should be properly decrypted and properly presented to the user, whether editing should be allowed, whether an image capture should be allowed, whether a printing should be allowed, whether the third party transfer should be allowed, whether a block copy should be allowed, or whether the content should be deleted from the storage. And the request also triggers activity of the application monitoring module to perform decryption process in the kernel-level client agent with the PKI-private key or decrypting the file with enterprise key stored in the secure storage in the client kernel agent or the hardware secure storage.

If the user's request belongs to one of the following instructions, 'image capture', 'print' or 'block copy', the session agent module checks whether the request should be accepted or not with the application monitoring module and if the request should not be accepted, the session agent module activates security components module to block the request.

The Content file delivered by the session agent module in user-level client goes through multiple steps of encryption in kernel-level with keys retrieved from the secure storage when user's requests of one of at least 'save', 'read' and 'print' are accepted by application monitor In some embodiment of the present invention, user log-in request is delivered to the DRM server 860 performing authentication process based on various information of a user, and when the authentication process is successfully finished, the information of a personal key, group keys, an enterprise key, and the PKI private key is delivered from the DRM server 860 to the client interface manager. And user's request of content sharing triggers displaying the contents sharing tool in which a user specifies user group for sharing, and access right of each group, for the content which is delivered through physical storage media or the DRM server 860.

The client interface manager communicates with the multi-tenant security server 860 for authentication of a user, delivery of keys and the security policy from the DRM server 860 to the client 800, management of user's log data, and management of content sharing. And the multi-tenant server 860 generates the PKI-private keys, the group keys, the security policy for users in kernel-level, keeping those data into the secure storage and delivers those data to the client through the server interface manager in user-level, keeping log data in the user database.)

Figure 10:
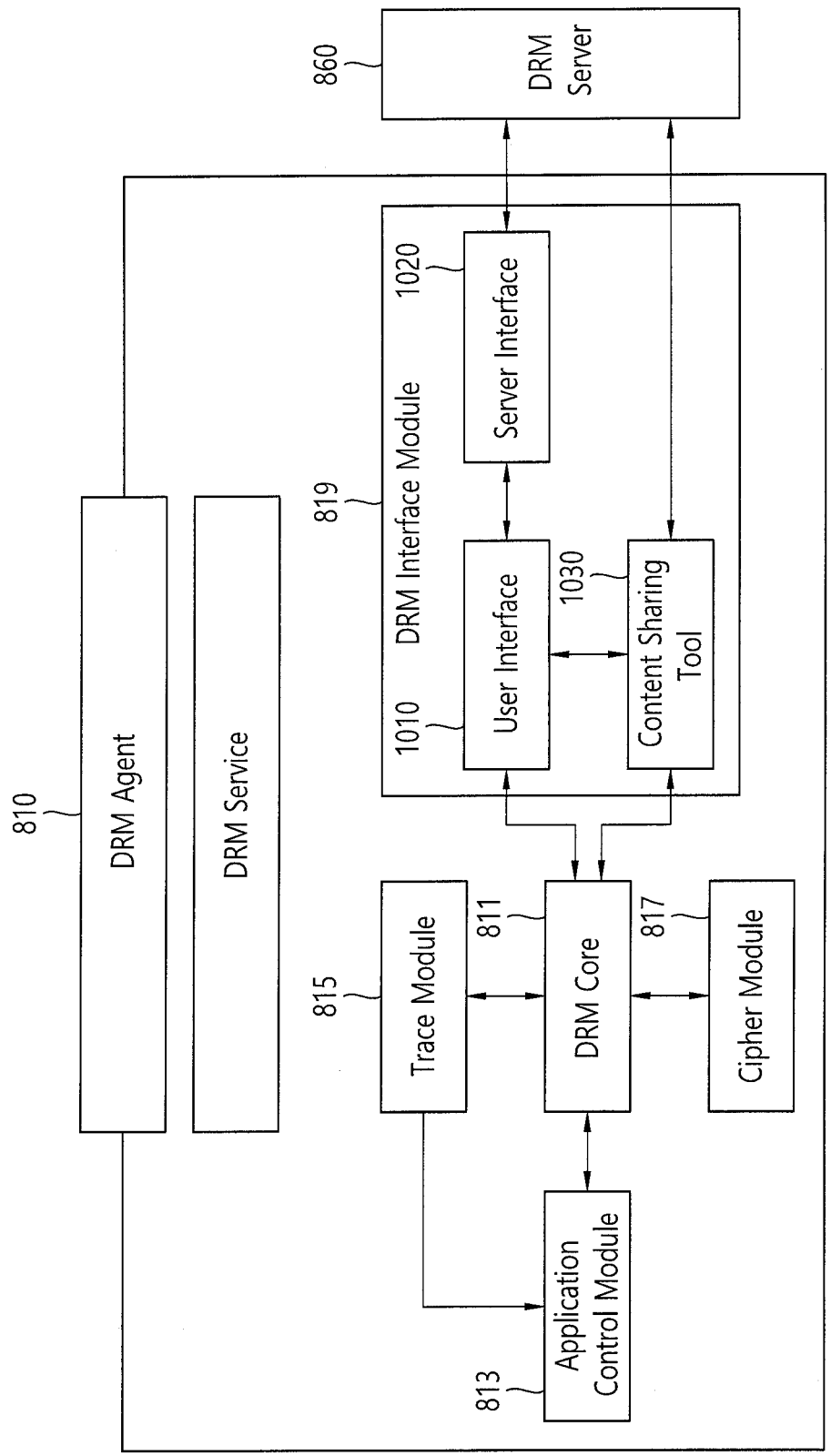
FIG. 10 depicts a block diagram specifically illustrating DRM interface module.

FIG. 10 depicts a block diagram specifically illustrating the DRM interface module. As shown in FIG. 10, the DRM interface module 819 may consist of a user interface 1010, a server interface 1020, and a content sharing tool 1030.

Referring to FIG. 10, whenever a user request or system resource request are delivered to the DRM system, for example, file encryption, file decryption, print file, file format conversion, file delivery to third party or internal users, logo printing, screen capturing, or others, they should be delivered to and handled by the DRM core 811. However, the initial input from and final output to end-users should be delivered and handled by the DRM interface 819.

The user interface 1010 receives log-on data when a user initiates authentication process to access business platforms, such as an ERP system, a groupware system, a PLM (Product Lifecycle Management) system, or a DMS (Document Management Systems). In general, the business platforms keeps confidential enterprise content and therefore frequently are integrated with DRM systems. Possibly the authentication data is delivered from the DRM agent 810 to the DRM server 860 through the DRM interface module 819. When the authentication process is successfully finished, then a set of keys and the security policy are delivered to the DRM agent 810 through secure interface such as PKCS#5 to keep into the secure box 850.

The DRM Interface module 819 may take a set of input data from a user for sharing content with internal users or users of external partner organizations, and then incorporate those data into creating file header. The content body is encrypted with a randomly generated number using symmetric key encryption algorithm and then a set of headers may be attached. A completed file is sent to the DRM server 860 by the DRM interface module 819 for sharing. The DRM server 860 may consider various organizational factors, such as input data, security policy applicable to the user, status and access rights of recipients, and compatibility of users' key with access right of a recipient, and then generate a set of access rights for recipients to send to each recipient. Whenever tracing is required, because of enterprise security policy, or special consideration of the user status, a set of tracing marks are generated and sent to the application control module 813 or the DRM interface module 819 through the trace module 815.

Generation and assignment of access right of each user is very similar to the role of distribution center for commercial content, such as music, movie, cartoon, e-book, newspaper articles, or research articles. The DRM server 860 in distribution center considers payment conditions, license policy, status of each user devices and requests, and general distribution policy before creating file headers and encrypting content body and then sending to each user. Likewise, when tracing is required, because of general distribution policy or special consideration of the user status, the tracing mark may be generated and sent to the application control module 813 or the DRM interface module 819 through the trace module 815. Especially, in case of premium sports broadcasting system, the distribution center creates a video watermarking data using the user ID and other accessory information, and embeds watermark into video streaming to identify users who illegally resend the commercial contents to under-paid users. Also, movie-related R&D consortium, publishes a technical specification for movie distribution in which the watermark should be inserted on the server or on the client such that the valid insertion is guaranteed even if the device and its secrets are compromised for tracing breaches.

Figure 11A:
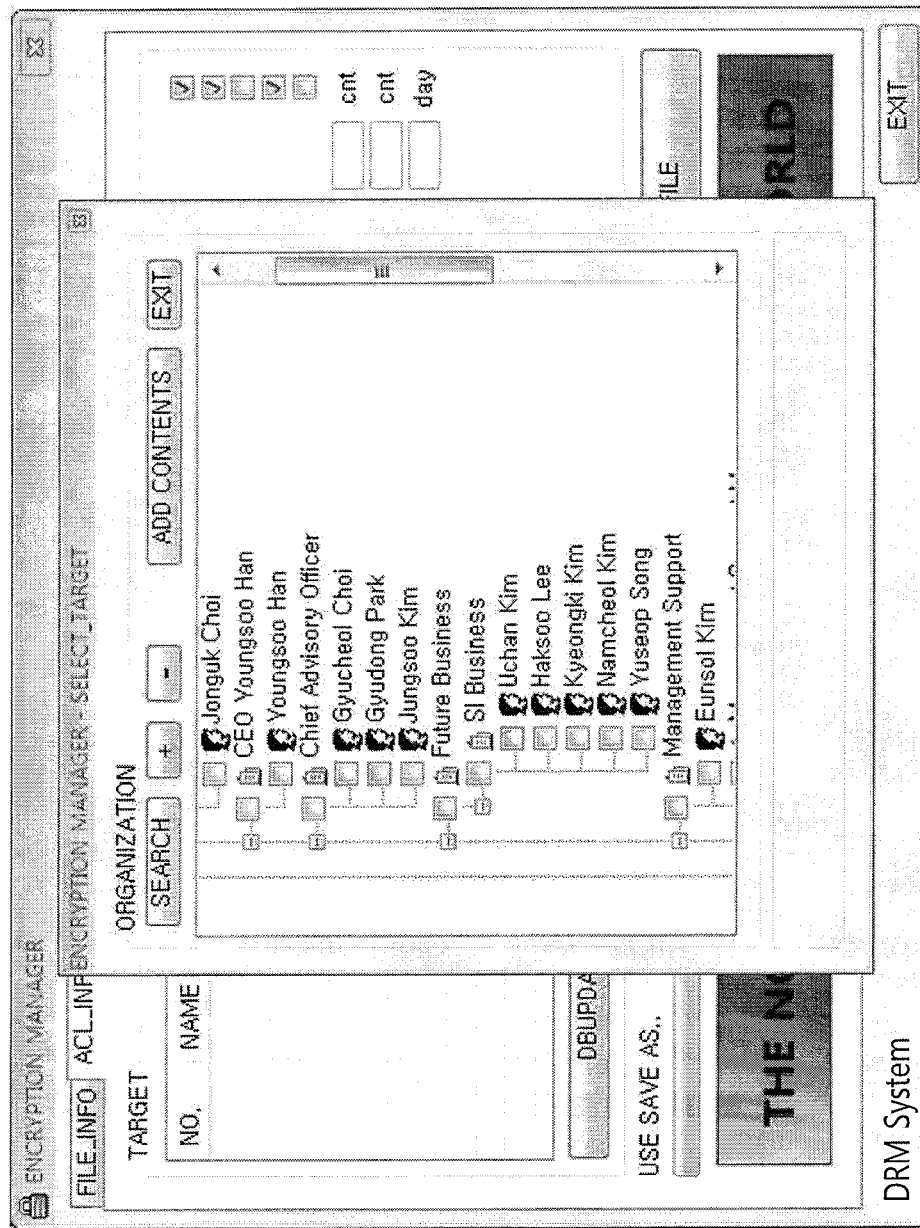
FIG. 11A and FIG. 11B depict a content sharing tool according to an embodiment of the present invention showing that a user requests of distribution of documents can be managed by the content sharing tool.
Figure 11B:
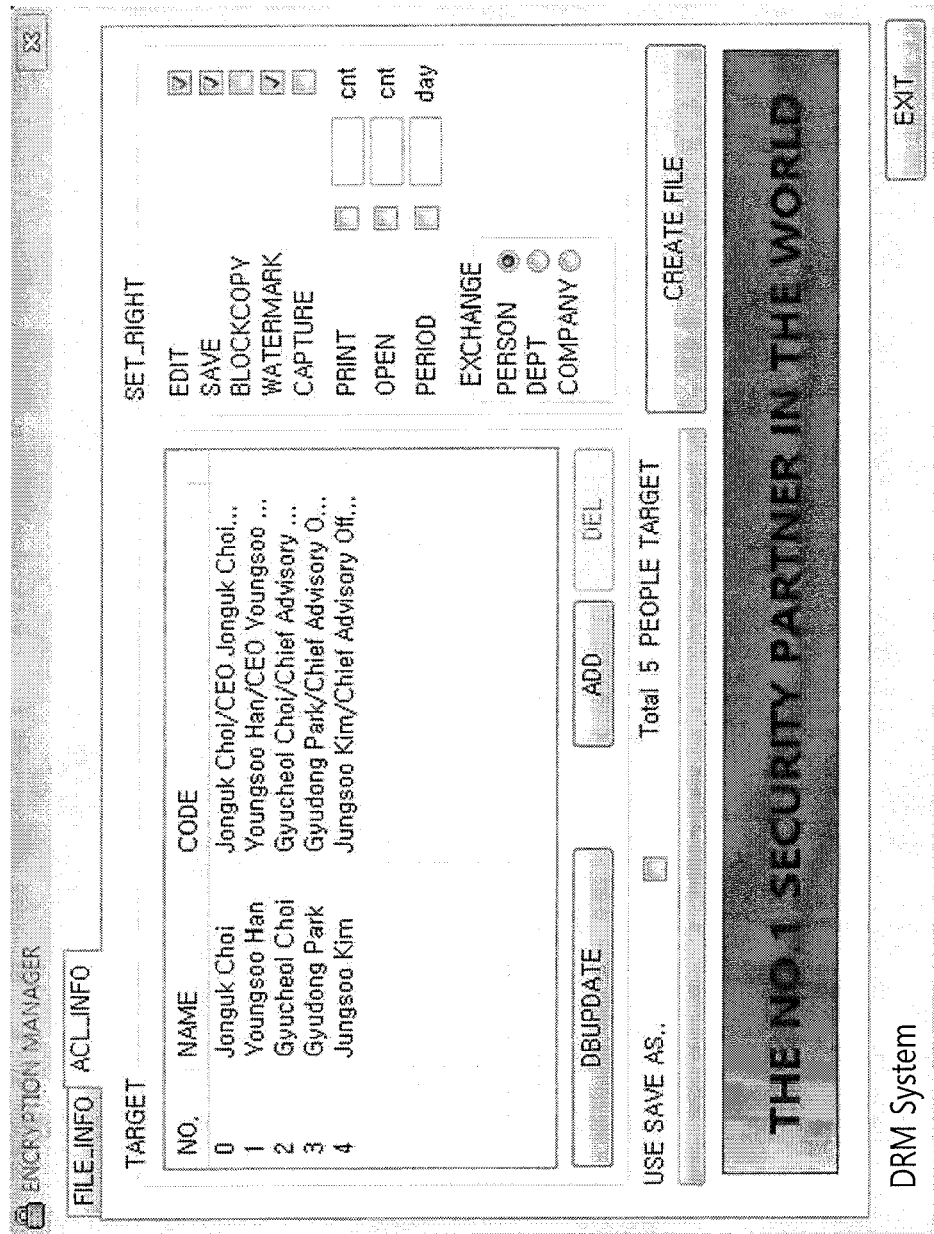

FIG. 11A and FIG. 11B depict content sharing tool according to an embodiment of the present invention showing that user requests of distribution of documents can be managed by content sharing tool. As shown in FIG. 11A and FIG. 11B, using the content sharing tool, author of document or distributor can specify recipients and access right of each recipient.

Referring to FIG. 11A and FIG. 11B, the content sharing tool of the present invention is a part of DRM system developed to distribute enterprise content to insiders, partners, or outsiders. At first, an author of enterprise content may select content from the content sharing tool by clicking directory box or file name inside the directory. In the second step, the author may select recipients from groups of users, insider, partners, or outsiders. The list of recipients may be newly created, or added to existing list, or deleted from the existing list. If there is an existing recipient list, for example, an organization chart of an enterprise, the author can select recipients by clicking depicted charts. In case of internal circulation, the author can pick group of users, or individual users by clicking the box inside the organization chart. In the third step, the author may authorize access right of each recipient, or user group.

As shown in FIG. 11B, the access right of each recipients can vary, depending on position, department, or job assignment of each recipient.

In FIG. 11B, it is shown that there are various access rights controlled by the content sharing tool, eventually a part of the DRM system: edit, save, copy, watermark, capture, allowed 'print' x times, allowed 'open' x times, allowed keep the content x days, allowed transfer to individual users, allowed transfer to department, allowed transfer to company, and then 'save' as y file name. Even if the DRM system developed in the present invention can provide a comprehensive list of access control, it can be adjusted to need of author, extended to a longer list of access control, or made shorter to a simple control list.

In the access control, the 'edit' is an important access right allowing various activities, modification of content, copy and paste, or printing. From the perspective of text watermarking, this feature of 'edit' might be important factor. When a user is allowed to 'edit' content, text watermarking becomes useless, because the user can change font type, font size, inter-line distance, inter-word distance, or even page number. On the other hand, when the author specifies 'no edit' for content distribution, there is a possibility that text watermarking should be embedded. The 'save' in access control list specifies whether the user can save the content only on user device. If the user is not allowed to 'save' the content, then the user can open and read the content properly. However, the user is not allowed to 'save' the content, he or she may lose the content from the memory permanently, when the user device is turned off. The 'copy' in the list of access right allows the user to make copy of part, or all the content in memory and move to other content. If the user is not allowed to make 'copy' of the content, the user cannot make 'copy and paste' or 'copied and create a new file using copied content'.

The 'watermark' here in FIG. 11B indicates that several tracing mechanisms are available and can be selected by authors: 'text watermarking only', 'image watermarking only', 'text watermarking with image watermarking in created document', '2nd visible watermarking', '2nd invisible logo watermarking', 'visible print watermarking' or '2nd print watermarking', and others. The watermarking mechanisms will be described in following paragraphs. Capturing in user device can lead to very serious information leakage by allowing the use to capture a part of content, or all the contents decrypted in the memory to move to other contents. Particularly as there are various powerful capture tools available in internet, there are so many different ways the user can create another content file from received content. Technically, blocking 'capture' function of recipient might be one of the most difficult part of the DRM system.

The DRM system may endorse the user to 'print' x times only, which is counted by the DRM agent on a user device. When the number of printing reaches the maximum number, the user is not allowed to print the received content any more. Sometimes, the user attempt to print more time than allowed number using a network printer or a virtual printer, which is strictly blocked by the DRM agent. Also, the DRM agent monitors the number of times of 'open', or days of 'keep' the content. When the maximum number of 'opening' or the deadline of 'keeping' the content, the DRM agent automatically deletes the corresponding content. Allowing the user 'transfer' might be very important. In the DRM systems, right of 'transfer' is continuously monitored and controlled by the DRM agent. There can be various types of transfer in author's perspective: transfer to individual users inside the same enterprise, users in the same department, or users in the same company. This 'transfer' functions is closely related to tracing function of the DRM system, proposed by the present invention. The item of 'transfer' should be elaborated in the following items, which can be again related to 'watermark' item in the control list.

Based on the content sharing tools, the DRM system of the embodiment of the present invention may build up the tracing module of the DRM system with text watermarking, image watermarking, 2nd visible watermarking, and 2nd invisible logo watermarking. At first, the text watermarking sub-module in which document conversion and text watermark embedding are included is described in detail. Then, another basic watermarking sub-module useful in hiding secret data such as a user ID, a device ID, or a content delivery date, is described in detail.

Text Watermarking Technology

Text watermarking technology is needed to trace malicious internal users who attempt un-authorized transfers of confidential information to third party. Employees of partner companies or external hackers can also be involved in information leakage. Basically the power of text watermarking comes from imperceptibility of hidden information in distributed documents/data. Even if every user in a collaboration group believes that they are reading the same document, but in fact everybody has different document. Therefore, text watermarking can provide excellent tracing capability to the enterprise security officers in case of information leakage. Also, installation of text watermark can discourage possible attempt of information leakage. Furthermore, when text watermarking is used in alliance with the DRM component of encryption and access control, it can be part of a powerful deterrence in information leakage.

However, one important drawback of text watermarking is that the document itself should be converted into target file format, such as PDF, CSD, or others, so that secret information should be invisibly embedded into the target file. Because a user is allowed to edit the original file other than the above file formats by modifying font size, inter-word space, inter-line space, or others, watermark embedding may be useless. A document may be easily forged or modified to nullify efforts of embedding invisible information into the original document. Also, it is because MS Office, currently the most popular document editing tools in the market does not allow the enterprise security officers to embed forcibly the text watermarking into document editing process. That is why the original document of an author should go through the format conversion process to embed the text watermark into the document.

According to the embodiment of the present invention, if the original document is converted into the target file format which can be controlled by a viewer, much better security can be imposed on the document. For example, when a MS Office document is converted into and distributed in the PDF file format, the text watermark can be embedded into the process of file format conversion. Furthermore, if a DRM built-in PDF viewer of the present invention is deployed, then access right of the recipient can be controlled and managed by the viewer.

Figure 12:
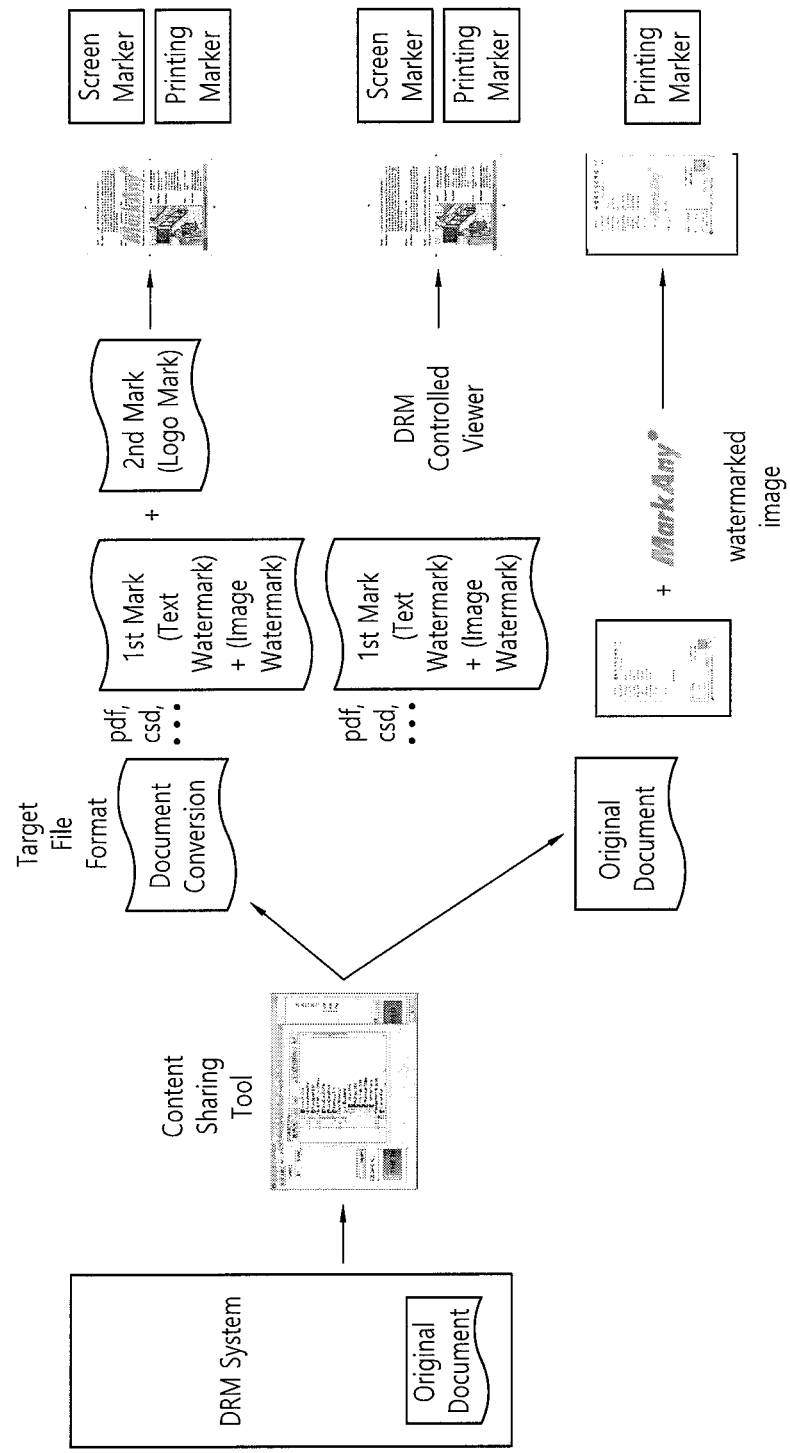
FIG. 12 depicts a flow chart specifically illustrating operations of document tracing module in enterprise security.

FIG. 12 is a flow chart specifically illustrating operations of the document tracing module in enterprise security. As shown in FIG. 12, the first module converts the original document into another file formats and then embeds text watermark or image watermark before controlling access right of a user. To the contrary, the second module does not convert file format and therefore does not attempt to control user activities. Instead, it can embed visible, or invisible print mark using image watermarking technology to trace illegitimate leakage.

Referring to FIG. 12, the tracing module of the DRM system according to the embodiment of the present invention may include two different modes of content file format handling. In file-format conversion mode, the original document/data can be converted into different file format to embed secret data such as a user ID, a device ID, a delivery date, IP information, etc. into the converted content. In this mode, the screen mark and the printing mark can be created based on text watermarking and image watermarking as a 1st watermark, and then invisible mark called logo mark as a $2^{nd}$ watermark.

To the contrary, in original file format mode, as the MS office is dominating file creation and editing market currently, screen manipulation is not allowed, and therefore the screen mark cannot be generated. However, in this mode, the printing mark can be created and printed, in which secret data such as a user ID, IP information, or a printing date, can be hidden inside the logo symbol using image watermarking algorithm.

File conversion may be necessary to embed secret information into the created document in current situation when some document editing tools are able to provide functions to modify some editing features by the user. In embedding user's information into the original text document, there can be two problems. At first, because document editing tools currently available in the marker do not allow users to control editing process, such as modification of inter-word space, inter-line space, or font configuration, and therefore there is no way the text watermarking system can take over the control of the editing tools. Certainly, a user can change the style of editing and the font configuration by specifying editing variables, but cannot control inter-word distance, or inter-line space. Most document editing tools do not allow the enterprise security officers to embed forcibly text watermarking directly into document editing process. That is why the original document of an author should go through format conversion process.

Second, if a user can modify inter-word distance or inter-line spaces, there can be a forged document which claims ownership of innocent users, when a document is illegitimately leaked out. That is, if a user is allowed to edit the original file by modifying inter-word space, inter-line space, or others, watermark embedding can be useless. The document can be easily forged or modified to nullify efforts of embedding invisible information into the original document. Even if file-format should be converted to avoid possible forgery and accept inevitable market situation, file conversion might be better in embedding invisible information and controlling use of the document.

If the original document is converted into target file format which can be controlled by a viewer, a much better security policy of an enterprise can be enforced through the file viewer. For example, when an MS Office document is converted into and distributed in the PDF file format, the text watermark can be embedded into the process of file format conversion. Furthermore, if a DRM built-in PDF viewer is deployed, then the access right of the recipient can be controlled and managed by the PDF viewer. This advantage can be accomplished not only in file-format conversion into PDF, but also in other file formats, for example, CSD, Think-free, or others.

In the embodiment of the present invention, when the original documents are converted into the target file format and then the text watermark is embedded. Image watermark in a text document can be embedded as a supplementary measure to confirm accuracy of information hidden in text watermark. These two watermarks, text watermark and image watermark are called $1^{st}$ watermark. Then, when the document is displayed on user's terminal, the screen mark can be overlaid. In other embodiments, the printing mark can be printed on paper. Those tracing mechanism, the screen mark and the printing mark are called $2^{nd}$ watermark. Even if the $1^{st}$ watermarks should be invisible, the $2^{nd}$ watermark can be visible or invisible, depending on the requirement.

Justification of employing image watermarking as a supplementary measure is as following. The text watermark elaborated in the following sessions can be embedded into the file-format converted document to identify where the document was delivered to, using user ID information, IP information, device information or a delivery date, etc. Because this text watermarking is embedded into text document repeatedly, it is very hard to embed information mistakenly and then interpreted wrongly. However, in order to confirm the hidden information or in order to reveal user information or device information when a portion, specifically image portion is photo-taken or leaked out, the image watermarking might be very useful tool. That is why the text watermark and the image watermark are called '$1^{st}$ watermark'. Then, the $2^{nd}$ watermark, frequently in the forms of user name, or company logo which embeds various information including a user ID, a device ID, or other information may be added to the $1^{st}$ watermarked document for displaying on the user screen (screen mark) or for printing document (printing mark). In the embodiment of the present invention, the $2^{nd}$ watermark is sometimes called 'logo' watermark which can hide various information into a symbol, the printed name, or the company logo.

Even if most original documents should be file-format converted into the target file format in order to embed the $1^{st}$ watermark and the $2^{nd}$ watermark, there may be an exceptional case. The printing mark may be embedded visibly or invisibly into original documents edited in MS Office. Even if the screened document/data and the printed document/data are exactly the same from the view of system level, most editing tools, including MS Office, allow users to take control printing process in which tracing information can be embedded. In other words, the original document/data may go through overlaying process in printing stage where various information is embed into the printed logos, symbols, names, or others to identify who leaked out the printed document. As in the case described in FIG. 4A to FIG. 4C, a legitimate user can print delivered document and scan it before uploading to P2P site. In this case, if the document has watermarked logo or symbols in printed paper, the user who leaked out the document can be easily identified.

Figure 13:
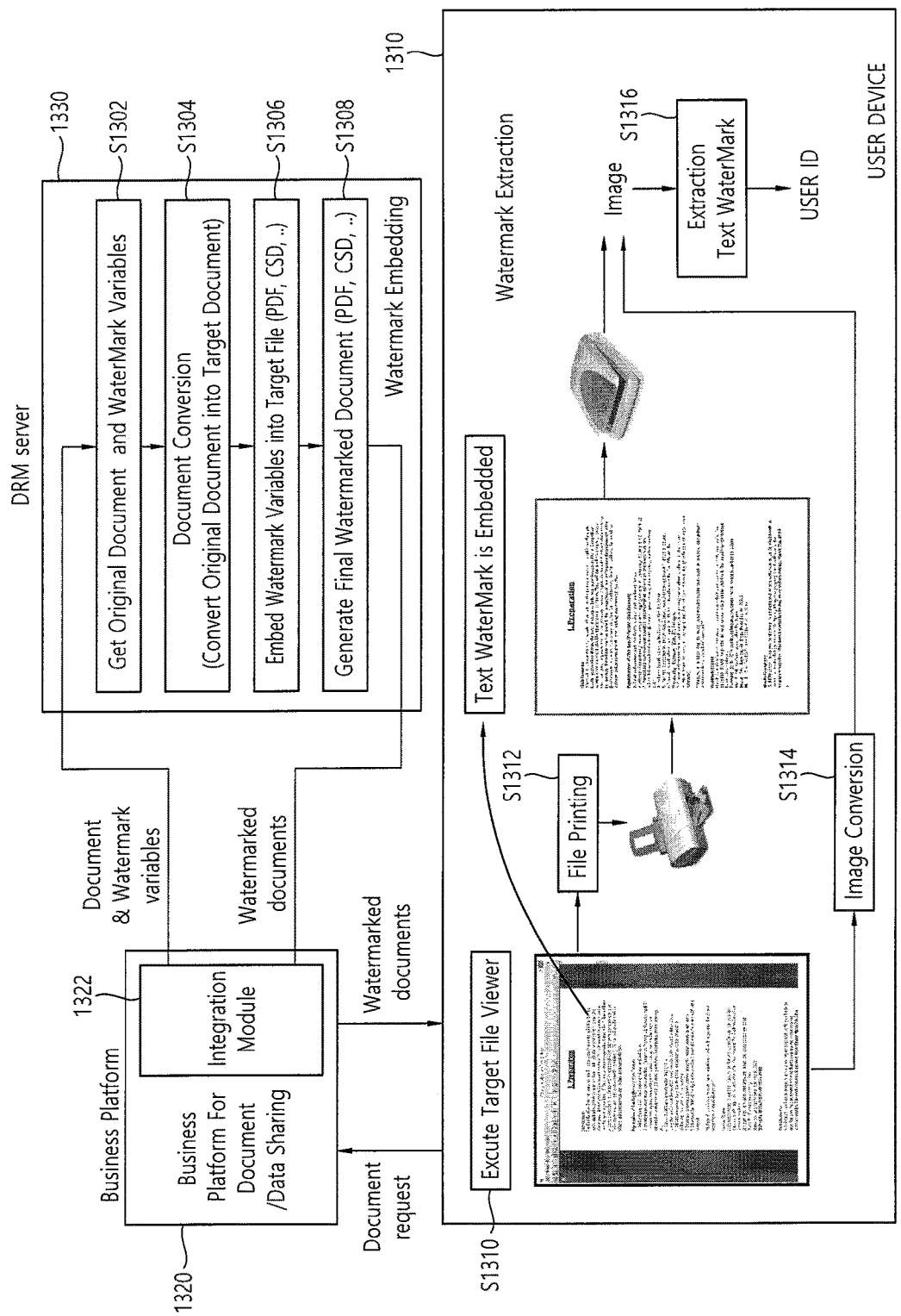
FIG. 13 depicts a flow chart illustrating text watermarking system in which the original document is converted into a target file format to hide information of a user, and which access right of a user to the document is controlled by a document viewer.

FIG. 13 depicts a flow chart illustrating text watermarking system in which the original document is converted into a target file format to hide information of a user, and which the access right of a user to the document is controlled by the document viewer.

Referring to FIG. 13, a text watermarking system according to the embodiment of the present invention shows that four components are involved: file conversion, text watermark embedding, file distribution, and text watermark detection/extraction in implementing watermarking. It is described in the sequential processes of document creation, including a request of document distribution through various ways, a file conversion into target file format, a text watermark embedding and then a document distribution to end users, and a watermark detection/extraction when a document is leaked out by malicious users. In this scheme, the file format of the newly created or modified document is converted purposefully into the target file format for embedding watermark and controlling flow of documents. The issue of file conversion discussed in previous session is re-considered.

Document Creation and File-Format Conversion for Distribution

In general, the enterprise documents are created using many popular editing tools, such as MS Office, Google Docs, HanCom Office, Open Office, Polaris Office, Think-Free, EditPad, and others. Currently, the MS Office is dominating in the market of document editing tool. The emphasis of installing those editing tools lies in convenience of users and richness of application programs. However, when the created document should be delivered to others for review, report, discussion, or decision-making, one of the important consideration lies in security. Especially, in enterprise computing environment, security might be the most important consideration. For the reason, the enterprise security officers increasingly pay attention to document distribution which requires strong security measure in assuring prevention of un-allowed information leakage. Because the digital document can be easily modified and forged, when an original document is illegally modified and delivered to legitimate users, it can make serious damage. Also, if a confidential information is leaked out through network and delivered to the third party, it can bring fatal damage.

In consideration of a secure document/data distribution according to the embodiment of the present invention, there are two ways: distribution of original contents with the DRM system, and distribution of the file-format converted contents with watermarking information. As explained above, the DRM system allows authors to distribute original contents without any modification, letting recipients edit, print, transfer, copy, copy & paste, or others which are strictly controlled by access control mechanism of the DRM system. Encryption and access control are major deterrence of illegitimate activities of malicious users. The distribution of document using the DRM system according to the embodiment of the present invention is very effective in enterprise computing, especially in groupware or DMS (Document Management System) systems. Even in a ERP system, the DRM according to the embodiment of the present invention is a very powerful enterprise security mechanism in preventing illegal leakage of confidential information.

To the contrary, in other environment, enterprise security requires content distribution in converted file-format to embed invisible information into the document and to enforce access control of the recipients. Even if file-format conversion adds extra burden and inconvenience, this method can be preferred by security officers, because it can enhance security level and deterring possible information leakage. That is why the PDF file conversion and distribution is very important in the DRM system, even if the original document frequently may be created in MS Office editing tool.

In FIG. 13, an exemplary text watermarking system of the present invention consists of a business platform 1320, a DRM server 1330, and a user device 1310. The business platform 1320 may be a system and it may be a software program installed in the DRM server 1330 and/or the user device 1310. The business platform 1320 can distribute data, documents, or contents for collaboration of internal users or with outside users of partner organizations. Examples of this business platform 1320 are a groupware system for e-approval or business flow control, a DMS (document management system) for sharing documents/files internally by providing search function and digital delivery of the content, or a medical record sharing system in hospital clinics to support an update, a retrieval, a modification of medical records. The business platform 1320 has an integration module 1322 configured to integrate text watermarking-related information from the user device 1310 and the DRM server 1330.

In the business platform 1320, frequently original documents are stored to support search and retrieval for information sharing. When a user tries to download documents by sending requests to the business platform 1320 which in turn sends the requested document to the DRM server 1330 for file-format conversion and watermark embedding.

In other environments, those original documents are created and stored in the user device 1310, such as a PC, or a lap-top computer. When a user tries to distribute documents to other users, he or she can use the content sharing tool, as described in FIG. 11A and FIG. 11B, to specify recipients and the access right of each recipient. Then, the original documents are sent to the DRM server 1330 for file-format conversion and watermark embedding.

File-format conversion and watermarking embedding are conducted in the DRM server 1330. The DRM server 1330 may be a DRM server which attached user's access right for the distributed document and then encrypts the document before sending to the recipient's device 1310, depending on user's position, a department, and a job assignment. On the other hand, the DRM server 1330 may be one of digital government's servers for inter-ministry information sharing, or document repository server of private organizations. The role of the DRM server 1330, or a document distribution server is to convert the file-format, embed the secret information into the document, and attach the access right of recipient before delivery to end users.

With user's request, the original document with watermark variables is sent to the DRM server 1330 (S1302). Watermark variables include information of a user ID, an IP address, a delivery time, or user's location data. The variables of text watermarking, such as (m, n, p)=(page alternation, line alternation, and initial watermark mode), can be included in the watermark variables. The requested original document is converted into target file-format (S1304), generally a PDF file, or a thinkfree file, a Polaris file, or a CSD file format in limited cases. It should be noted that the file format for conversion and distribution is not limited to only the above two formats, including PDF and CSD, exemplified in the present invention. Many other files formats can be employed for text watermarking such as PDF, CSD, or others. Then text watermark is embedded based on the watermark variables, producing the watermarked document. The DRM server 1330 converts the format of the original document into the format of a target document, inserts the watermark variables (S1306), and generates a final watermark document (S1308).

In the DRM server 1330, whether it is the DRM server 1330 or the document repository, the original document is delivered from the business platform 1320, before distributing to the multiple users or in downloading process. When watermark embedding is finished, the document can be sent to the business platform 1320 for distribution or downloading to the user device 1310.

When watermarked document is sent to the business platform 1320 from the DRM server 1330, it is delivered to the user terminal 1310. When the watermarking of the requested document is completed, the watermarked document is provided to the user device 1310 again. The user device 1310 executes the target file viewer (S1310). The target file viewer in the user terminal 1310 controls user activities by enforcing the security policies and the access right usually encrypted and hidden in a file header of the delivered document. When the document is printed at user's side, the printing mark may be embedded into the printed document to identify a user ID, visible form or invisible form (S1312). In this embodiment, the "print" may be performed in a paper form by an actual printer, may be performed as a PDF document through a PDF printer, or may be performed in the form of an image through an image conversion. The watermark variable, such as a user ID, may be obtained by extracting the text watermark from the generated image (S1316). If the watermarked document is photo-shot, or video captured and then available, image of the document can be analyzed to identify a user's ID, a device ID, a IP address, or other information by detecting/extracting watermark information.

DRM Added to File Conversion

The file format, CSD, mentioned in exemplary case of text watermarking, may be used in very limited cases. In the military organizations requiring strict control of document access, rather than providing high accessibility to many people, this file format might be useful in securing document distribution. In designing the inter-ministry information sharing center, file conversion for enforcing strict security policy can be considered and adopted. Because the requested information between ministries are generally very sensitive or personal information, such as tax information, criminal records, passport records, or high-level national security information, those information should not be re-distributed to the third party, edited, or printed. The best policy in this situation might be employment of some document file format with very strict rule, allowing only the limited access, such as 'read x times', 'no print', 'not transfer to third party', 'not edit', or 'no copy and paste'. In another case of public service, a local government tries to open very sensitive information, a district rebuilding and a renovation plan with invitation of a public opinion and a interested group, to the public with restriction of opening to very limited group of people. The people involved in this plan can download document, print, and read all opinions of others, but cannot distribute document/data to others. In this situation, text watermarking with viewer is an excellent distribution tool.

The issue related to whether the authored document/data can be distributed in the original file format, is related to possible 'data forgery' issue when users are allowed to edit the document or data. Because the text watermark relies completely on embedding invisible information into the text data in document or data sheet, if a user is allowed to edit the document or data, text watermark can be useless. Especially, the DRM system proposed in the embodiment of the present invention may distribute document in the original file format for internal circulation or sharing confidential information with cooperative partner organization. In order to avoid possible controversy over accuracy of secret data hiding and extraction or whether the extracted secret information from the text watermarked document is accurate or not, image watermarking can be used as a supplementary measure. Even if the text document or datasheet can be edited, that is, easily forged, invisible information embedded into graphic data and image included in a logo, a diagram, or a presentation image of the document, the data sheet cannot be easily deleted or forged without knowledge of signal processing. Without specific detection tool of image watermarking and original document/data sheet, modification of image watermarking is very difficult, even if not impossible.

The other way to go around the distributed document in the original file format with editing tools may be adding another step of file conversion: MS office file into the target file format (pdf, CSD, ThinkFree, Polaris, Google Docs, etc.), embedding text watermarking information, and then again conversion into the MS office. Even if this long process of the file conversion might be possible to implement, it is not recommended.

When the original document is converted into the target file format, it can be controlled by the file viewer, such as PDF, CSD, or others. Basically, the watermarked document with the access right information in the file header can be easily controlled by the viewer in the PC environment or the mobile phone environment, by managing 'number of times for reading (opening) document', 'number of printing document', 'save', 'transfer to the third party', 'expiry date', 'drag & drop for copy', 'screen copy' or others. Different from the DRM system of the embodiment of the present invention, in this computing environment, the end user device may not need a separate DRM agent for controlling user access right. Instead, the file viewer may control user's access right.

Figure 14:
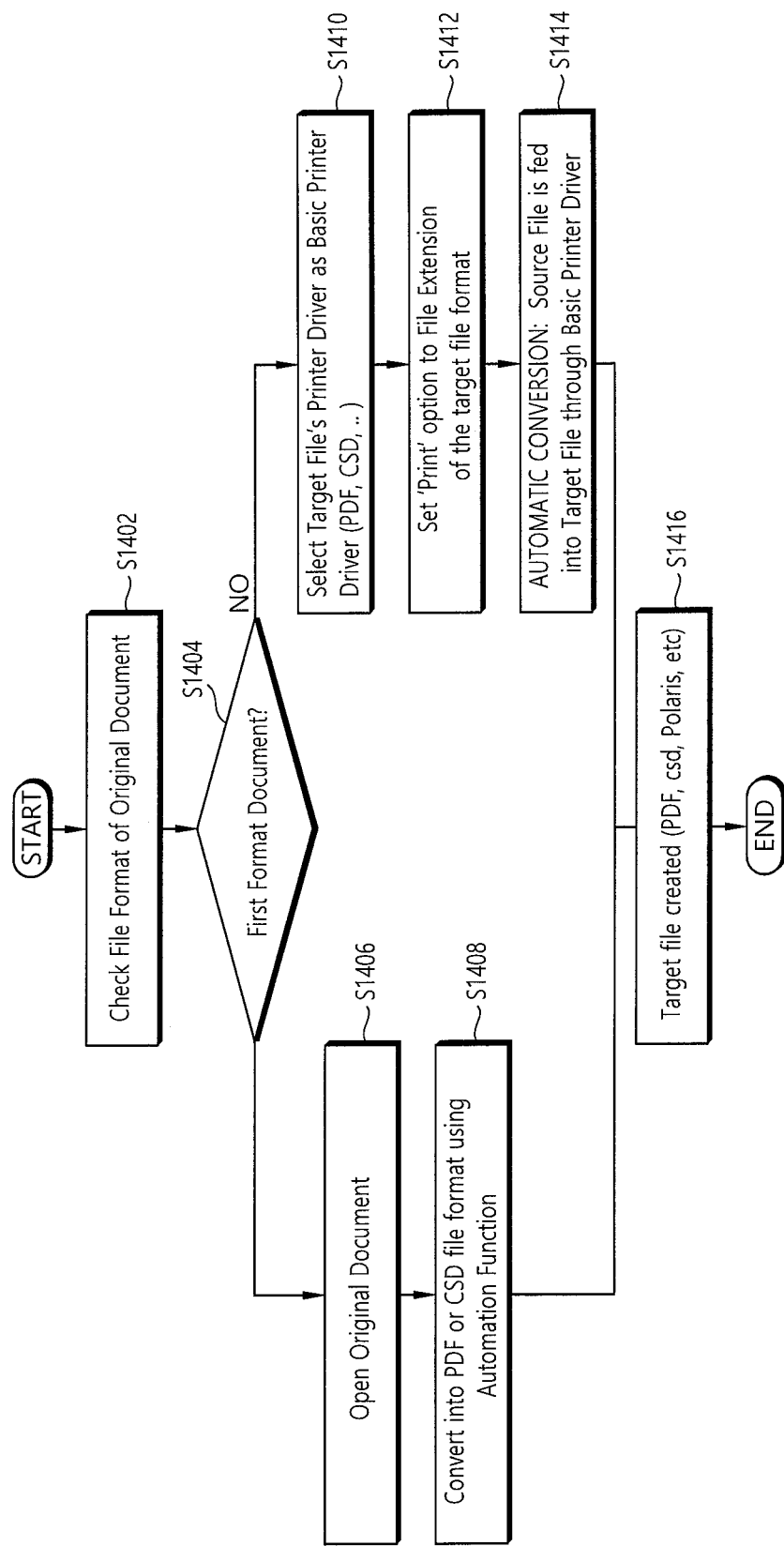
FIG. 14 depicts a flow chart illustrating document conversion from original file format to target file format.

FIG. 14 depicts a flow chart illustrating document conversion from the original file format to the target file format.

Referring to FIG. 14, a document conversion process may include detailed steps and components involved in file transformation, from a source file to the target file. In the embodiment of the present invention, the target file is a file obtained from original document in conversion process. In enterprise computing environment, most original documents may be generated using the MS office suite. Accordingly, a device for conversion (for example, the DRM server) checks the file format of the original document (S1402). Furthermore, the device for conversion confirms whether the corresponding document has a first format (for example, an MS Office document) (S1404). If, as a result of the confirmation, it is found that the corresponding document has the first format, the device for conversion opens the corresponding document (S1406) and converts the corresponding document into a document having a target file format (for example, PDF or CSD) using an automation function provided by the application of a corresponding format (S1408). That is, for the purpose of colleague review or customer retrieval, the source document is converted into the PDF file format before distribution. In the conversion from the MS Office file to the PDF file, the MS office automation function may be extensively used. Recently, many other file editors provide this automation function to support automatic file conversion into the PDF file.

If the source file is not documented in the first formats (for example, MS Office), the file converter supported by most editing tool can be used. In this conversion, at first, a printer driver related to the target file format should be selected as a basic printer driver (S1410), and then the target file should be opened and set "print" option to file extension of the target file format (S1412). In the file conversion, employed is a virtual printer driver which is specialized software implemented as a printer driver but not connected to an actual printer. When a basic printer is set as target printer driver, say PDF or CSD, then 'print' command of the source file automatically converts the source document into the target file format (S1414), creating the target file (S1416).

On the other hand, in FIG. 14, it may be described in 3 steps: (1) set target file's printer driver as a basic printer driver, (2) execute 'print' in a source file program, and (3) automatically convert the source file into the target file.

Figure 15:
FIG. 15 depicts a flow chart illustrating sequence of text watermark embedding.

FIG. 15 depicts a flow chart illustrating sequence of text watermark embedding. As shown in FIG. 15, there are various text watermarking algorithms and methods. However, the algorithms mainly relies on minor modification of font size, inter-word distance, inter-line distance, font type, etc. in order to make those changes invisible to users. Therefore, in implementing the algorithms, needed are understanding and knowledge of document edition.

Referring to FIG. 15, text watermark embedding process follows sequential steps of separation: First, a target file is obtained (S1502). Next, the text watermark variables (for example, a user ID and/or a modulation set) are obtained (S1504). The overall content is separated into pieces of a page content (S1506), and the location of text data and text content are searched (S1508). The page content is separated into pieces of line content (S1510). The first location value of each line is calculated (S1512). Next, it is checked whether the first location is suitable as a watermark insertion line (S1514). If, as a result of the check, it is found that the first location is suitable as a watermark insertion line, an inter-word space is computed in order to find out an optimum value (S1516). A watermark is inserted based on the size of the inter-word space using the calculated optimum value and binary data (S1518). Next, the final watermarked document (PDF or CSD) is generated (S1522). If, as a result of the check, it is found that the first location is not suitable as a watermark insertion line, a corresponding line may be skipped (S1520).

When the text watermark variables are delivered to a watermark embedder with the file-format converted document, the embedder tries to find possible spaces for watermark embedding inside the document page.

More specifically, the overall content should be separated by a page and then the page content should be separated by line by line. In the line arrangement, it should be noted that the text line does not have a fixed structure, and therefore should be considered multiple types of lining: indent, outdent, word-boundary, left-alignment, right-alignment, center-alignment, and justification. Also, in embedding watermark, the font size should be considered. In finding the inter-word space embedding the watermark, the watermark embedder checks a position of text content, a diagram, an image, with consideration of indentation, outdentation, word-boundary, alignment, justification, etc. Because of various lining types, indentation, outdentation, and alignment, it should be determined whether the initial position in each line does fit for watermark embedding. When there are less than 3 inter-word spaces available in the line, then the embedder may skip the line. If it is found that more than 3 inter-word spaces are available in the line, watermark embedding is conducted according to embedding algorithm.

When watermarking embedding has been done for a page, then the embedder moves to the next page which will be terminated at the end of file.

Figure 16:
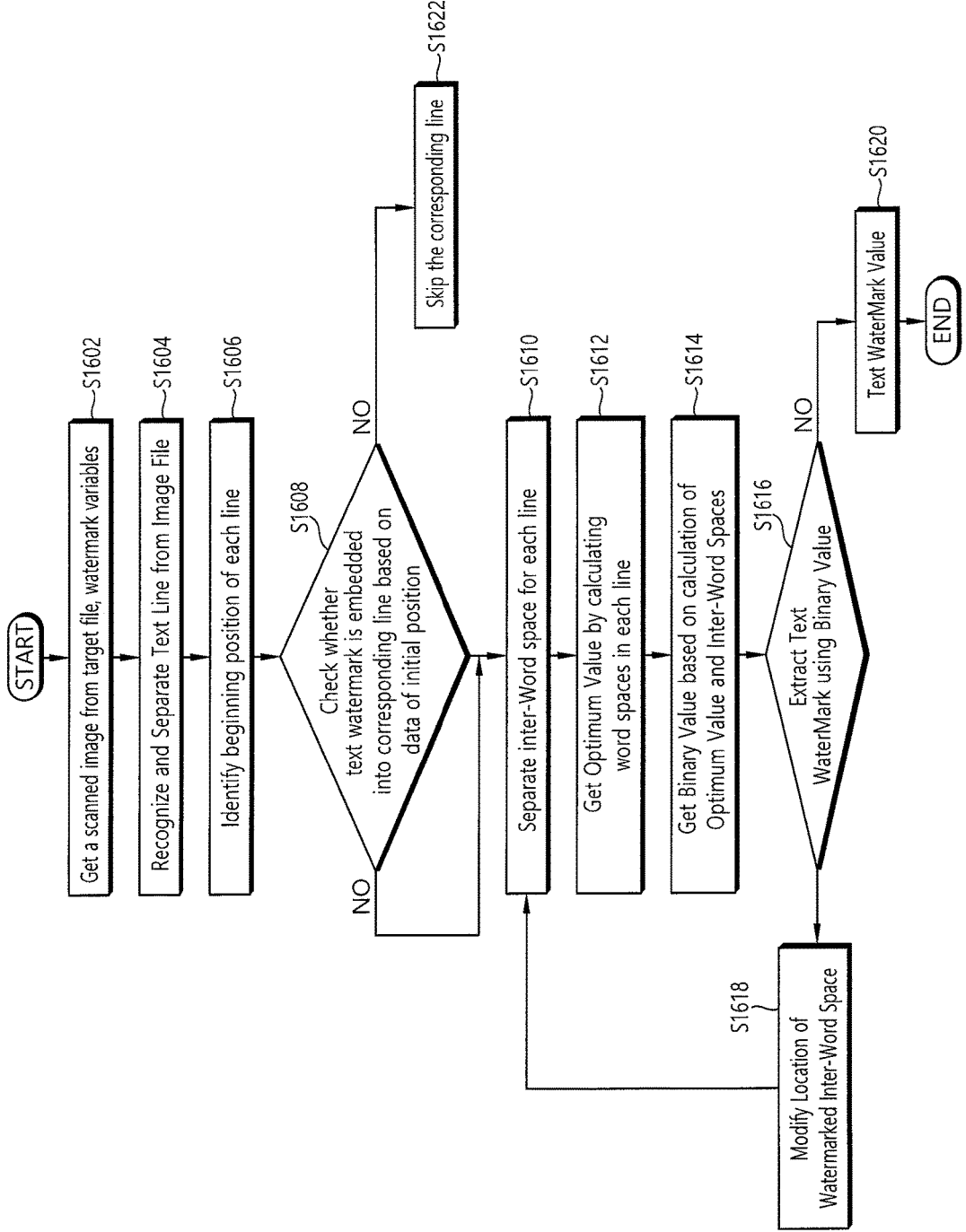
FIG. 16 depicts a flow chart illustrating sequence of text watermark extraction process.

FIG. 16 depicts a flow chart illustrating sequence of text watermark extraction process. As shown in FIG. 16, this process is a reverse of text watermark embedding process.

Referring to FIG. 16, watermark extraction process starts with an image of the target file, for example, PDF or CSD. Accordingly, first, an image and the watermark variables scanned from the target file are obtained (S1602). Text line is the basic unit of watermarking embedding. As such, the text line should be extracted from the page (S1604) and the initial position of the line should be identified (S1606). As discussed above, the number of inter-word space should be more than 3. Next, it is checked whether a text watermark is inserted into a corresponding line based on data at the initial location (S1608). If the number of inter-word spaces is less than 3, the watermark extractor skips the line (S1622). If the inter-word spaces are equal to 3 or more than 3, then the process moves to the next step of separating inter-word spaces. Next, the inter-word space of each line is separated (S1610). Then, because of a font size in words of the corresponding line, the optimum value of watermarking is calculated (S1612). Next, a binary value is obtained based on the inter-word spaces and a calculated optimum value (S1614). Based on the optimum value of watermarking and the watermarking variables, the watermarking values is extracted (S1616). If extraction of watermark data fails, then the location of inter-word watermarking space is modified to find suitable location (S1618). If the extraction of the watermark is successful, a text watermark value may be obtained (S1620).

Figure 17:
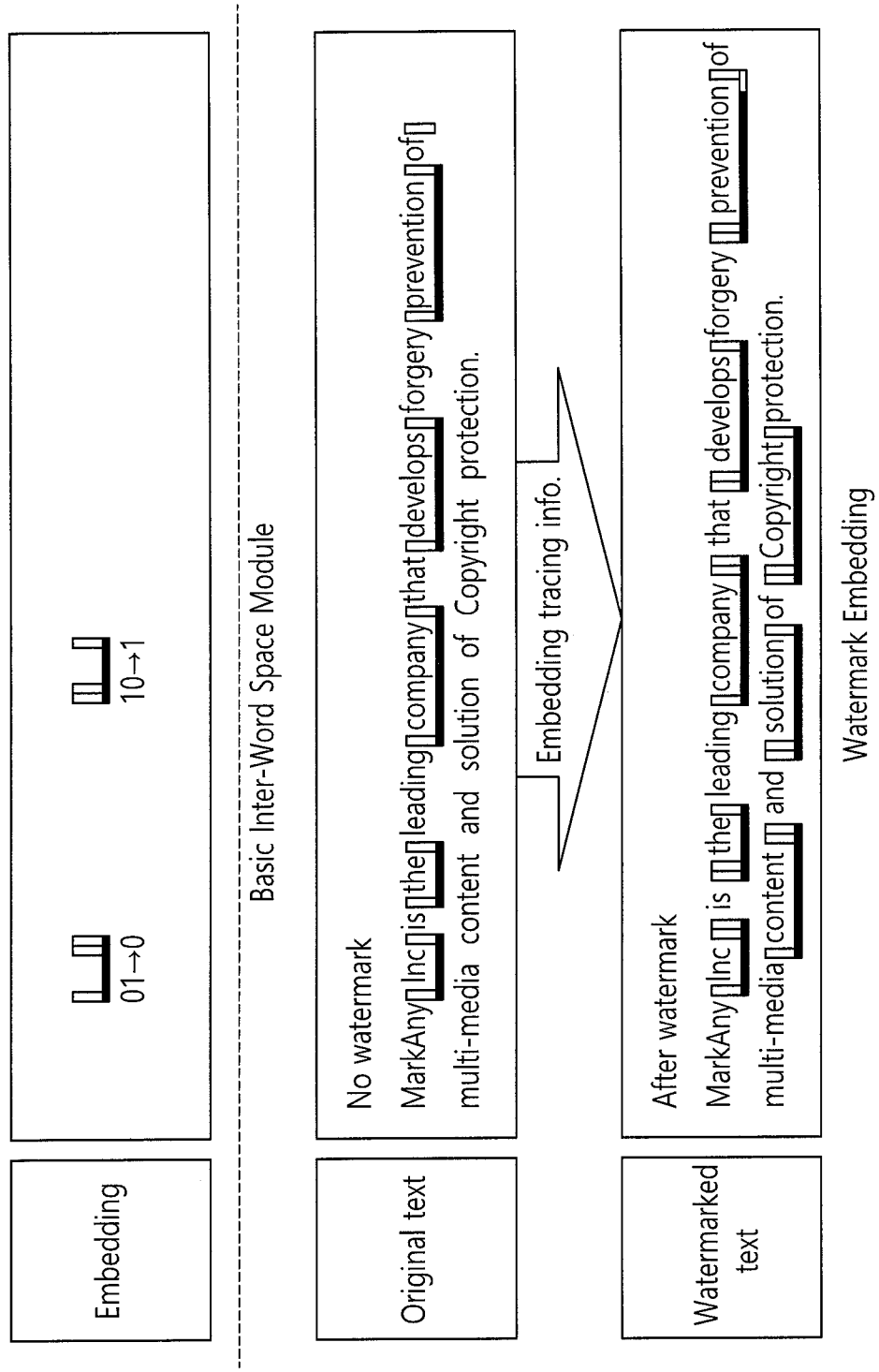
FIG. 17 depicts a schematic view of inter-word text watermarking.

FIG. 17 depicts a schematic view of inter-word text watermarking. As shown in FIG. 17, in the embodiment of the present invention, this inter-word text watermarking is employed as a basic structure for embedding user information in file-format converted document.

Referring to FIG. 17, inter-word space modulation embeds information by adding space to basic inter-word space. Even if the inter-word space can vary according to justification style, the basic inter-word space is only one space allocated between a word and a word. Then, allocation one more space can simply represent '0', or '1'. As shown in FIG. 17, '0' can be represented by one more space in back, while '1' can be represented by one more space in front. However, the representation scheme can be reversed, depending on algorithm development. In the embodiment of the present invention, the representation of the information is called 'watermark mode', '0' as one more space in back, called as 'normal mode'. If the embedder change the rule, as '1' as one more space in back, it is called 'reverse' to increase confusion for possible forgery attempt. At this moment, it should be noted that there is only two different possible ways to embed information into inter-word spaces, which is very important in designing the text watermark algorithm. This simple structure does not allow a complicated hiding scheme and therefore can lead to possible forgery of watermark information by simple trial-and-errors.

From the perspective of the enterprise security officers, the text watermarking algorithm and system should have following features: robust to forgery attack, but simple enough to process watermark embedding within limited time span. In addition, the embedded watermark should be strong enough to be detectable by a security program, while the effect of information hiding should be invisible to naked eyes. However, even if the time consumption and memory size required in processing watermark embedding might be a serious concern, computing resources necessary for detecting watermark will not be so important from the perspective of the security officers. Because the detection can be done in off-line mode, real time detection is not required.

First of all, the algorithm and embedding process should be complex enough so that the watermarked document cannot be easily forged. This is especially important in designing text watermarking. The enterprise security officers adopts text watermarking mechanism mainly to identify users who maliciously copies confidential information to transfer to third party, or takes photos of the documents displayed on screen. For example, the security officers install text watermarking system only to find who printed the confidential document and uploaded it to a P2P site after scanning it. For the reason, the most serious damage which can render text watermarking mechanism useless is possible forgery in which embeds information of an innocent employee into the document and circulate it for claiming that the innocent person leaked out enterprise confidentiality.

In considering this forgery case and designing robust algorithm, it is evident that the text watermark algorithms according to the embodiment of the present invention cannot achieve the same level of cryptographic strength as the following exemplary symmetric encryption algorithms, such as DES, AES, Twofish, Serpent, Blowfish, CAST5, RC4, RC5, 3DES, and Skipjack. Those symmetric encryption algorithms achieve confusion and diffusion through substitution and permutation, disappointing any attempt to make guess of outcome of encryption based on multiple pairs of a plain text and/or cipher text. For example, the encryption algorithm of DES goes through repeated mixing processes of substitution and permutation with the plain text and sub keys to produce an output, called the cipher text. The possible number of mapping process between the plain text and the cipher text might be almost unlimited, depending on the key length. However, in the text watermark, as the final value for each input number is very limited, the possible number of mapping between an ID number and the watermarked text may be very limited. For example, the number of '5' in DES algorithm can be transformed into one of 256 possible ASCII character, while the number of '5' in text watermarking can be transformed into one of two states, or at largest 5-10 different values. If the inter-character space modification algorithm exemplified above is employed for text watermarking, the possible value of watermarked values might be within 4. As a conclusion, as the text watermarking algorithm according to the embodiment of the present invention has inherent limitation, achieving cryptographic strength as robust as the exemplary symmetric encryption algorithm might not be possible.

In addition, the possible value of watermarked product might be limited by another requirement. The watermark itself should be invisible to naked eyes, but it should be detectable by detection mechanism. In other words, the watermark hidden into text is invisible that the difference between original document and watermarked document should not be noticeable. That is, the differences displayed on the screen should be imperceptible. However, when the text documents are leaked out to third party or photo-taken, the hidden watermark should be detectable by tracing mechanism. There is a tradeoff between invisibility of the watermark and detectability of hidden information. If the difference in the displayed document is perceptible, an employee may have feeling of 'being watched' and then try not to use the security system. However, if the system embeds too mild watermark, then detection will be difficult. That is why the security system should take a balanced approach.

New Text Watermarking: Flip-Flopping Algorithm for Text Watermarking

Based on the requirement above, a text watermarking solution according to the embodiment of the present invention is proposed. In order to make the algorithm robust to simple guesses, the embedding process should be complex enough. However, the process should have a computational simplicity so that it can be implemented within a limited time span. Text watermarking algorithm of the embodiment of the present invention is based on this inter-word space modulation.

In telecommunication theory, modulation is defined as a process of conveying a message signal, for example a digital bit stream or an analog audio signal, inside another signal that can be physically transmitted. Modulation of a sine waveform transforms a baseband message signal into a passband signal. As in the telecommunication, the embodiment of the present invention attempts to convey secret information in a flip-flopping alternation of inter-word spaces.

Embedding starts with a simple set of inter-word space modulation in which additional space is added to basic inter-word space. As shown above, the value '0' is represented by one space added to back space, while the value of '1' is represented by addition of front space. In other cases, if watermarking position is fixed, then no addition of extra space can represent '0', while a space in either way, front or back, might indicate value of '1'. There can be several different ways to represent watermark information using inter-word space modulation. Importantly, this basic modulation mechanism can be used in embedding watermark information to discourage possible forgery. However, as the basic modulation scheme is so simple, there should be some ideas of making as complex as possible.

Flip-flopping inter-word modulation according to the embodiment of the present invention is an important part of new text watermarking algorithm and mainly relies its complexity on continuous alternating the basic modulation. However, at first, the watermarking algorithm begins with a conversion of a user ID using symmetric encryption algorithm with a fixed enterprise key so that direct relation between the user ID and the watermarked text is completely hidden. This conversion is important, because any direct mapping between the user ID and the watermarked text can lead to possible forgery, because of the very limited number of outcomes in the watermarked text. As discussed above, there are very limited cases of outcome state, say, regardless of the algorithm: modulation of inter-character space, inter-words space, inter-line space, or space modulation of converted image.

Then, in order to enhance complexity of deciphering, the 3 components of flip-flopping basic  is employed in generating the text watermark in each page, represented by <m, n, p>. In this embodiment, only three components of variable are employed. However, the number of components can be modified whenever necessary. This algorithm is called 'flip-flopping', because basic modulation mode continuously alternates in every line, every page, to frustrate any attempt to find relationship between the input data and the watermarked text.

In the 3 flip-flopping components, the watermark mode, p selects either one of two possible modes, (i) <state-0> mode in which addition of single space to basic inter-word space in back represent '0', while addition of single space in front represent '1' and to the contrary, (ii) <state-1> mode in which addition of single space in back represent '1', while addition of single space in front represent '0'. Both modes, <state-0> and <state-1> are reciprocally reversal state. Once the watermark mode p is selected, then it is applied to everywhere in watermarking document.

Then, page start alternation (m) indicates where the watermark embedding begins, while line alternation (n) indicates the alternation of watermark mode. The number of page start alternation (m) specifies where inter-word watermark embedding starts in the corresponding page. That is, the number of page start alternation(m) moves the first watermarking embedding point in each page to the specified point, which is determined by the value of MOD (page number/page start alternation). The value of MOD (page number/m) designates the starting position where the first embedding begins in the page. For example, if the page start, m is set to 3, in the pages having value of MOD (page number/3)=0, such as 0, 3, 6, 9, . . . , watermark embedding will begin at the first inter-word space. The remainder of division (page number divided by m), 0, 1, 2, indicates that watermark embedding begins at the first inter-word space, second inter-word space, and third inter-word space, respectively. Watermark embedding in every page turns around the page start alternation number, m, to make watermark embedding process complicated.

Line alternation (n) indicates that the basic watermark mode should change every n lines. For example, the basic watermark mode reverses every 3 lines, or 4 lines, according to the specification. If line alternation is set to '2', every 2 lines the watermark mode should be reversed, from '0' mode to '1' mode, or from '1' mode to '0' mode. Thus, at the line number of '0', '2', '4', '6', . . . 2n, the basic watermark mode reverses.

The 3 flip-flopping components,  may lead to easy implementation but would lead to frustration of simple guessing, only if the information of 3 components is not disclosed. Let's take an example of 3 component, <m, n, p>. According to the 3 components rule, the basic watermarking mode changes every n lines and watermark embedding begins at inter-character space of MOD (page number/m). In addition, the watermark itself does not have fixed mode and changes its mode several times even in a single page, which can make good guess almost impossible without the watermark variables and enterprise key for encrypting user information using symmetric algorithm.

In overall, the watermark embedding can be described as the following:

(1) User ID conversion: The user ID should be converted into a new ID through a symmetric encryption algorithm, for example DES, or AES, with a fixed enterprise key.

(2) Applying 3 component embedding rule to each page  as <m, n, p>: (2-1) calculate MOD (page number/m) to determine where to begin watermark embedding in the specific page. (2-2) determine watermark mode. If p=0, then normal mode. Otherwise, applied is reverse mode. (2-3) calculate MOD (line number/n) to reverse when MOD (line number/m)==0.

(3) When watermark embedding is finished in the end of a page, then it goes to step (2).

Then, detection process can be described as following:

(1) Get a watermarked text.

(2) Get the 3 components data of each user from a secure DB in the server, <m, n, p>.

(3) Find the basic watermark mode from p value.

(4) Calculate MOD (page number/m) to find the first watermark embedding position in the page. Change the basic watermark mode (line alternation/n=0) in the first line.

(5) From the second line, calculate MOD (line alternation/n) to reverse the basic watermark mode when the value of MOD (line alternation/n)==0.

(6) Read the watermarked information until end of the watermarked position is reached.

(7) Repeated the processes (3) to (6).

Figure 18:
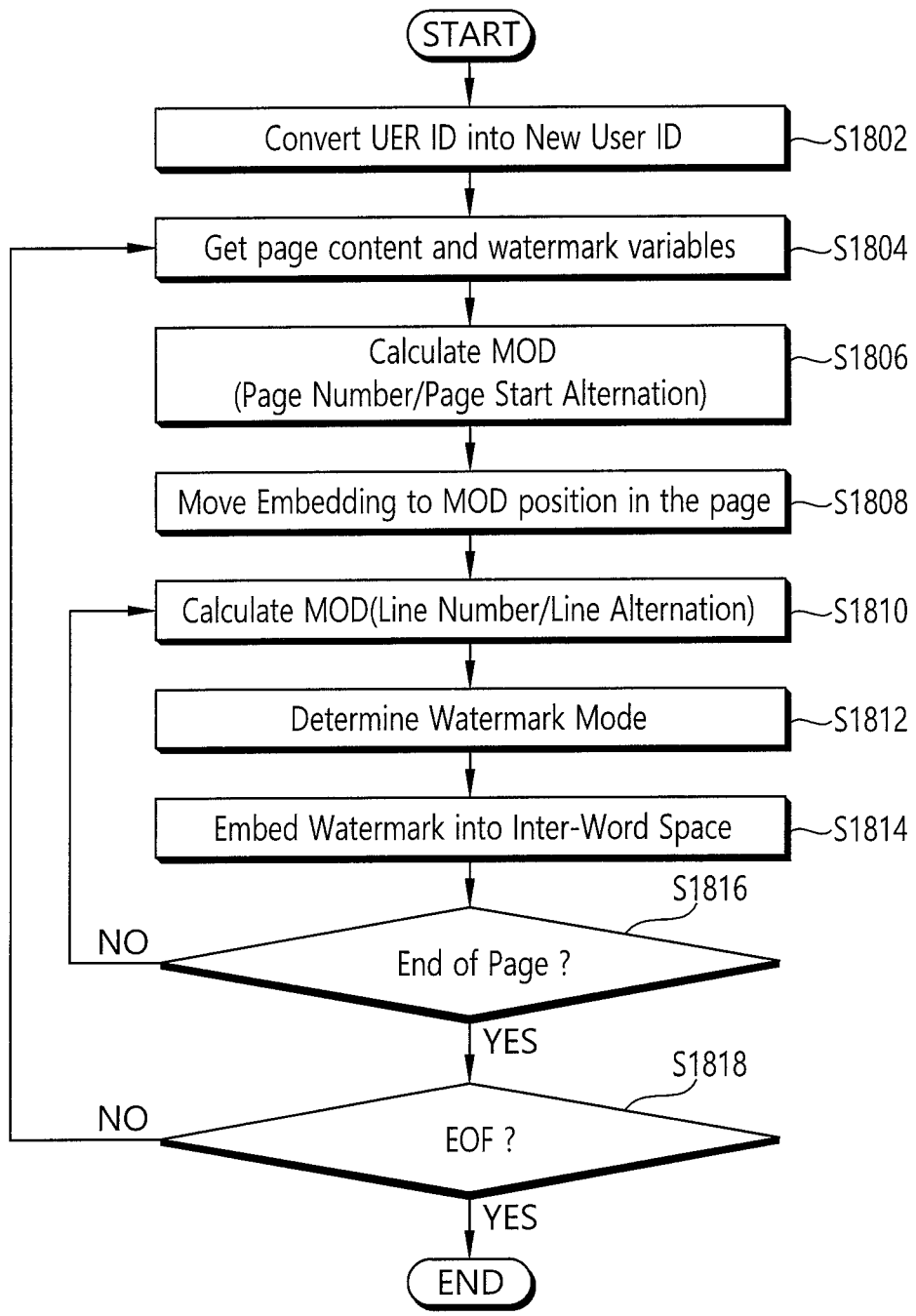
FIG. 18 depicts a flow chart illustrating flip-flopping text watermarking algorithm according to an embodiment of the present invention in which the inter-word space adjustment is conducted with flip-flopping, based on algorithm to change direction of flip-flopping and determine the initial watermarking embedding.

FIG. 18 depicts a flow chart illustrating flip-flopping text watermarking algorithm according to an embodiment of the present invention in which the inter-word space adjustment is conducted with flip-flopping, based on algorithm to change direction of flip-flopping and determine the initial watermarking embedding.

Referring to FIG. 18, the flip-flopping algorithm attempts to maximize confusion of malicious users. As noted, there are a limited alternatives in embedding secret information into inter-word spaces. One of the best way to maximize confusion of possible attackers might be to alternate the basic watermark mode in every n line, moving the first watermarking embedding every page. Alternation scheme can be described as following.

(1) User ID conversion: applying a symmetric encryption algorithm, for example triple-DES, or AES, with a fixed enterprise key to produce a new ID to enhance a security level (S1802).

(2) Get page content and watermark variables  designated by <m, n, p> (S1804).

(3) Calculate MOD (page number/m) (S1806).

(4) Move the watermarking position into MOD (page number/m)$^{th}$ inter-word space (S1808).

(5) Calculate MOD (line number/n) (S1810)

(6) Determine a watermark mode using MOD (page number/n) (S1812)

(7) Embed a watermark into the inter-word space with the determined watermark mode (S1814)

(8) If the watermark embedder moves to the next line, go to process (5) (S1816).

(9) When watermark embedding is finished in the end of a page, then it goes to process (2) (S1918)

Even if the watermark takes only one of two different states, '0' and '1', the embedding system can enhance security level by alternating the watermark mode. If the attacker does not have exact information of the 3 components variables <m, n, p> and an application rule, it might be not easy fully to understand and develop faked documents.

In the exemplary text watermark of the present invention, the 3 components of page number, line number, and watermark mode alternate to disappoint simple guess. Even though malicious users attempt to understand relationship between the user ID and the watermarked text, it might be almost impossible without watermark variables. Furthermore, if the 3 components of watermark variables extend by adding other factors, forgery will be much harder. For example, instead of the 3 components, text watermark employs 4 components, , and then changes watermark mode, according to page alternation. For example, if the 4 components variables are specified by =<t, m, n, p>, then the watermark mode can changes MOD (page number/t), begin at the MOD position of MOD (page number/in), and alternate watermark mode every MOD(line number/n). Various extension of component can be possible according to another embodiment of the present invention.

In addition, in the exemplary embodiment, the watermark mode may take either one, '0' or '1'. However, there can be more watermark modes, depending on algorithms. For example, instead of inter-word space modification, font size modification is employed, the possible watermark mode will be much bigger than 2.

Additionally, the composition and application structure of the parameters may be flexibly modified according to the security policy and document editing. Important thing is the parameters and algorithm should be kept in a safe storage.

Figure 19:
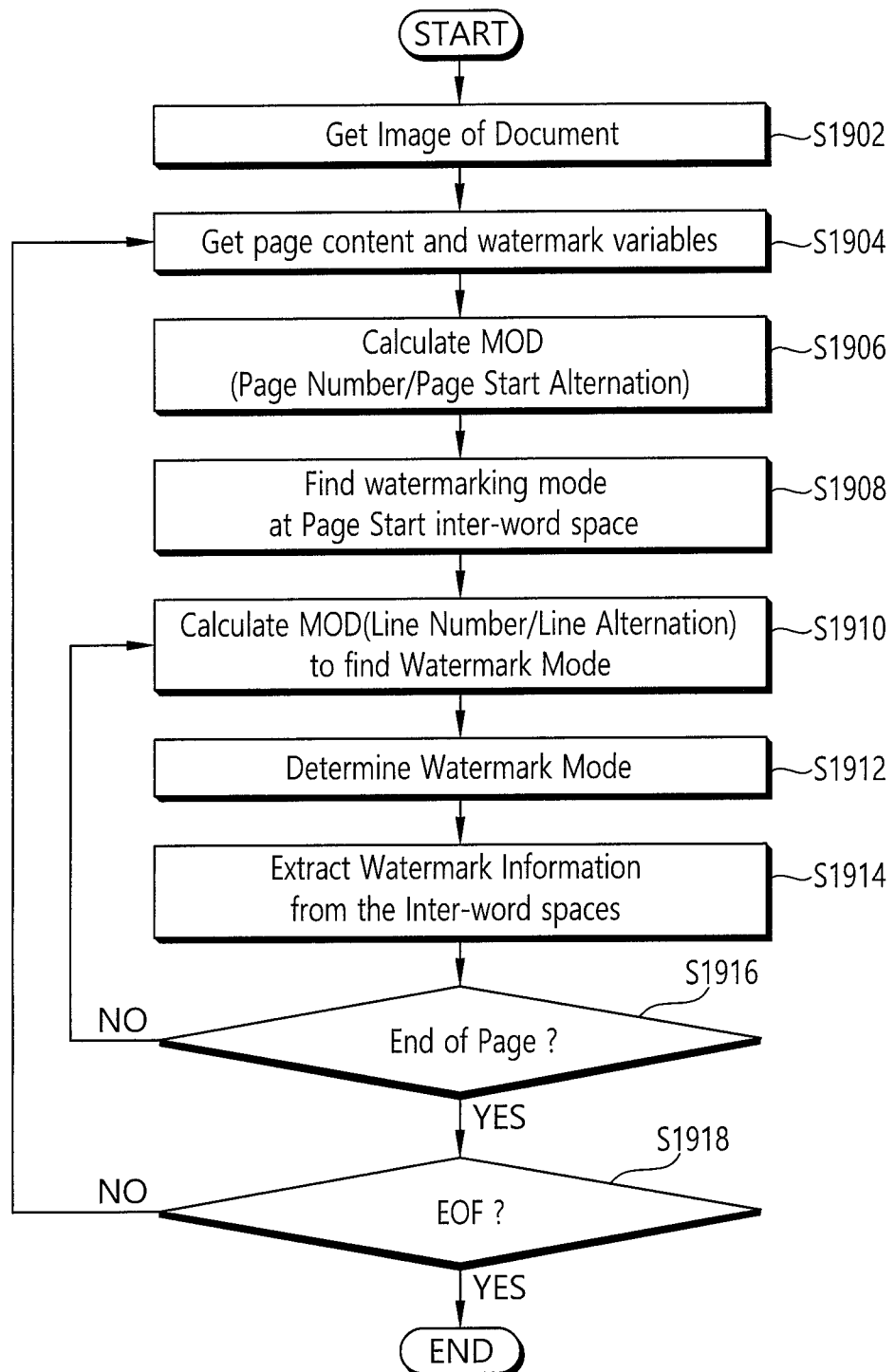
FIG. 19 depicts a flow chart illustrating text watermark extraction, which is a reverse of embedding process.

FIG. 19 depicts a flow chart illustrating text watermark extraction, which is a reverse of embedding process.

Referring to FIG. 19, text watermarking extraction process can be described as followings:

(1) Get an image of document (S1902)

(2) Get a page content and watermark variables  designated by <m, n, p> (S1904).

(3) Calculate MOD (page number/m) (S1906)

(4) Move initial extraction position into MOD (page number/m)$^{th}$ inter-word space (S1908).

(5) Find the basic watermark mode and calculate MOD (line number/n) (S1910)

(6) Determine the correct watermark mode using the calculated value (S1912)

(7) Extract watermark information from the inter-word space with the correct watermark mode (S1914)

(8) If the watermark extractor moves to the next line, go to process (5) (S1916)

(9) When watermark extraction is finished in the end of a page, then it goes to process (2) (S1918)

(10) Check whether the same USER information c.

FIG. 20 depicts sample of text watermark application.

Referring to FIG. 20, watermark embedded text shows successful invisibility. This case shows that more than 40 bits data can be hidden in invisible text watermark and successfully extracted from scanned paper-image based on the algorithm described above. The original text authored in a MS word was converted in the PDF file format and watermarked using 40 bits of a user ID. When it was scanned and tested for extraction of hidden data which showed successful identification of a user ID.

FIG. 20 hides user information of DY LEE (the left one) and GG NOH (the right one). Visible difference between those documents is minimalized so that users cannot differentiate.

Image Watermarking

Image Watermarking as Supplementary Measure

Embedding and extraction of text watermarking has been described above. Text watermarking is an excellent enterprise security tool in the age of proliferation of computer devices, countless communication channels, and easy distribution of digital documents/data by quickly identifying malicious users in case of information leakage. However, even if text watermarking shows high accuracy rate in identifying recipients of a specific document, there should be supplement measure to confirm the extracted information to enhance accuracy. Generally, malicious users, internal employees or employees of partner companies may attempt to destroy text watermarking evidences, if they understand the existence of text watermarking. Because of the complicated structure of watermark flip-flopping, malicious users cannot understand values of watermark variables, such as the 3 components =<m, n, p>, or the 4 components =<t, m, n, p>. However, they can attempt to modify those values of the variables, a page number, or a watermark mode. The attempt of page modification or re-editing might lead to serious damage.

In the embodiment of the present invention, image watermarking technology is proposed as a supplement of text watermarking. Recently, there is a notable tendency that digital text document includes more multimedia content inside the document, especially diagrams and images. Because of this trend, image watermarking technology developed in copyright protection can be applied to assisting document security by identifying malicious users in case of information leakage. However, it is not limited to the role of the assisting so it would be understood that it may be used independently.

There are two possible methods of image watermark embedding: a spatial domain embedding and a frequency domain embedding. In the spatial domain watermarking, a watermark is embedded by using pixel information of a digital image. The advantage of this method is speed of embedding. It can be relatively fast because a watermark signal is embedded in a spatial domain directly. In addition, watermark extraction can be done from the spatial domain directly, the extracting speed is also fast.

However, image watermarking in the spatial domain may be weak against compression (encoding) attacks. Also, this algorithm requires information where the watermark information starts in a digital image to extract the watermark information. Especially, spread spectrum watermarking may show excellent results, but its disadvantage may be that the sync signal should be used to know the exact starting point of the embedded watermark. Some methods may add an additional watermark pattern, beside a message watermark, to detect this sync signal against a RST attack. The disadvantage of this method may be that the performance of recovering logic against the RST attack affects a lot to the overall performance of the image watermark algorithm.

In the embodiment of the present invention, there are several different frequency domain watermarking algorithms, including DFT (Discrete Fourier Transform), DCT (Discrete Cosine Transform), and DWT (Discrete Wavelet Transform) which may be implemented. In the frequency domain watermarking, before embedding watermark, pixel information of image goes through the frequency domain transformation and then the watermark information is embedded with modulation of frequency coefficients. Advantage of this method is that specific properties of various frequency transformation methods, such as JPEG or MPEG compression, can be used to remove information redundancy, and therefore employment of frequency domain watermarking can provide robustness against compression attacks.

In addition, embedding watermark in the spatial domain produces excellent results, showing high detection ratio and high speed for embedding and extraction. Especially, the algorithm of the spatial domain may show watermark transparency and high detection rate for hand-drawn diagrams, pen-drawn lines and circles, and power-point drawings. Thus, in the present invention, image watermarking in the spatial domain may be employed but it does not limit the scope of the present invention.

Figure 21:
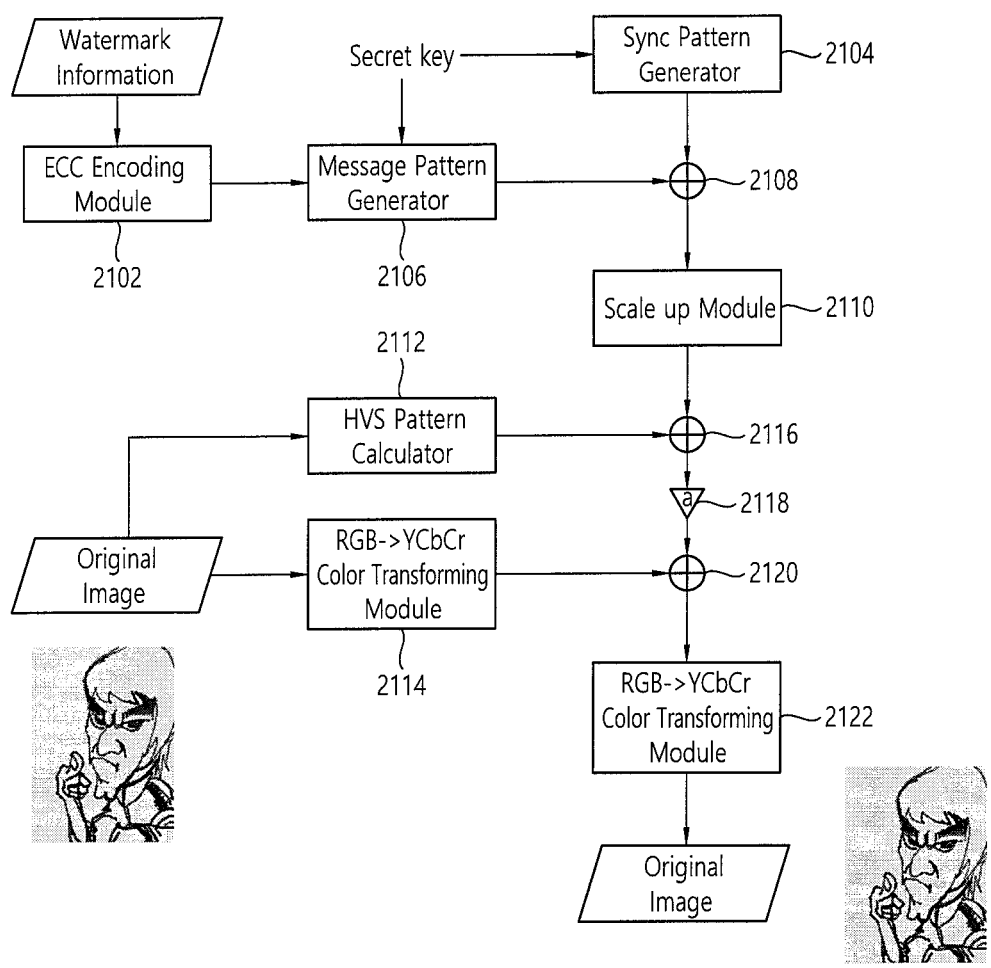
FIG. 21 depicts a block diagram specifically illustrating image watermark embedding module where spatial domain image watermarking technique is employed.

FIG. 21 depicts a block diagram specifically illustrating image watermark embedding module where spatial domain image watermarking technique is employed. As shown in FIG. 21, watermark embedding module may comprise an ECC encoding module 2102, a sync pattern generator 2104, a message pattern generator 2106, a summation module 2108, a scale up module 2110, a HVS pattern calculator 2112, a RGB→YCbCr color transforming module 2114, a convolution module 2116, a strength coordinating module 2118, a summation module 2120, and a YCbCr→RGB color transforming module 2122.

Referring to FIG. 21, watermark creation goes random sequence creation with watermark information and ECC code, creation of message pattern, creation of a sync pattern, and then creation of a watermark pattern. With scaling up of the watermark pattern, HVS adjustment and RGB→YCbCr color transformation should be done before coordinated watermark embedding into the host image.

The watermark embedding module includes several components and processes involved in watermark generation and watermark embedding. In the exemplary embodiment of watermark generation, in the ECC encoding module 2102, ECC encoding (104 bits), specifically RS encoding scheme may be employed to provide higher accuracy in watermarking. In the message pattern generator 2106, a secret key is used as a security measure simply in blinding watermark information in generating random sequence. For example, if the user ID is 78635 and the secret key is 100, then the number of 78735 can be used as a seed in generating the random sequence. In sync pattern generator 2104, the secret key is used also to produce the sync pattern. Then, when a message pattern is added to the sync pattern in the summation module 2108, the watermark pattern is ready for embedding. However, size of this watermarking basic pattern can be different from size of host image pattern. Therefore, in the embodiment of the present invention, in the scale up module 2110, the watermark pattern obtained in aforementioned process is scaled-up to adjust to original image size to make resistant to scaling attack, to produce embedding pattern.

Requirements of digital watermarking can be summarized: robustness, perceptual transparency and capacity. Robustness means the resilience of embedded watermark against distortions and attacks that try to destroy or remove the embedded watermark. Perceptual transparency means that the watermark embedding must not degrade the quality of watermarked data and the capacity means the number of different watermarks that can be embedded into digital media while preserving the perceptual quality requirement. These three requirements are in conflict with each other. If the embedded watermark shall be robust against attacks, the user need to increase the energy of watermark, but on the other hand, the user may get the problem with perceptual transparency requirement. However, if a user wants a very good perceptual transparency of embedded watermark, the user has to decrease the watermark energy but at the same time, the user has to face a problem of watermark robustness. Proper selection of signal components or coefficients for watermark embedding and modification of these signal components in embedding process is therefore a very sensitive and important issue, in the embodiment of the present invention. A very effective solution of this problem can be achieved by using of HVS (Human Visual System) models.

The HVS pattern calculator 2112 such as a HVS filter may be applied to the original image to produce the HVS pattern. Then, in the convolution module 2116, convolution of the HVS pattern and the up-scaled watermark pattern produces embedding information, which coordinates a strength of watermark embedding in the strength coordinating module 2118. In the RGB→YCbCr color transforming module 2114, the RGB values of original image go through YCbCr color transformation to obtain the value of Y component, which is added to the watermark embedding data. Then, the added value of the watermark embedding data goes through color transformation process to get the watermarked image in the YCbCr→RGB transforming module 2122.

Figure 22:
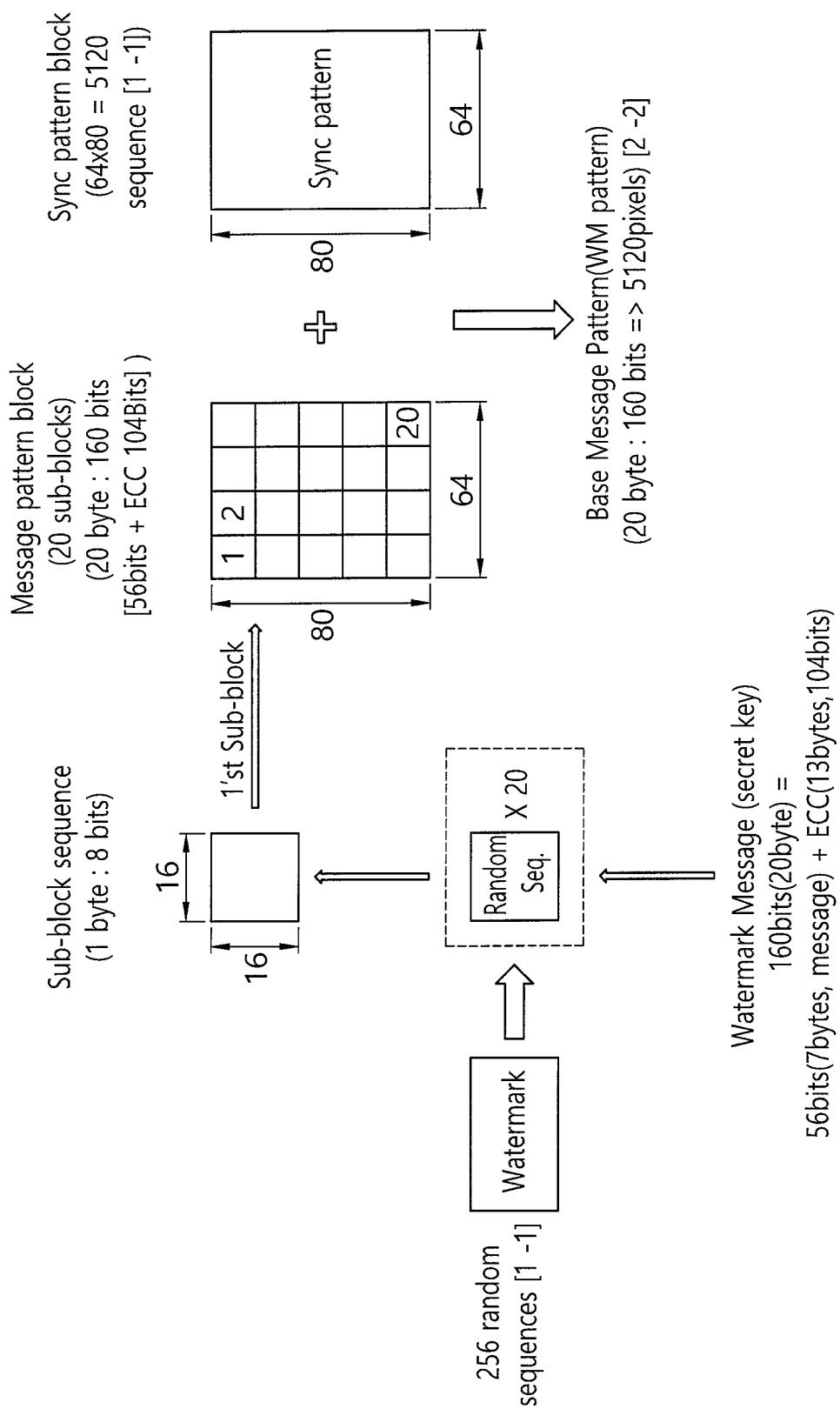
FIG. 22 depicts a schematic view of an example of creating watermark embedding block.

FIG. 22 depicts a schematic view of an example of creating watermark embedding block. As shown in FIG. 22, watermark information, called a secret key, can be used as a seed of random sequence for spread spectrum watermarking and then composes a sub-block of 16×16 pixels. An example of the message pattern block, consisted of 5(80)×4(64)=20 (5120 pixels) sub-blocks may be created before added to the sync pattern block of 5120 pixel. When this message pattern block is added to the sync pattern block, it is called a base pattern block.

Referring to FIG. 22, construction of the basic message block may include several modules and sequence of construction flow. According to the embodiment of the present invention, in order to generate the base message block, M-ary modulation scheme for image watermarking in which multiple bits of watermarking information can be embedded into a host image using M-ary phase modulation method can be used. According to the M-ary phase modulation method, it can greatly increase the data capacity of a watermark, while it can considerably improve watermark robustness. This scheme improved previous M-ary algorithms in that it solved problem of exponential computation workload for data extraction. Another M-ary scheme, claiming that M-ary modulation, based on spread-spectrum communications, can increase channel capacity, while it does not decrease under noise like distortion such as a lossy JPEG compression. In the embodiment of the present invention, the idea of the M-ary modulation is comprehensively employed with a minor modification. The watermarking message pattern creation follows the processes depicted in FIG. 22.

At first, the watermark message should be fed into watermark pattern generation process. In the exemplary embodiment, the watermark message of 160 bit consists of watermark information of 56 bit and ECC (error correction code) code of 104 bit. Then a sub-block should be created. In the exemplary embodiment, if a sub-block can represent 8 bits, then 256 random numbers can be created from $2^8$=256. By mapping the 20 watermark messages of 8 bits in each to the 20 sub-blocks, the 20 random number sequences are generated, which is implemented in 256-ary modulation. In this exemplary embodiment, the 20 sub-block sequences generated in previous stage are arranged into a matrix form of 6×5, making a base message pattern block of 80×64 pixels. The sync pattern block should be created in the same size of the base message pattern. When the message pattern block is added to the sync pattern block, the base message pattern is obtained. Values of the message pattern block may fall in the range of [−1, +1], and pixel value of the sync pattern blocks may also fall in the range of [−1, +1]. Therefore, pixel value of the message pattern block may be within the range of [−2, +2] and most frequently have the value of 0. This base message pattern is embedded repeatedly into the host image.

Coming back to FIG. 21, this watermark embedding pattern should be scaled up to adjust to size of the original host image through interpolation technique. When a watermarked image changes into smaller image than original image, the embedded watermark will disappear, which is called 'resize attack'. Thus, when the watermark pattern is up-scaled 2 times of original image, the watermark information can be detected in more than even more than 50% resizing attacks.

HVS calculation determines the strength of watermark embedding. According to the HVS modelling of the embodiment of the present invention, the embedded watermark in visually imperceptible area such as edge should be strong, while in the area of visually prominent area such as 'flat area' should have low embedding value. For the reason, the HVS value becomes the strength of watermark embedding. Watermark embedding is determined by the following equation:

$$I'=I+WM*(\alpha*HVS),$$

where I', I, WM, and α, represents watermarked image, original image, watermark pattern, and watermark embedding strength, respectively. In this process, the watermark embedding pattern should be repeatedly embedded into the original image. As explained above, when the up-scaled watermark image is ready for embedding, it is adjusted by the strength of the HVS factor before adding to the original image.

Figure 23:
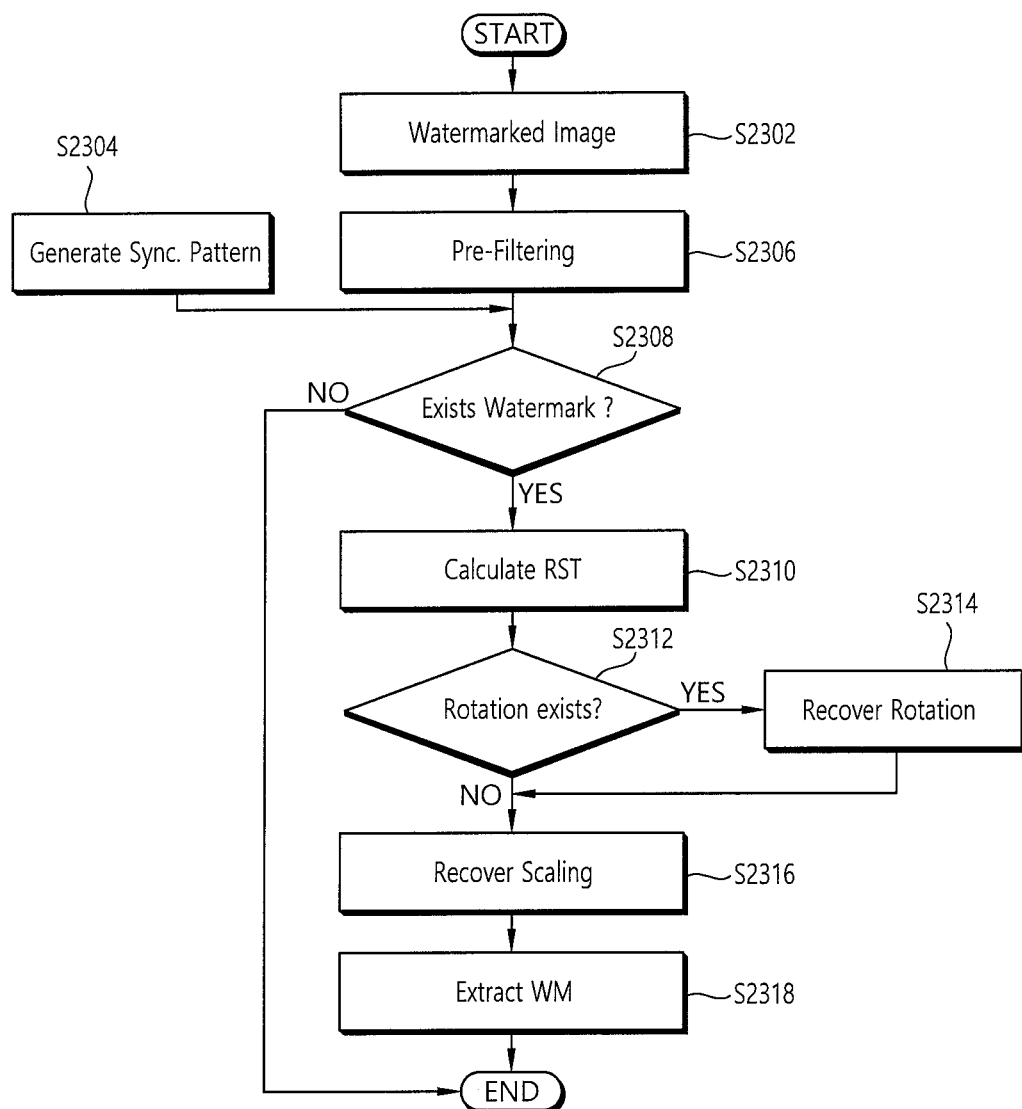
FIG. 23 depicts a flow chart illustrating watermark extraction process, which might be a reverse of embedding process depicted in FIG. 21.

FIG. 23 depicts a flow chart illustrating watermark extraction process, which might be a reverse of embedding process depicted in FIG. 21.

Referring to FIG. 23, watermark extraction flow may include a sequence of watermark extraction, might be simply a reverse of watermark embedding process. At first, the watermark extraction module gets watermarked image (S2302). And the sync pattern is generated (S2304) using the same secret key, a seed of a pseudo random number generator employed in embedding watermark process. In a pre-filtering process (S2306), the watermarking component is extracted from the watermarked image by removing the host signal component. The host signal component can be gained using a Wiener filter. The Wiener filter is commonly used in image restoration and de-noising, because it exhibits optimal performance when both image and noise statistics are Gaussian. It follows the equation:

$$Iw = I' - Ih$$

where Iw, I', Ih are watermark signal component, watermarked image, and estimated host signal component, respectively. Ih is obtained from Wiener filtering.

Next, whether a watermark is present is determined (S2308). Determination of watermark existence can save much time by providing early decision whether watermark is found. If there is no watermark in an image or a diagram included in a document, the watermarking extraction module can save much time using the information. The determination module calculates cross-correlation value and then decides existence of watermark by checking whether the earned value is larger than thresholds value. When the cross-correlation value is larger than the threshold value, the extraction module proceeds to the next step. In the next step, RST (Rotation, Scale, and Translation) value is earned in calculating cross-correlation value in aforementioned step by extracting the peak pattern (S2310). Checking image rotation investigates the RST value and then decides if the image is rotated when the R value is not equal to 0 (S2312). If the R (rotation) value earned is more than 0, then the image should be rotated in reverse direction as much as the rotation value (S2314). In rotation restoration step, the image is rotated in reverse direction as much as the rotation value. In scaling restoration step, the image should be scaled in reverse direction as much as the S (scale) value (S2316). For example, if the S (scale) value of 2 is earned, then the image is down-scaled as much as ½. With an assumption that the watermarked image is fully restored from rotation, scaling, then the watermark is extracted (S2318).

Watermark extraction proceeds with an assumption that rotation and scaling has been completed.

Figure 24:
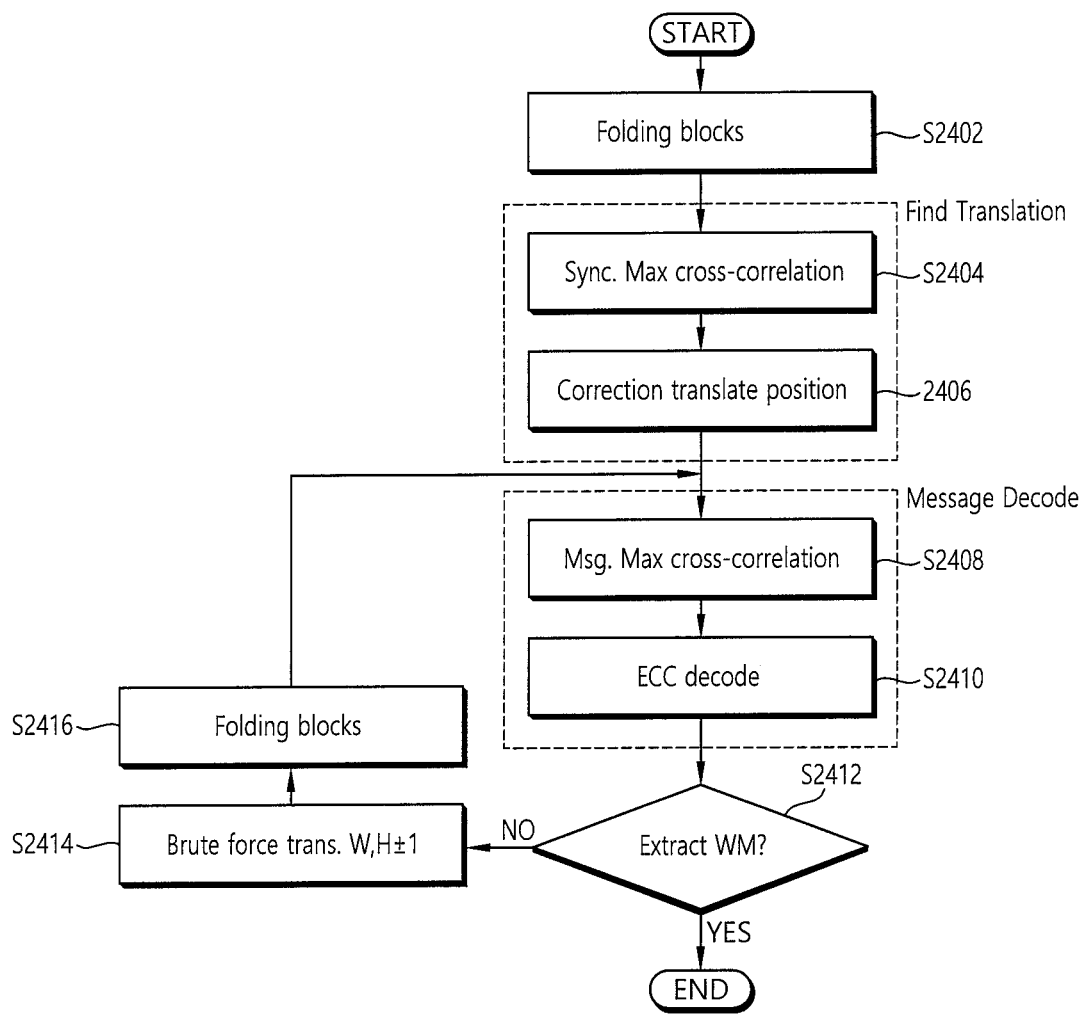
FIG. 24 depicts a flow chart illustrating watermark extraction, a one of sub process of watermark extraction process depicted in FIG. 23.

FIG. 24 depicts a flow chart illustrating watermark extraction, a one of sub process of watermark extraction process depicted in FIG. 23.

Referring to the FIG. 24, the watermark extraction module extracts embedded watermark data. In the stage of finding translation, block folding technique is comprehensively used (S2402). Input frame of image data consists of multiple base message patterns. When those base message patterns are overlapped, as embedding watermark relies on spread-spectrum method, the watermark signal repeatedly embedded in each channel becomes stronger, while the host signal components included in overlapped folding becomes weaker. For example, the basic message patterns of 80×64 pixels are addictively folded and the watermark signal becomes prominent. Then, the maximum cross-correlation value between the sync signal and the folded block is obtained (S2404). Location of the peak value in the cross-correlation indicates position of watermark pattern initialization to calculate amount of image translation for the input data and then, the translation value is used to correct translated image (S2406).

Then, error correction should be conducted to extract the embedded watermark information in each sub-block. It should be noted that the basic message pattern of 80×64 pixels consists of 20 sub-blocks of 5×4 units in the exemplary embodiment. Each sub-bock contains 8 bit message and therefore 256 random sequence obtained in embedding process is used to get maximum cross correlation. From this process, watermark message information is obtained (S2408). In the next stage, ECC decoding is conducted (S2410). In the final stage of watermark extraction, it should be checked whether watermark data is correctly extracted or not (S2412). If watermark data is correctly extracted, then the extraction process is terminated. Otherwise, the extraction process goes back to folding block stage to correct errors found in translation positioning (S2416). There can be a brute-force method of error correction of translation position by increasingly changing the value of W (Width) and H (Height), for example, ∓1 (S2414). Based on this brute-force method, the extraction process may go back to message decoding stage.

FIG. 25 depicts a first example of image watermarking and FIG. 26 depicts a second example of image watermarking.

Referring to FIG. 25 and FIG. 26, samples of watermarked image show that user's information, such as a user ID, a terminal number, an IP address, a device information, a delivery point, or a date of delivery may be invisibly hidden in file-format converted document file.

Figure 27:
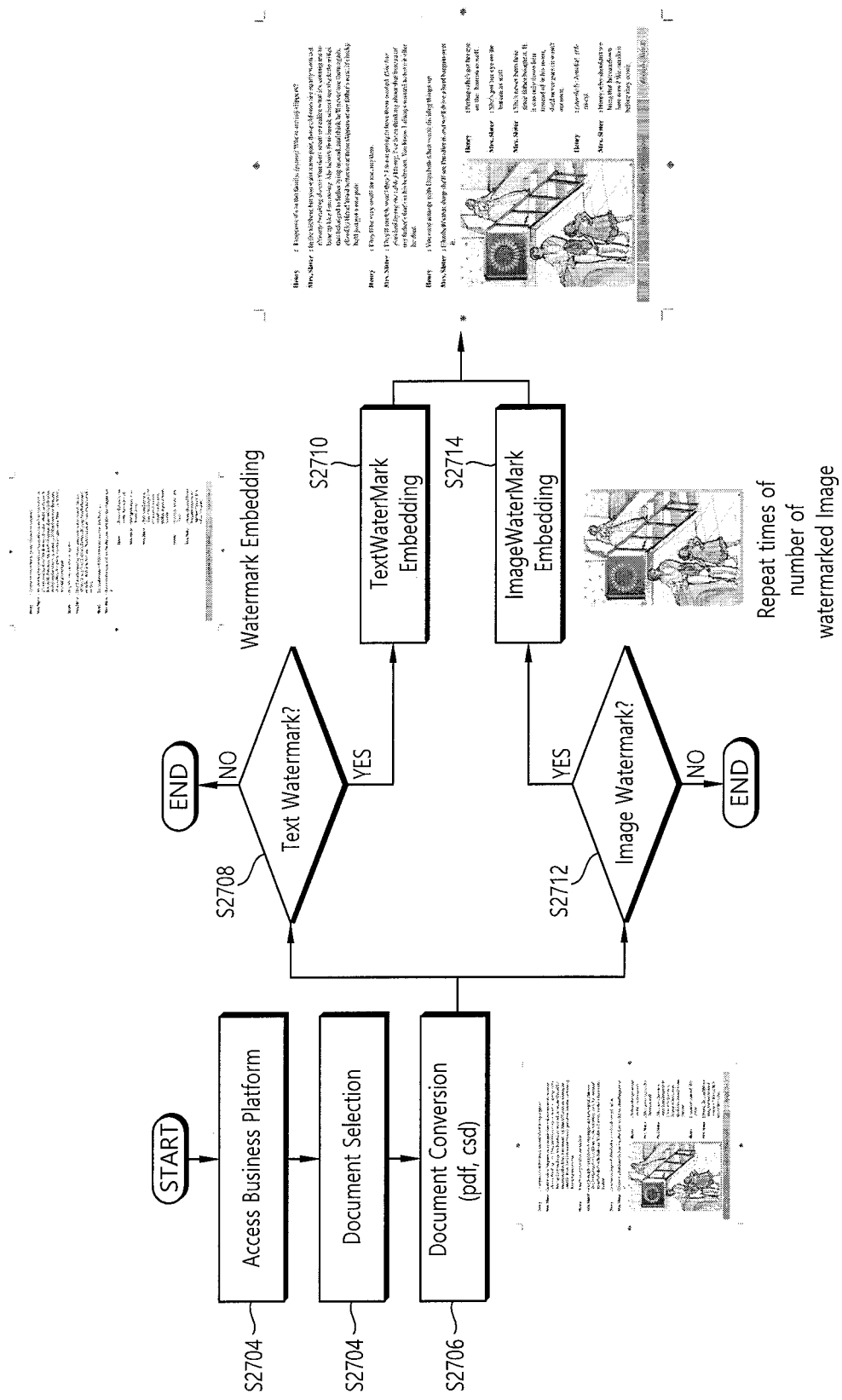
FIG. 27 depicts a flow chart illustrating an example of watermark embedding process into file-format converted document.

FIG. 27 depicts a flow chart illustrating an example of watermark embedding process into file-format converted document.

Referring to FIG. 27, watermark embedding into converted documents may be done either way, text watermarking only, or text watermarking and image watermarking, depending on security policy of an enterprise.

As described in FIG. 27, text watermarking modules and image watermarking algorithm are involved in embedding invisible secret information into a text part and a image part of the document. In the process of file format conversion, image data can be separated from the text part and therefore watermarking information can be embedded into the image and text, depending on the security policy and enterprise requirement. Selection of text watermarking only, image watermarking only, or both of them into the document depends on decision of security officers.

The process is described in more detail. The client device accesses a business platform (S2702) and selects a document on which a format conversion and/or watermark insertion are to be performed (S2704). Next, the client device performs a document conversion (S2706). This may be performed by requesting the document conversion from the DRM server.

Next, the client device may receive the document whose format has been converted and insert a text watermark and/or an image watermark into the document (S2708, S2712). As described above, both the text watermark and the image watermark may be inserted or any one of them may be inserted (S2710, S2714). This is based on a client user's determination. The insertion of a specific watermark may be determined under the influence of a document. For example, in the case of a document including only text not having an image, an application may detect the document so that only text watermarking other than image watermarking is performed, and vice versa. As in the embodiment of FIG. 27, if both text and an image are present in a single piece of content, both text watermarking and image watermarking may be used.

Figure 28:
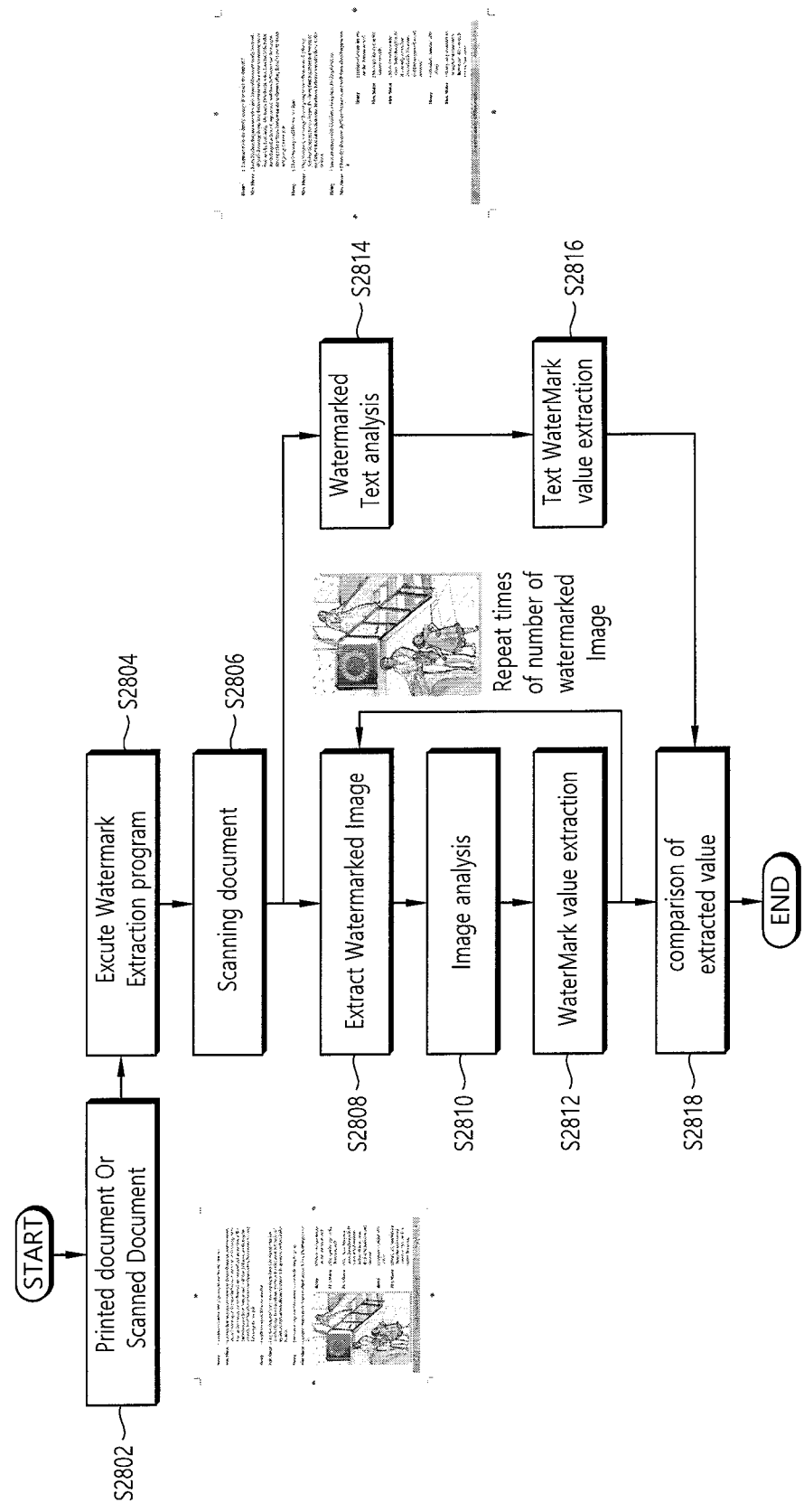
FIG. 28 depicts a flow chart illustrating watermark extraction process in which text part is separated from image part.

FIG. 28 depicts a flow chart illustrating watermark extraction process in which text part is separated from image part. As described above, extraction of text watermark and image watermark are conducted separately.

Referring to FIG. 28, watermark extraction process goes through several steps: acquiring printed document or scanned document (S2802), execution of watermark extraction program (S2804), conversion of the paper document into image through scanning (S2806). There may be separation of text part and image part from the image document and image watermark extraction process and text watermark extraction process simultaneously, then comparison of both outcomes for final confirmation.

More specifically, in relation to the extraction of an image watermark, a watermarked image is extracted from the scanned document (S2808). Next, a watermark value is extracted (S2812) by analyzing the extracted watermark image (S2810). Likewise, in a text watermark extraction process, watermarked text in the scanned document is analyzed (S2814), and a text watermarking value is extracted from the analyzed watermarked text (S2816). Next, the extracted values (i.e., the image watermark value and the text watermark value) are compared (S2818).

Text watermark extraction process and algorithm is described in FIG. 16 to FIG. 19, while image watermark extraction process and algorithm is described in FIG. 23 and FIG. 24. The watermark extraction process in converted document follows the path taken by text watermark extraction module described in FIG. 16 to FIG. 19, and the image watermark extraction module described in FIG. 23 and FIG. 24. The enterprise content can be presented in the form of digital document leaked out through email, SNS, or other digital communication channel, form of photo-taken or video captured image, or scanned image possibly uploaded to P2P site. If the document is in digital form, the text watermark extraction algorithm may be directly applied to disclose a user ID, IP information, device information, or other user related information. Image in digital file, when goes through watermark extraction process described in FIG. 23 and FIG. 24, may easily reveal the hidden information. Even if the detailed description of the watermark extraction module and the sequential flow, reference to previous descriptions might be helpful in understanding algorithms and sub-modules.

Figure 29A:
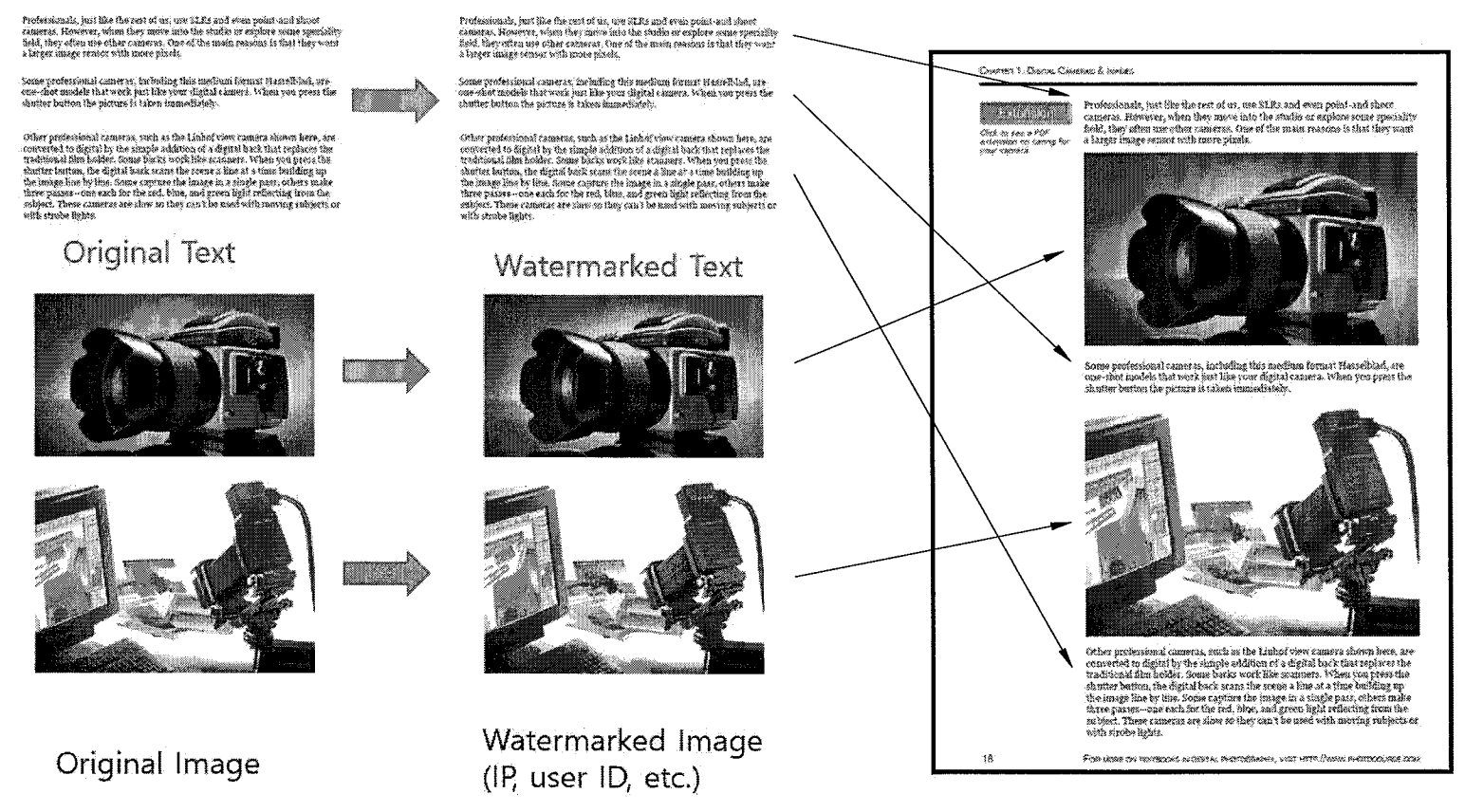

FIG. 29A and FIG. 29B depict examples of watermark embedding to document. FIG. 29A shows application of text watermarking and image watermarking to technical document, and FIG. 29B is an example of watermark application to story-telling books.

Referring to FIG. 29A and FIG. 29B, samples of watermark embedding and extraction show that the tracing modules according to the embodiment of the present invention can excellently support document distribution of an enterprise by invisibly hiding a user ID, a device information, a IP address, or other document delivery related information.

Before proceeding to the next step, it should be emphasized that from the perspective of internal operation of computer devices, the content displayed on user's screen is generally the same as content printed, except some cases. Even if the screen mark and the printing mark can be differently viewed, as the basic mechanisms are the same, in the present invention, unless specifically remarked, it is assumed that the watermark embedding algorithm and extraction algorithm in converted document is the same for screen park and printing mark.

$2^{nd}$ Image Watermarking

Embedding text watermark and image watermark into document has been described above. When a document is leaked out through on-line channel or digital storage, the text watermark and the image watermark may be practically useful tool in identifying source of information leakage. Even when the confidential document is displayed on user device or printed and then taken photo of screen or scanned before being uploaded, the text watermark and the image watermark may be used to trace illegitimate users. However, the text watermark and the image watermark, called a $1^{st}$ watermark in the embodiment of the present invention, cannot perfectly prevent screen capturing or screen photo-shot when an important document is displayed on user device. Especially, some situation displaying user's name on the screen display to prevent illegitimate photo-shot should be considered. Furthermore, the situation where user's information may be invisibly embedded into displayed logo or other symbolic image should be also considered.

In the embodiment of the present invention, the visible logo or symbolic images may be added to existing text watermark and image watermark to scare off users of malicious intension. The logo image or other symbolic images may hide invisible user's information. When a confidential document is found to have been leaked out by malicious attempt, the hidden information may be disclosed by watermarking detector. In this embodiment, the $2^{nd}$ watermark which is embedded into logo image or other symbolic images are described. In generating the $2^{nd}$ watermark and extraction, user's data and symbolic image are defined as 'mark information' and 'host signal'. Watermark embedding and extraction, as it handles image signal and relies on basic watermarking operation, follows technical basics as already described in image watermarking session.

The $2^{nd}$ image watermark may be used in various ways. In contrast to the $1^{st}$ watermark mainly employed to trace illegitimate information leakage, the $2^{nd}$ watermark is mainly used for blocking screen capturing, screen photo-shot, screen video-shot, or scanning printed documents. In addition, the first watermark, whether it is text watermark or image watermark, is mainly invisible, while the $2^{nd}$ watermark is mainly visible. However, as user information can be invisibly hidden into a small size logo or symbolic image, the $2^{nd}$ watermark can be used for tracing purpose. For example, some users can take screen photo-shot in which logo or symbolic image not explicitly showing a user ID can carry various user information, including a user ID, device information, and displaying a date, using image watermarking algorithm. Even in the printed paper, the user information can be hidden in the printed logo or symbols. Some enterprises enforce employees to print logo image on the printed paper for security purpose, and therefore, they can hide individual user's information into the printed logo or symbol. Even if the printed logo or symbol printed at all printing machines look same, in fact it may be very different.

Figure 30:
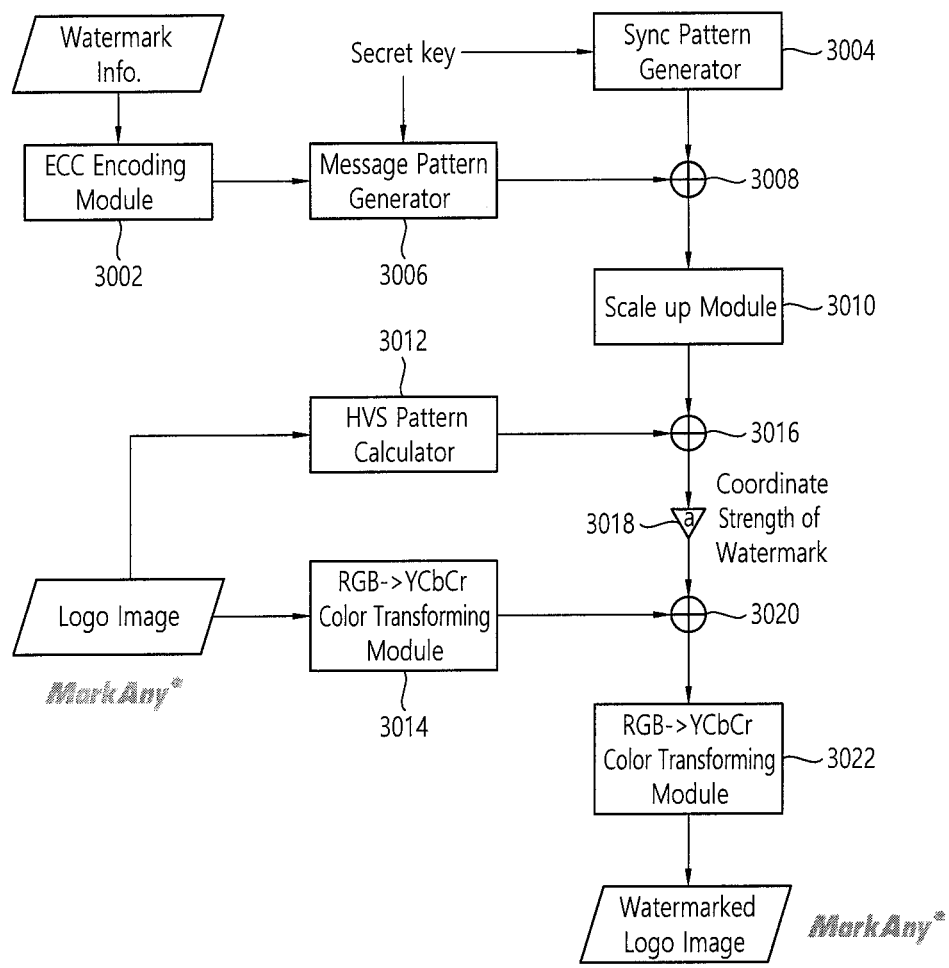
FIG. 30 depicts a flow chart illustrating $2^{nd}$ watermark generation process in which a watermarked logo, or symbolic image is created based on image watermarking technology.

FIG. 30 depicts a flow chart illustrating 2nd watermark generation process in which a watermarked logo, or symbolic image is created based on image watermarking technology. As shown in FIG. 30, watermark embedding algorithm is exactly the same as described in FIG. 21 which describes embedding 56-bits watermark information into the host image. However, as there are already some texts and images in the displayed document or the printed document, the 2nd watermark can be embedded more strongly than in the 1st watermark.

Referring to FIG. 30, $2^{nd}$ watermark generation flow is described. Because the user information is invisibly hidden into a small size logo or other symbolic image, $2^{nd}$ watermark embedding and extraction basically relies on image watermarking algorithm. As described above, a random sequence number is generated from the watermark information and then a message pattern is created with secret key. Sync signal is created and added to the message pattern, generating the base watermark pattern. With adjustment of HVS, the host signal will be added to up-scaled watermark pattern to create watermarked image.

The $2^{nd}$ watermarked image may be a host signal of small size logo, enlarged character set, or other symbolic images. It can be overlaid on document or replace some content, according to document design. The displayed $2^{nd}$ watermark image can prevent illegitimate photo-shot, screen capture, or paper scanning by displaying user information, such as name, logo, or IP address.

Figure 31A:
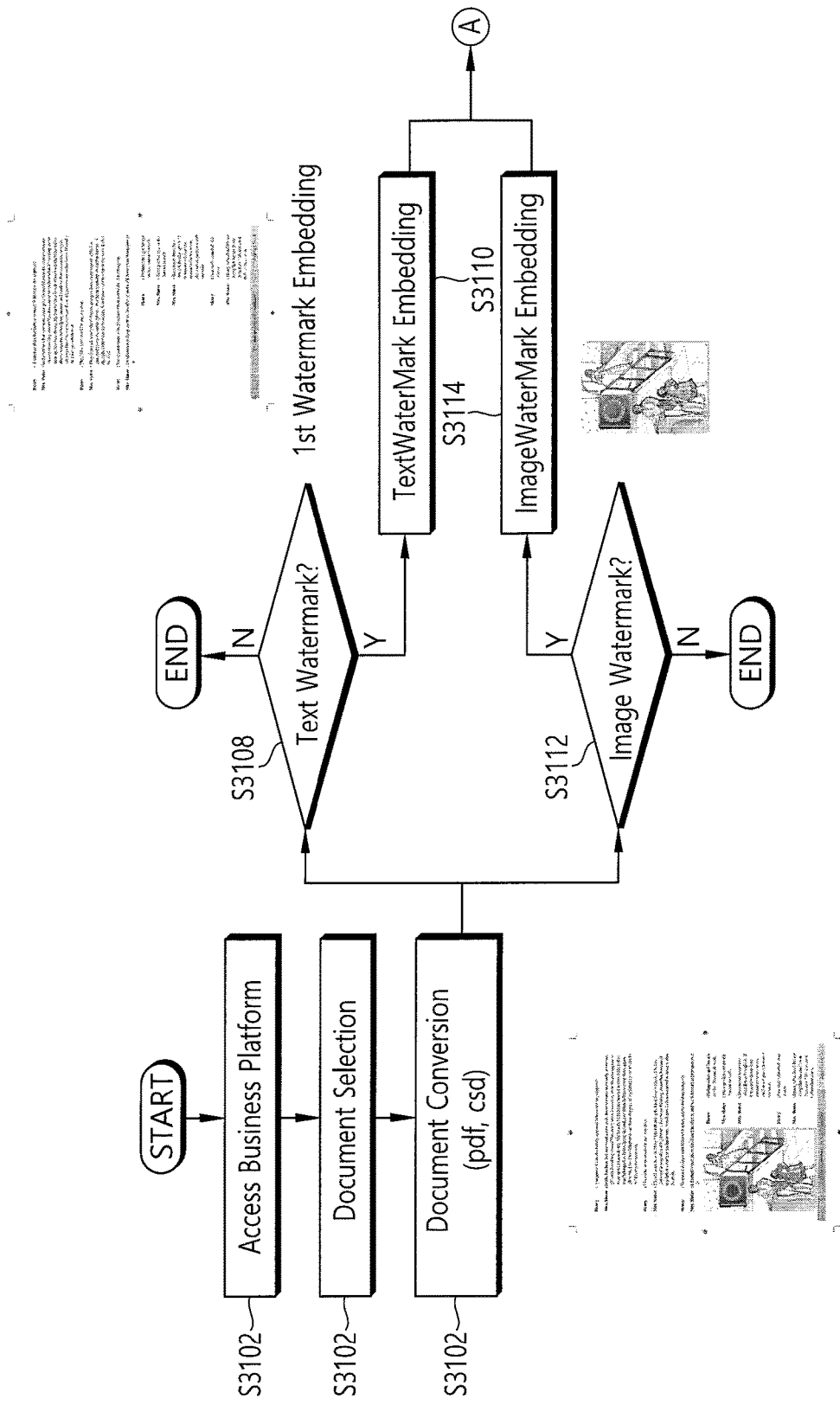
FIG. 31A and FIG. 31B depict a flow chart illustrating $2^{nd}$ watermarking insertion process.
Figure 31B:
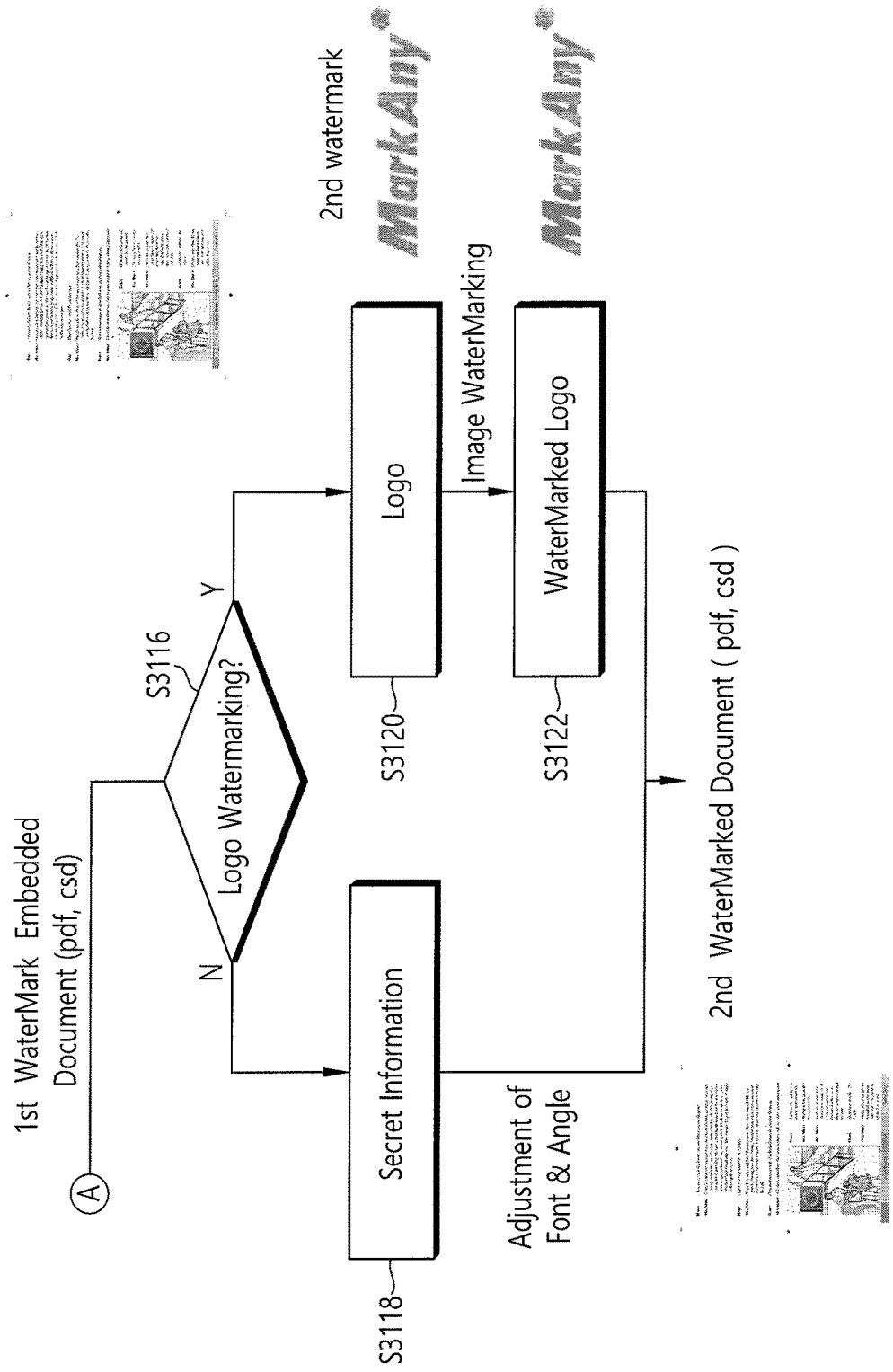

FIG. 31A and FIG. 31B depict a flow chart illustrating $2^{nd}$ watermarking insertion process. The $2^{nd}$ watermark may be overlaid on the top of 1st watermark, text or image, or replace space of text in document. There can be another combination. Even if 1st watermark, image or text, is not embedded into the document, the $2^{nd}$ watermark can be inserted or overlaid.

Referring to FIG. 31A and FIG. 31B, $2^{nd}$ watermark embedding is described ways of using the $2^{nd}$ watermark for the purpose of scaring away malicious users or tracing dauntless user. Generally, in tightening enterprise security, the $2^{nd}$ watermark may be used as an additional extra security measure by preventing illegitimate screen capture, screen photo-shot, or screen video capturing. In the process of file-format conversion, the text watermark and the image watermark are embedded into the document and then the $2^{nd}$ watermark is also embedded in the document for re-enforcement of security measure by showing user information on screen or printed document. Accordingly, the processes (S3102 to S3114) up to the insertion of the $1^{st}$ watermark are the same as the watermark insertion process of FIG. 27. There are two different ways of adding $2^{nd}$ watermark to the first layer watermarks: (1) overlay method and (2) replace spaces of text and image. Whether or not to insert logo watermarking into the document into which the $1^{st}$ watermark has been inserted is determined (S3116). If, as a result of the determination, it is determined that logo watermarking is inserted into the document, logo information is received (S3120). After image watermarking is performed on the logo, a $2^{nd}$ watermarked document may be generated by inserting the logo into the $1^{st}$ watermarked document. Furthermore, if, as a result of the determination, it is determined that logo watermarking is not inserted into the document, confidential information may be received (S3118). A $2^{nd}$ watermarked document may be generated by adjusting the font and angle of text based on the confidential information.

Figure 32:
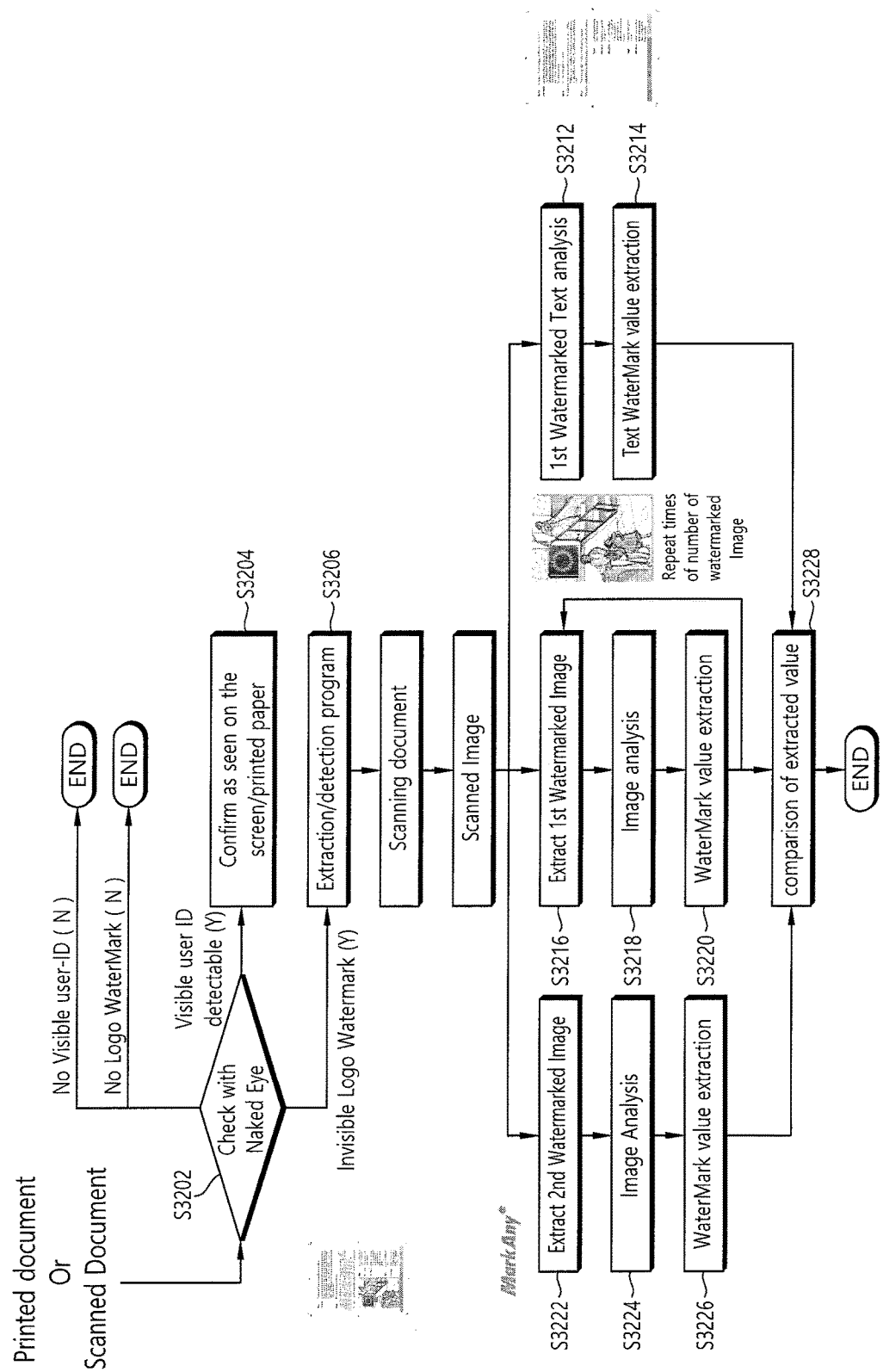
FIG. 32 depicts a flow chart illustrating watermark extraction process.

FIG. 32 depicts a flow chart illustrating watermark extraction process. If the $2^{nd}$ watermark is overlaid on top of the $1^{st}$ text watermark and the $1^{st}$ image watermark, then the $2^{nd}$ watermark can be extracted in parallel with $1^{st}$ watermark extraction. Because the $2^{nd}$ watermark is used to make visual influence to users, the $2^{nd}$ watermark itself can show who is involved in information leakage. However, as the $2^{nd}$ watermark frequently designates department, group, or organization of device user, it does not specify who is involved in information leakage. That is why the $2^{nd}$ watermark invisibly contains information of a device user, a name, ID, or IP address. In this case, the $1^{st}$ text watermark, the $1^{st}$ image watermark, and the $2^{nd}$ watermark can be extracted in parallel.

Referring to FIG. 32, $2^{nd}$ watermark extraction process is described. In fact, the extraction of $2^{nd}$ watermark is a process of decomposing embedded multiple watermarks into independent pieces before extracting mark information. As discussed before, the $2^{nd}$ watermark can be visible mark, revealing user's information to naked eyes, or invisible mark, hiding user's information in logo or other symbol image. In the first stage, if there is visible mark of user's information, such as a name, a user ID, an IP address, or others which can be very easily deciphered to naked eyes, the watermark extraction process is terminated (S3202). However, if there exists a logo image or a symbolic image on the screen or the printed document, extraction process may proceed. For example, if a visible user ID can be detected, it may be confirmed as it is seen on a screen/printed paper (S3204). Furthermore, if an invisible logo watermark is present, a watermark value may be extracted using an extraction/detection program (S3206). If a logo watermark or a visible user ID is not present, an extraction process may be terminated.

In the scanned document, there can be multiple watermarks, the text watermark, the image watermark, and the $2^{nd}$ watermark (S3206).

With extraction/detection module, at first, the extraction process investigates whether there is a text watermark embedded in text part of the document.

As discussed in FIG. 16 and FIG. 19, the text mark extraction mechanism checks whether text watermark is embedded into the text part of document, based on scanned line inputs (S3212-S3214). If there are traces of text watermarking in inter-word spaces, indicated by regular inter-spaces or irregular inter-spaces, it can ask watermark variables from document distribution center. When the extraction system has values of the watermark variables, for example, <m, n, p>, it can proceed with consideration of editing styles, justification, line feeding, indent, outdent, word-boundary, left-alignment, right-alignment, center-alignment, and other editing factors. If the watermark variables are not available, then the identified variables derived from the image watermark in next step can be used.

Detecting image watermark is initiated with generation of sync pattern. When cross-correlation between watermarked image and the sync pattern is higher than threshold value, then it can be said that there is an image watermark embedded. The other extraction processes are described in FIG. 23 and FIG. 24. Sometimes the output of image watermark can be used in text watermarking extraction, when the text watermark variables are not available (S3216-S3220).

The $2^{nd}$ watermarked image can be logo image, or other symbol images which are displayed on the screen or printed on papers. As the $2^{nd}$ watermark is visible whether user data is invisibly hidden in the visible image or not, checking existence of watermark is not needed. Extraction of the mark information is described in FIG. 32 (S3222-S3226).

The extracted values of the $1^{st}$ text watermark, the $1^{st}$ image watermark and the $2^{nd}$ image watermark are compared (S3228).

Figure 33:
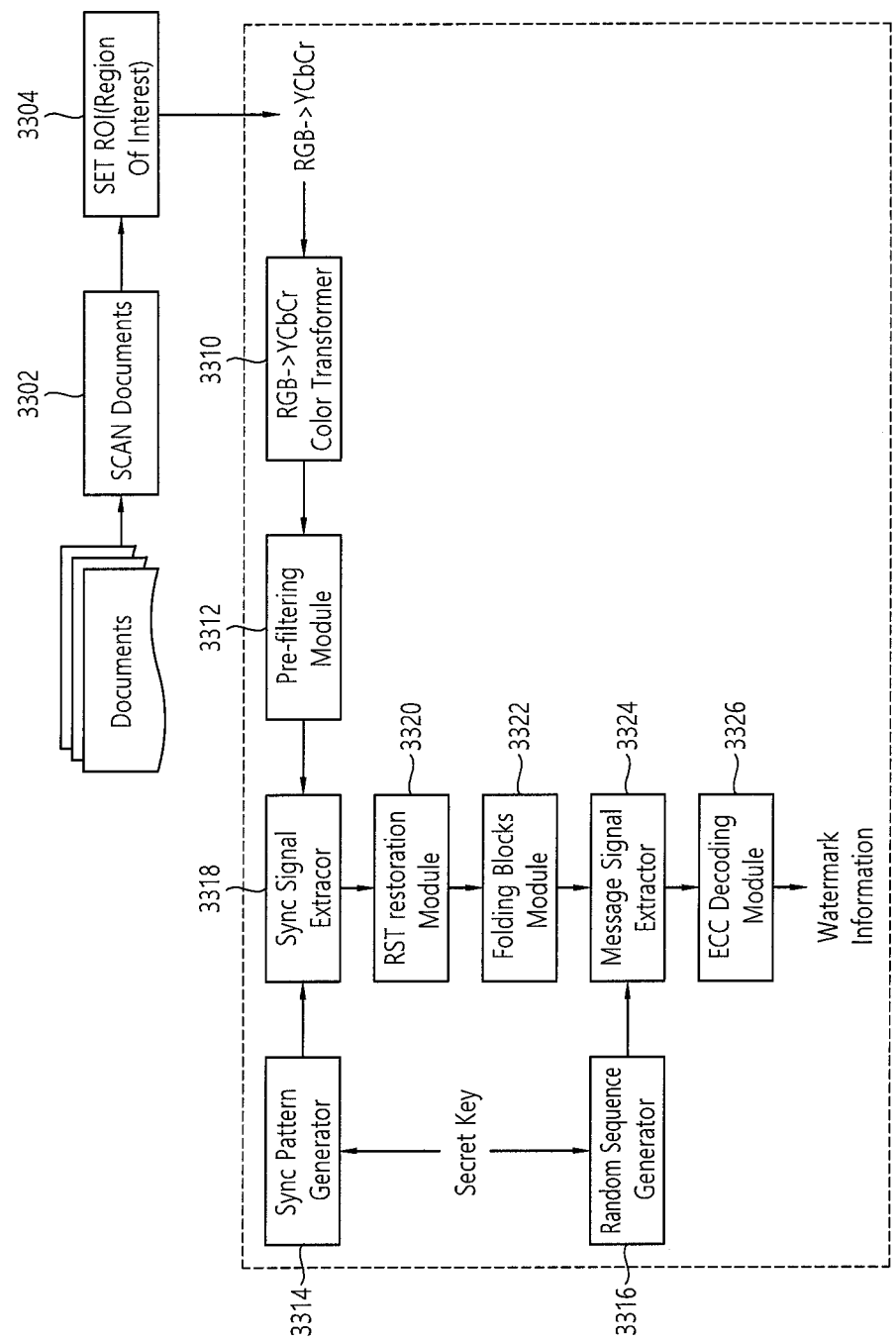
FIG. 33 depicts a flow chart illustrating drawn RIO (Region of Interest) and watermark extraction process.

FIG. 33 depicts a flow chart illustrating drawn RIO (Region of Interest) and watermark extraction process. More specifically, as depicted in FIG. 33, the RIO (Region of Interest) is drawn and then watermark extraction process, described in FIG. 23 and FIG. 24 is implemented.

Referring to FIG. 33, extracting $2^{nd}$ image mark information follows a processes of extracting watermark information from image watermarking technology.

As described in FIG. 23 and FIG. 24, the watermark extraction goes through ROI (Region of Interest) establishment, color transformation, pre-filtering, sync pattern extraction, RST restoration, message information extraction through a folding block, message signal extraction, ECC decoding, and watermark information extraction. Except RST restoration, the extraction process is exactly the reverse process of watermark embedding. For example, watermark embedding is initiated with sync signal generation and watermark pattern generation based on watermark information and secret data. In the extraction process, ECC decoding and sync signal deletion are conducted in the final stage.

The difference in extraction process between the $1^{st}$ image watermarking module and the $2^{nd}$ watermarking module is adjustment of watermark embedding strength. In the $2^{nd}$ watermarking, the embedding strength can be stronger than in the $1^{st}$ watermark embedding.

This is described in more detail below. When a document is received, a scan file is generated by scanning the corresponding document (S3302). A specific area of the scanned document is set as an ROI (S3304). Next, a watermarked image may be generated based on the ROI information.

When the watermarked image is inputted to an extraction module, first, an RGB→YCbCr color transformer 3310 performs a color conversion on the watermarked image. A pre-filtering module 3312 may perform filtering on the watermarked image as pre-processing.

Furthermore, a sync pattern generator 3314 generates a sync pattern based on a secret key. A random sequence generator 3316 generates a random sequence based on a secret key.

A sync signal extractor 3318 extracts a sync signal from the pre-processed watermarked image, output by the pre-filtering module 3312, based on the sync pattern generated through the process. Furthermore, an RST restoration module 3320 checks whether RST for the sync signal is present, and restores RST if, as a result of the check, it is found that an RST for the sync signal is present. A folding block module overlaps blocks by folding them based on the RST-restored signal.

Furthermore, a message signal extractor 3324 extracts a watermark message from the folding block based on a random sequence. Next, an ECC decoding module 3326 generates watermark information by decoding the extracted watermark message.

Screen Marker

Figure 34:
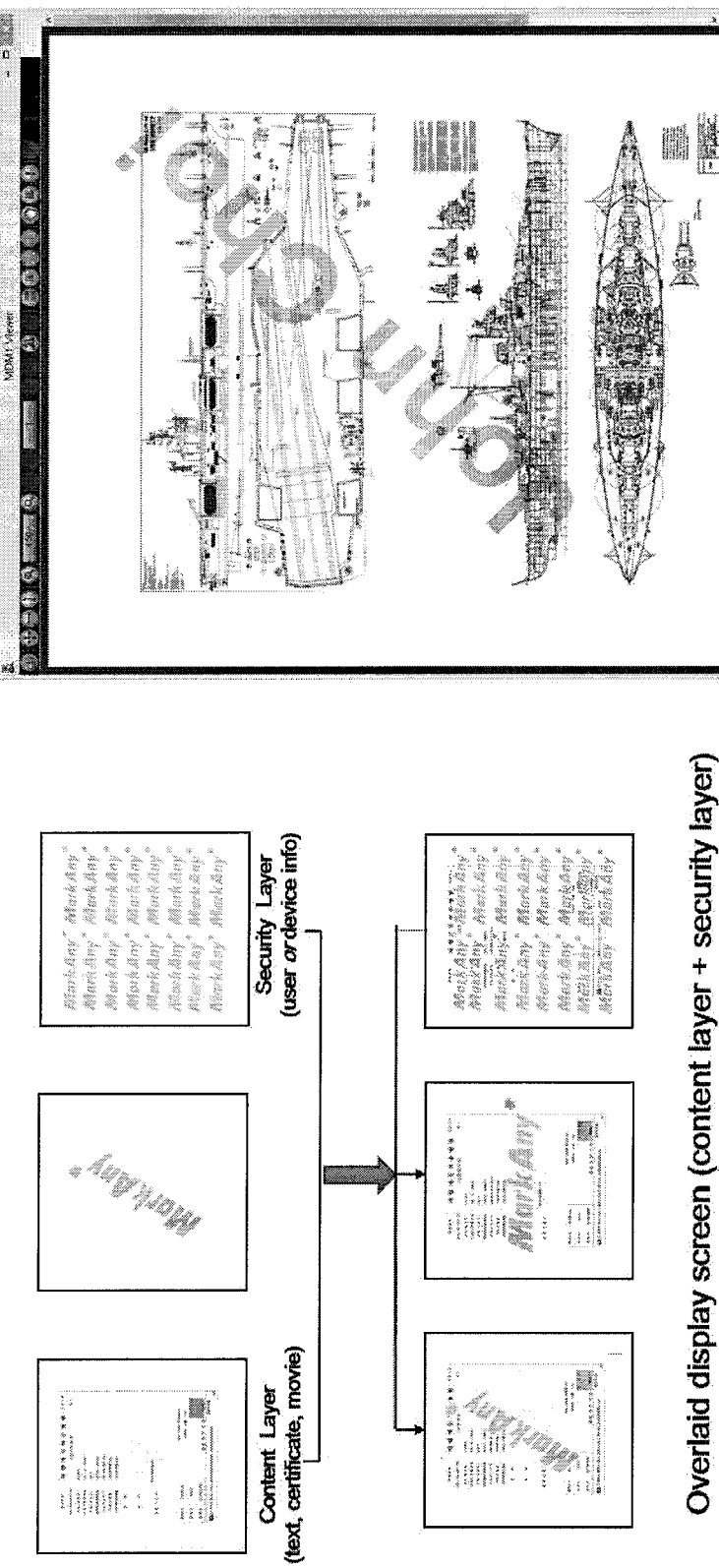
FIG. 34 depicts a schematic view and an example of screen mark.

FIG. 34 depicts a schematic view and an example of screen mark.

Referring to FIG. 34, screen marker generates screen marks that is shown in various composition, design, and structure. Some embodiments of the present invention have only one $1^{st}$ watermark, text watermarking, or image watermarking, or both, while the others have $1^{st}$ watermark and $2^{nd}$ watermarking in a same document.

As described in FIG. 34, the $2^{nd}$ watermark can be visible name or logo mark. In order to prevent illegal leakage of digital content through photo-taking or other ways, screen mark technology can be implemented. According to the embodiment of the present invention, the screen marker generates two layers and displays an overlapped image of user information. The system generates a digital content layer displaying digital content and a security layer including security information based on information about a user terminal, and an information, and then displays overlapping image so that the security information of the security layer looks like overlapping with the digital content of the digital content layer. The security layer generation unit may generate the security information including the information of the user terminal and apply a preset transparency to the generated security information. The information of the user terminal may include at least any one of terminal ID information, IP information, a Media Access Control (MAC) address, and login information of the user terminal.

The architecture of screen marker simply relies on two layered structure as described above: a digital content layer and a security layer. According to the embodiment of the present invention, this overlaid structure is very effective and useful in preventing photo-taking sensitive information, or preventing screen capture function on user device.

For example, in some country, all detailed information of sexual criminal, including location of residence, photo of face with a full name are disclosed on web sites when order of courts allows disclosure of those information. However, in order to prevent photo-taking, screen capturing, and uploading the screen displayed information to internet, the government displays name of requesting people on the screen. The information of sexual criminals are revealed to civilians who submits information disclosure request with real name verified by national ID. Therefore, if the requesting person captures screen display and uploads it, it can easily revealed who captured the screen display. This tracing might be very useful in disclosing very sensitive and highly confidential information to multiple users. Because the overlaid screen cannot be separated into original content layer and security layer, nobody dares to take photo, or video shots to disclose to the third party, uploads to web sites of public access, or transfers to another person.

screen mark can be used not only for disclosing public information to civilians, but also for circulating private information to limited members. For example, a government organizations tries to circulate very confidential information to a limited group of people, such as committee members or high-level management team. The confidential information might be bidders in a public tender, candidates for next committee, list of people running for next election, list of registered assets of a candidate, and others. Those information should be protected from illegitimate photo-shot or screen capturing. However, there is no practically effective ways of preventing photo-shot of the displayed confidential information at remote office or even in business office by spying devices. Therefore, the most easy and effective way to prevent those activities might be to display information of information requester on screen.

Screen mark according to the embodiment of the present invention can be usefully applied to interoperability of government organization. Request of inter-ministry information commonly includes very sensitive and confidential information and therefore the information should be protected from illegal leakage, through photo-shot or screen capturing. For example, an officer at Home Land Security requests personal information of a suspicious person to Federal Bureau of Intelligence. In this case, the information should be collected and delivered as a real-time basis. However, the Intelligence is afraid that the information can be leaked out through screen photo-shot or screen capturing. In that case, screen mark might be a good alternative. Also, screen mark can be used in protecting confidential information in exchange of data and document with partner organization. Especially, PLM (Product Life Management) including CAD designing data can be target application of Screen Mark.

As seen in FIG. 34, name of the person the PLM data is delivered to can be displayed on the screen to prevent photo-shot or screen shot. Even in circulating privacy related information inside an enterprise this screen mark might be useful tool.

Printing Marker

As discussed in FIG. 12, the text watermark proposed in the embodiment of the present invention is valid when applied to file conversion and text watermark embedding. With an assumption that the original document is created with MS Office suite, the document will not be available for text watermarking. The user can modify anything, font size, inter-word distance, inter-line distance, etc., and therefore embedding text watermark might be practically meaningless. As described above, that is why text watermarking is initiated with document conversion in which modification of inter-words, inter-lines, and others are possible. In addition, when the original document is converted into a target file format, it can be controlled by the viewer and therefore enforcement of DRM access control is possible.

Even if text watermarking algorithm proposed in the present invention may not be applied to original document, generally indicating Word, Excel, or Power Point document, there is a way to overlay logo mark onto the original document. Just like in the $2^{nd}$ watermarking scheme in watermarking the converted document, the secret data, such as a user ID, IP data, a delivery date, device data, can be embedded into logo symbol or character symbols and then be overlaid with original document.

Figure 35:
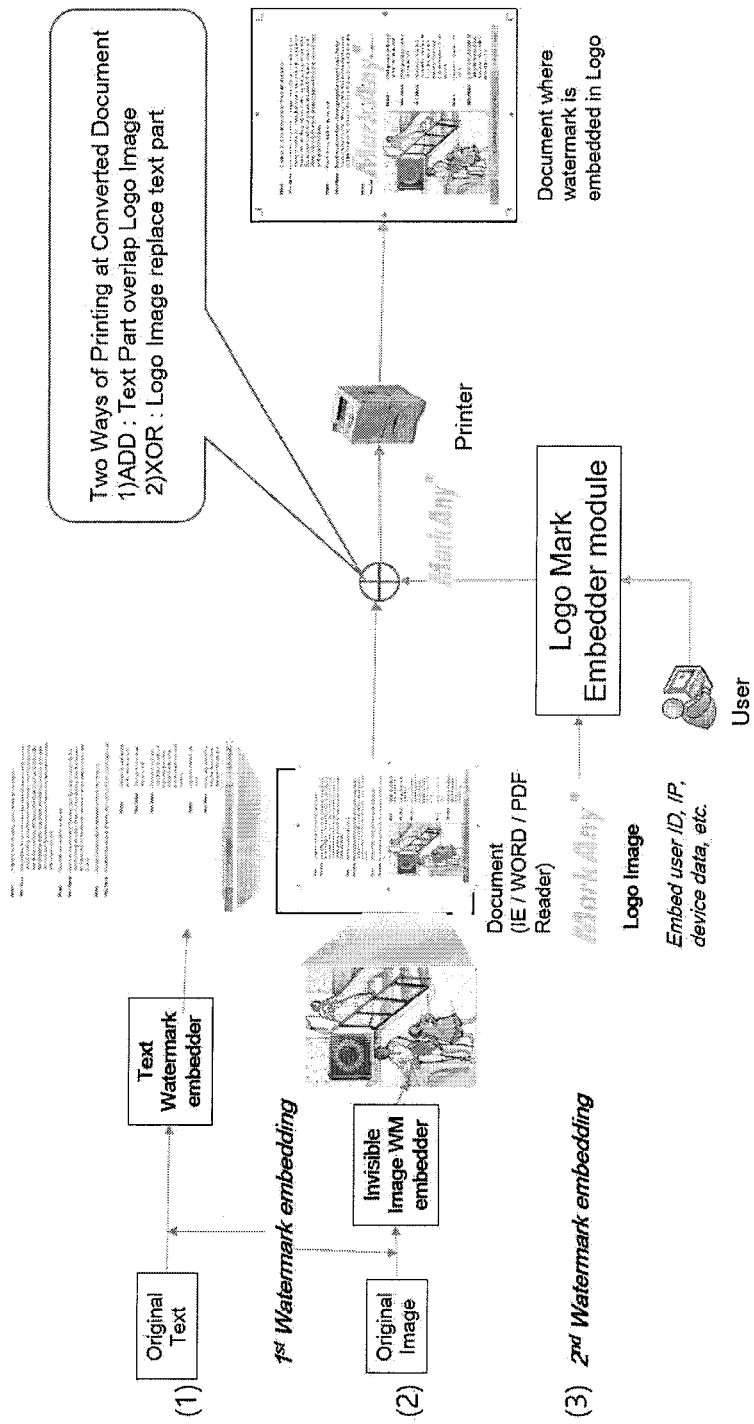
FIG. 35 depicts a schematic view and an example of printing mark.
Figure 36A:
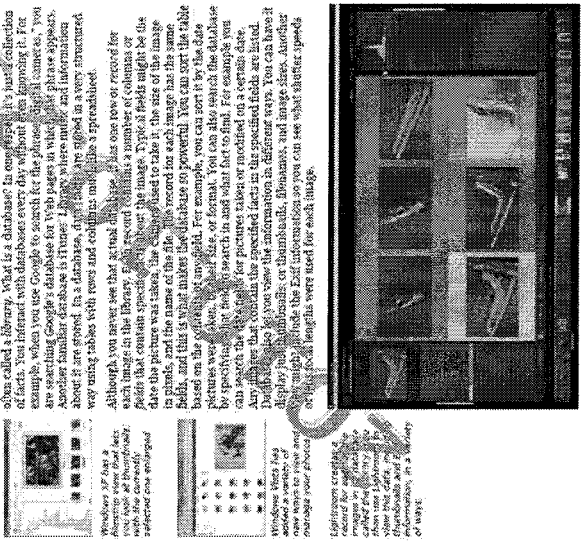
Figure 36B:
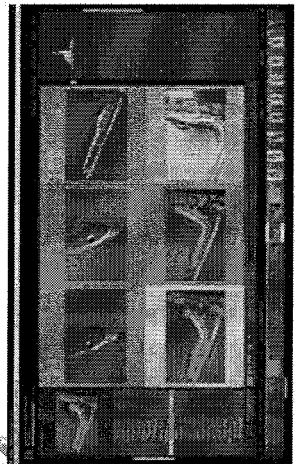
Figure 36C:
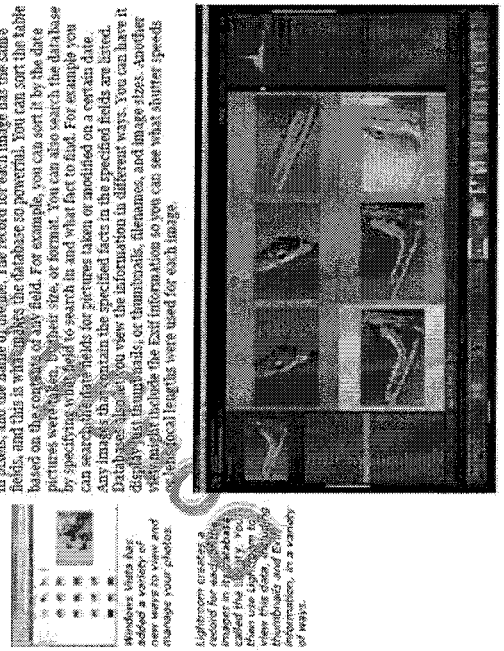
Figure 36E:
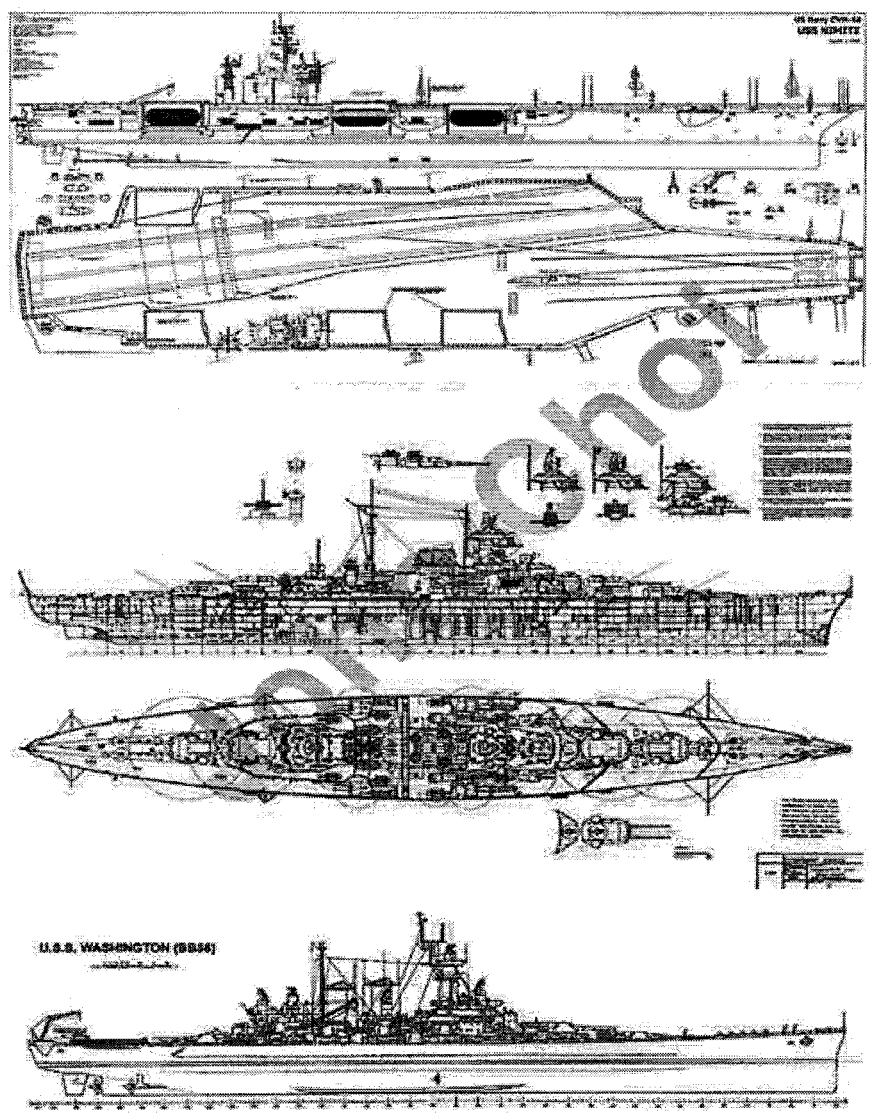

FIG. 35 depicts a schematic view and an example of printing mark.

Referring to FIG. 35, extraction of watermark from a printed original document can be implemented by applying image watermarking algorithm. As discussed in FIG. 31A and FIG. 31B, the enterprise content can be presented in the form of printed paper, scanned image, photo-taken or video captured image, or digital file format. If the document is in digital form, the image watermark extraction algorithm can be directly applied to disclose a user ID, IP information, device information, or other user related information. The image in a digital file, when going through watermark extraction process described in FIG. 24, can easily reveal the hidden information. Even if the detailed description of watermark extraction module and sequential flow, with reference to previous descriptions might be helpful in understanding algorithms and sub-modules.

FIG. 36A through FIG. 36E depict examples of 2nd watermarking for printing.

Referring to FIG. 36A through FIG. 36E, various printing marks are introduced. The $2^{nd}$ watermark which invisibly contains user information can show visibly the user information to prevent illegitimate scanning before uploading to public sites, by printing a name, IP address, a date, or a logo.

Printing marker for the original document is initiated by a call of DRM agent to trace information leakage when a confidential document is printed by hiding invisible user information or visible information in the background of paper. Assumption is that the user has access right of 'print' for the content. In this scheme, when a document is printed, visible or invisible information embedded into a logo, trademark, symbolic image, or brand name can be printed in the background of the paper document. Two different ways of hiding invisible information into the printed image are possible: embedding invisible watermark into time-domain or into frequency domain. Time-domain embedding is relatively not robust to signal manipulation, such as compression or RST (rotation, scaling, and transformation) attack, while frequency-domain embedding is strong enough to such attacks. However, as frequency-domain embedding has to go through domain conversion and transformation process, it takes longer time than time-domain method.

In the tracing mechanism, in some embodiment, ID of the user and time data may be embedded into an image or symbol for tracing when the confidential information is leaked out. In some embodiments, this tracing technology can be used as a warning mechanism, rather than preventive measure. When a confidential information or valuable CAD data are found, or submitted as an evidence, the user ID of the printed document or the date of printing may be revealed through watermarking detector. For example, a document which contains user's information in flower image is found and scanned as in FIG. 36D, and it can disclose who printed the document and when the document was printed.

In an embodiment of the present invention, in case of 3D printing watermark embedding, instead of paper printing, can be implemented by THz, Tera Hertz detector. By hiding very tiny colorless chip in the process of 3D printing, information of the product and manufacturer is invisibly embedded into the printed product. In the embodiment of the present invention, one single chip size is 0.2 mm on average when printed, and 3D pattern of 5×5×2 may be printed. The amount of information hidden in printed product may be approximately 125 byte. Then, in order to identify printed product, THz laser detector may be used.

Audio Marker

Figure 37:
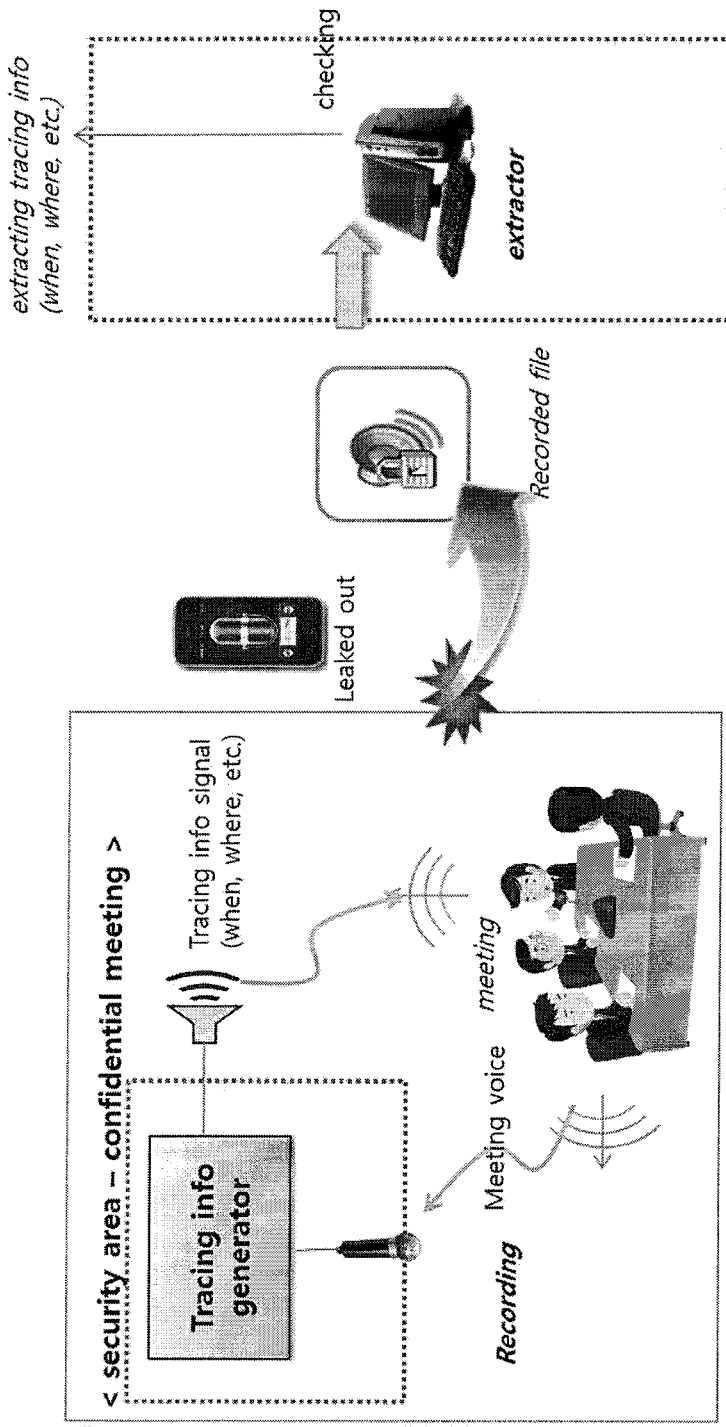
FIG. 37 depicts a schematic view of an audio watermarking system which can hide information of meeting, location and date, into the secretly and quietly recorded information for tracing.

FIG. 37 depicts a schematic view of an audio watermarking system which can hide information of meeting, location and date, into the secretly and quietly recorded information for tracing.

Referring to FIG. 37, an audio marker, called sound QR system may secretly and quietly transmit meeting information, such as date and GPS location data, into the air so that secret recording of the meeting conversation automatically embeds the meeting information into the recorded content. Later, the inaudibly embedded information in recorded content may reveal location and date, possibly name of attendants for tracing purpose. This audio mark can be usefully employed in security tightening organizations, such as national intelligence organizations, military units, or advanced technology developing R&D institutes, to trace illegitimate recording confidential meeting or discourage such illegitimate activities.

For example, a user (an insider) can attempt recording conversation in a meeting room with smart phones or tiny voice recorder disguised as glasses, foundation pen, or USB.

Figure 4B:
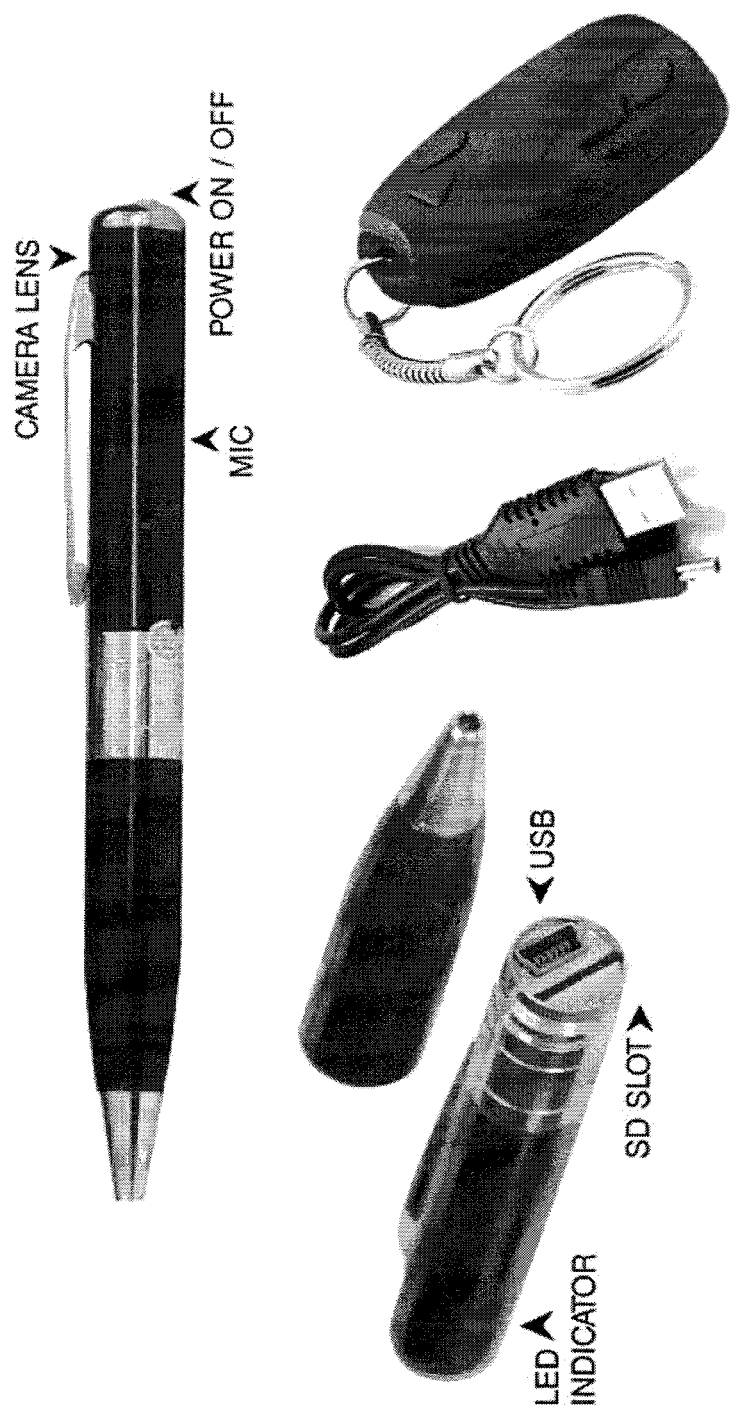
Figure 4C:
Figure 5:
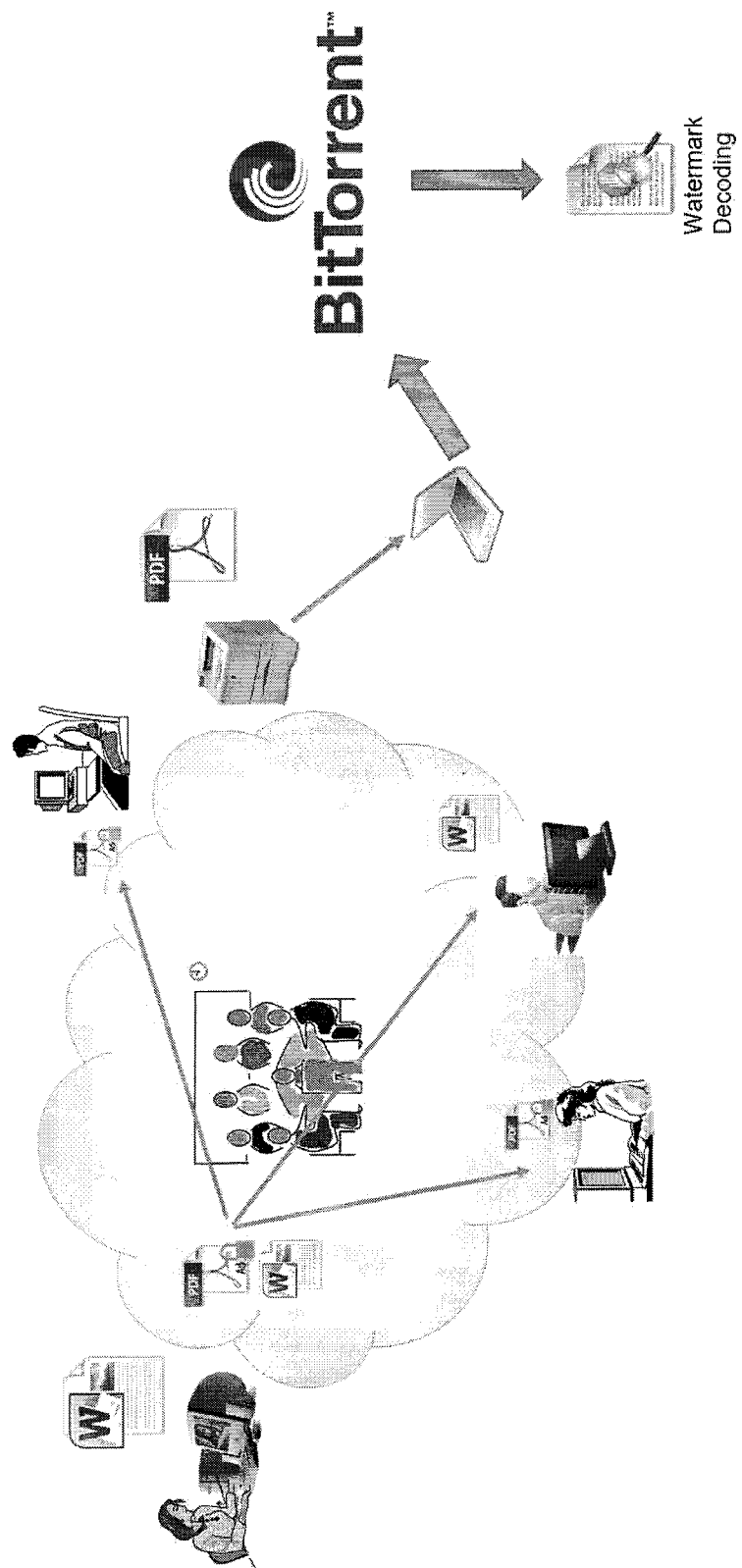
FIG. 5 depicts a case of leakage of confidential information.

FIG. 4A to FIG. 4C show various spying devices disguising shapes as ball pen, fountain pen, USB flash drive, sport glasses, etc., with ample memory space. The camera function and voice recording function in spying devices with wireless transmission mechanism can stealthily move sensitive information to outside without detection. According to the embodiment of the present invention, Open Space Audio Tracing (OSAT) technology which uses an audio watermarking technique which can embed imperceptible data signal into the digital audio file, and has a component which can detect and extract hidden information later may be adapted to the DRM system for embedding audio watermark. In a security zone, such as a military camp or a top government office, this technology can be employed to trace who and when the conversation is recorded. As depicted in FIG. 37, the system is composed of WM (watermark) signal generator, transmitter, and WM signal extractor.

As depicted in FIG. 37, conversations in a security zone can be secretly recorded by one of the meeting participants (insider) and leak to outside of the meeting room. With the OSAT technology, information of 'meeting time' and 'location' are broadcast in the meeting room by signal generator and embedded into the recorded digital file. OSAT, even if it cannot prevent illegal recording, can disclose 'when' and 'where' the conversation was recorded later by detecting and extracting embedded meeting information. Because number of the meeting attendants is usually limited to a quite few members in the organization, the information of the meeting (location and time) can reveal who has made illegal recording.

This audio marker generates audio mark pattern before transmitting into the air and then extracts inaudibly the embedded audio mark from recorded file. In overall, the audio marker system generates audio mark signal and sync signal to create audio mark pattern, and then transmits the audio signal so that secret voice recording automatically includes the inaudible audio mark signal into the recorded file. Audio marker extracts hidden information from it, by detecting sync signal to check existence of audio mark signal, and extracting audio mark from audio marked signal. Then, it can identify relevant information by mapping audio mark information to meeting database.

Audio mark data might be text, multi-media, image data which can be embedded imperceptibly into voice signals. In this exemplary case, audio mark is an audio signal which cannot be recognizable or almost not recognizable by human ears. When the audio mark information is embedded into source audio signal, frequently called host audio signal in watermarking community, and transferred to third party, because of masking effects, audience can recognize existence of source signal. However, audience cannot recognize or almost cannot recognize existence of audio marked signal. Therefore, the audio mark signal does not cause any trouble when an audience listens to audio mark embedded audio signal. Even when the source signal includes silence with no signal at all, the audio mark signal can be included into the frequency bandwidth inaudible to human being. For the reason, even if watermarked audio file is delivered to the third party, the third party cannot listen and recognize existence of the audio mark. There should be an audio mark extractor which is specially developed for extracting hidden information from audio file. As the audio mark can be embedded into a frequency band inaudible to human being, even in a situation where the audio mark is alone delivered to the third party, if the source (host) signal has silence signal, the third party cannot properly hear the sound.

Figure 38:
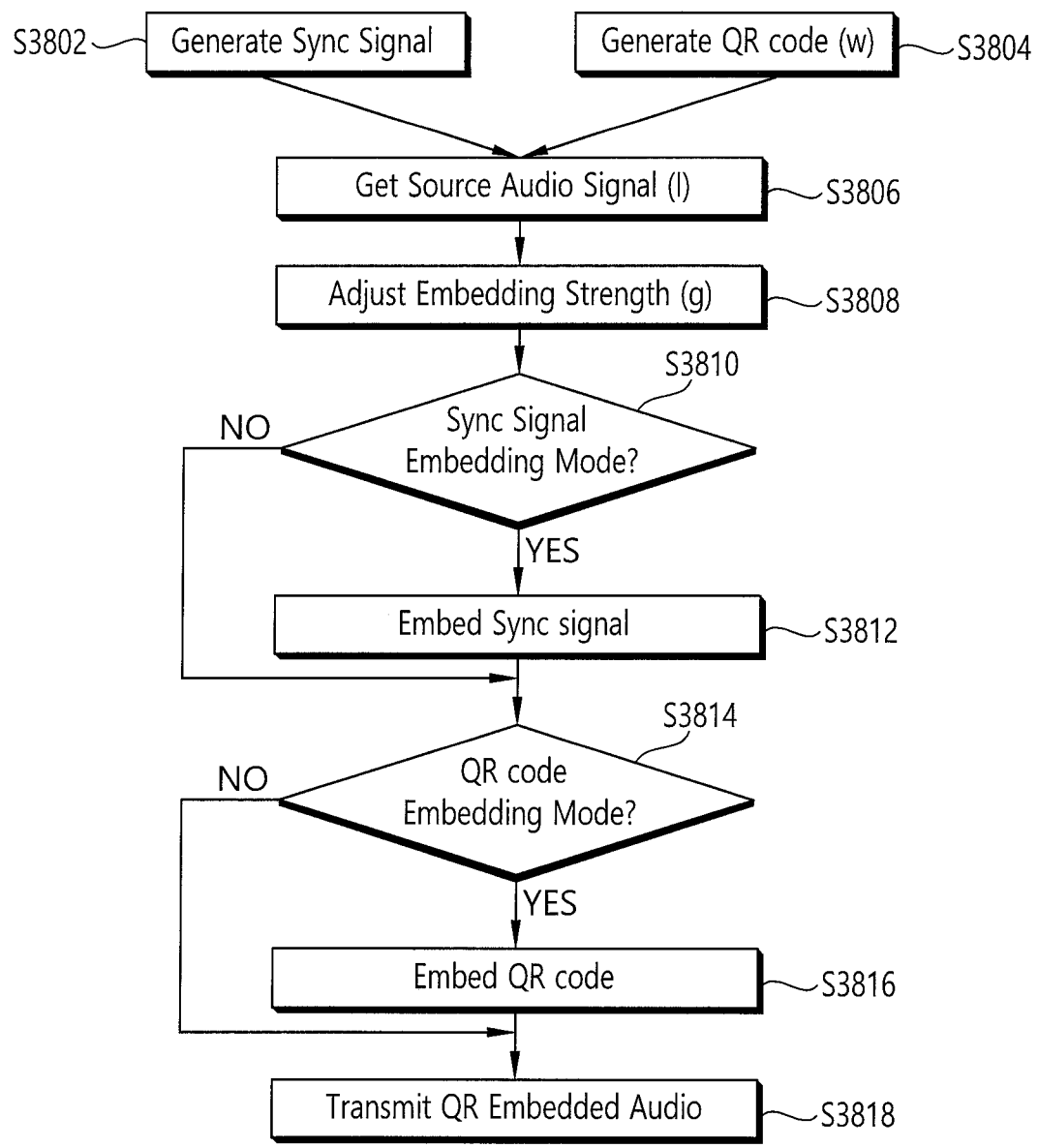
FIG. 38 depicts a flow chart illustrating audio mark pattern creation, corresponding to the watermark generation in image watermarking process.

FIG. 38 depicts a flow chart illustrating audio mark pattern creation, corresponding to the watermark generation in image watermarking process.

Referring to FIG. 38, audio mark pattern creation describes sequential process of creating audio Marked pattern signal. Importantly, the audio mark pattern consists of two parts: sync signal and audio marked signal. Sync signal is repeatedly and periodically embedded into every blocks of source signal. For example, if audio mark pattern has 270 bits of size including 72 bits of audio mark information and 198 bits of CRC and ECC information, then every 90 bits of block, sync signal of 16 bits should be embedded.

Sync signal is embedded into source signal repeatedly, which is controlled by mode information of audio marker. If the control mode is set to 'sync signal embedding', the audio marker embeds sync signal into original signal, while it embeds audio mark pattern signal into source (host) signal when the mode is set 'data embedding'. For example, if an audio mark is comprised of 72 bits of mark information, Sync signal mentioned above consists of head sync signal in front of watermark signal and tail sync signal in the rear of audio mark signal.

This is described in time order. A sync signal generator generates a sync signal (S3802). A QR code generator generates QR code (S3804). Then, an audio mark embedding module may get a source audio signal "i" (S3806). Next, insertion intensity "g" is determined (S3808). Next, whether a mode is a sync signal insertion mode is determined (S3810). If, as a result of the determination, it is found that a mode is a sync signal insertion mode, the sync signal is inserted (S3812).

Furthermore, whether a mode is a mode in which QR code is inserted is determined (S3814). If, as a result of the determination, it is found that a mode is a mode in which QR code is inserted, QR code is inserted (S3816). An audio into which the QR code has been inserted is transmitted to another device (S3818).

For example, for the audio mark 270 bits of information, also, sync signal generator creates sync signal which can be embedded into front part and back-end part of sound QR code to extract QR code properly. This sync signal can be embedded into front of QR code, called head sync signal, or in rear of QR code, called tail head sync signal.

Figure 39:
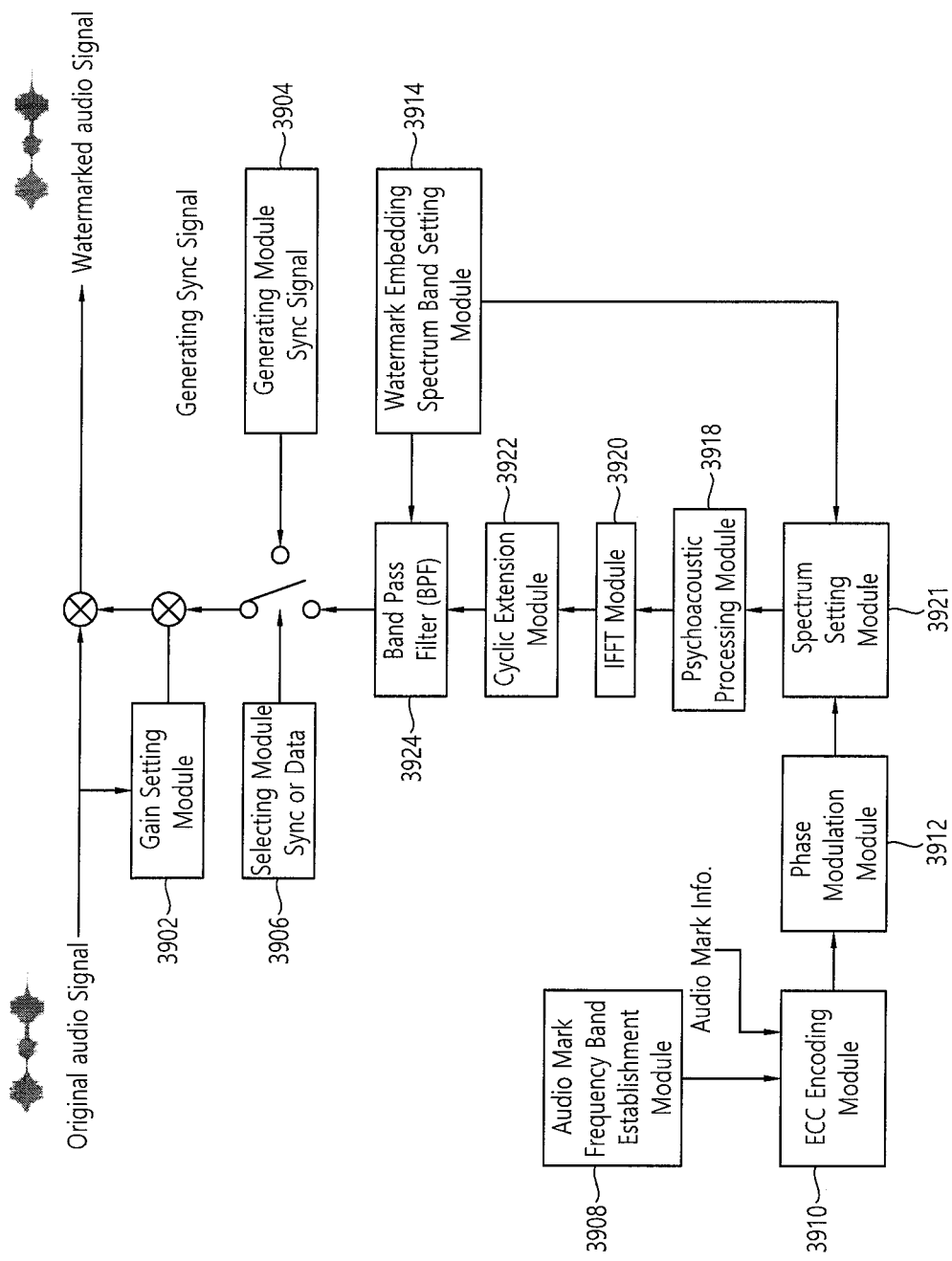
FIG. 39 depicts a block diagram specifically illustrating audio mark generation module in which watermark is generated and broadcast based on mechanism of audio watermarking embedding.

FIG. 39 depicts a block diagram specifically illustrating audio mark generation module in which watermark is generated and broadcast based on mechanism of audio watermarking embedding.

In FIG. 39, audio mark generator includes a gain setting module 3902, a sync signal generating module 3904, a sync selecting module 3906, a frequency band establishment module 3908, a ECC code encoding module 3910, a phase modulating module 3912, a watermark embedding spectrum band setting module 3914, a frequency band selecting module (called as spectrum setting module) 3916, a psychoacoustic processing module 3918, an IFFT transforming module 3920, a cyclic extension module 3922, and a BPF (bandwidth pass filter) 3924.

The frequency band establishment module 3908 establishes frequency band which the audio mark pattern can be embedded. Frequently, a specific frequency band is used for embedding secret information. However, in order to achieve security power, the frequency band needs not be disclosed. The ECC encoding module 3910 can encode audio mark information using ECC (Error Correction Code). Error correction code is needed to enhance successful audio mark detection rate based on error correction process in transmitting audio signal in noisy environment. The phase modulation module 3912 encodes audio mark information as variations in the instantaneous phase of a carrier signal. In this exemplary embodiment, ECC encoded audio mark bit information can be embedded using BPSK (Binary Phase Shift Keying) or DPSK (Differential Phase Shift Keying) phase modulation method. In BPSK, phase difference, for example 180°, can represent '1', while no phase difference can represent '0'. To the contrary, in DPSK phase difference of 180° represents '0', while the phase difference of '0' can represent '1'. The frequency selection module 3916 chooses specific frequency band for embedding modulated audio mark. The psychoacoustic processing module 3918 applies psychoacoustic model which depicts minimum audible fields based on strength of acoustic signal perceptible by human being's ear against frequency. The psychoacoustic processing is need to preserve audio quality of source audio signal. Even if audio mark pattern is embedded into source signal, it should not be perceived by attendants of the meeting through masking effects of psychoacoustic model. On the other hand, in case of silence block in the source signal, the audio mark pattern is embedded weakly enough or into the frequency band so that the audio mark signal cannot be audible to attendants.

The IFFT (Inverse Fast Fourier Transform) module 3920 transforms the psycho-acoustically processed data in frequency domain into time domain data. The cyclic extension module 3922 embeds cyclic extension signal to prevent interference between data symbols. For example, in order to prevent interferences between the IFFT transformed data symbols, same signal can be embedded in front or in back of specific interval signal. For example, the signal is as "1, 2, 3, 4, 5, 6, 7, 8, 9, A, B, C, D, E, F, G, H, I, H, K, L, M", then the last part of this signal, "E, F, G, H, I, H, K, L, M" can be inserted in the front part, producing "E, F, G, H, I, H, K, L, M, 1, 2, 3, 4, 5, 6, 7, 8, 9, A, B, C, D, E, F, G, H, I, H, K, L, M". This processing may be needed to correct errors caused by signal delay and others in the multi-channel transmission.

Output signals from cyclic extension processing should go through band pass filtering by the BPF 3924 in which the signals pass through audio mark band established before. With this filtering, output signal of band pass filtering becomes audio mark which can be embedded into recorded voice signal without noticeable noise.

Figure 40:
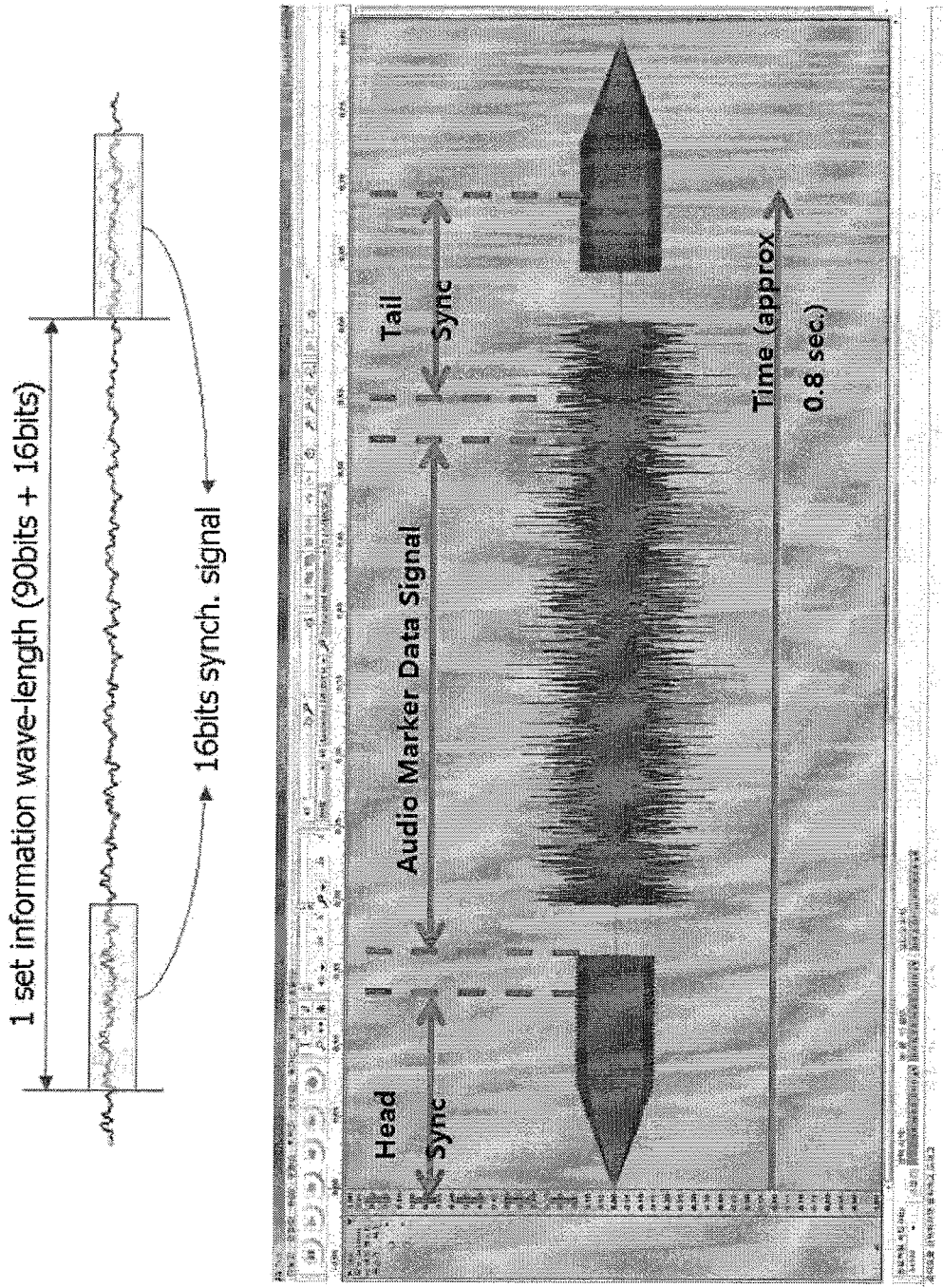
FIG. 40 depicts a schematic view illustrating composition of audio mark.

FIG. 40 depicts a schematic view illustrating composition of audio mark.

As depicted in FIG. 40, The sync signal generated by the sync signal generating module 3904 is embedded in front and in rear of the audio mark pattern. The sync signal embedded in front of the audio mark pattern is called 'head sync', while the sync signal embedded in read of the audio mark pattern is called 'tail sync'.

Returning to FIG. 39, strength of the sync signal and the audio mark pattern is determined at the gain setting module 3902 depending on strength of source signal. The gain setting module 3902 can measure strength of the source signal, and then adjusting the signal gain. It can increase the signal gain when strength of the source signal is strong, and decrease the signal gain when strength of the source signal is weak.

The audio marked signal can be represented as the following:

$$I'=I+g \times W$$

where, I is source signal, g is gain, and W is embedded audio mark pattern with sync signal.

Figure 41:
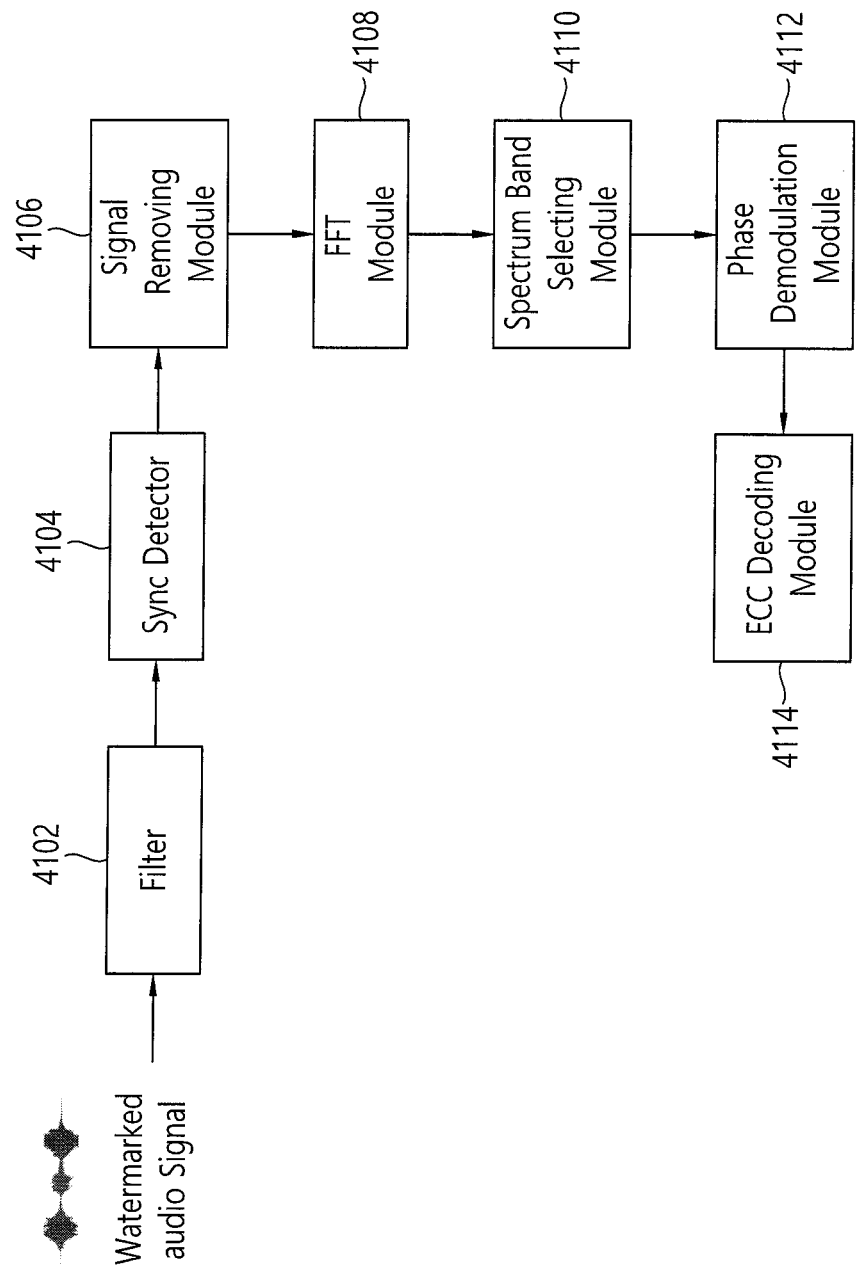
FIG. 41 depicts a block diagram specifically illustrating audio mark extraction module which can reveal time and location of meeting.

FIG. 41 depicts a block diagram specifically illustrating audio mark extraction module which can reveal time and location of meeting.

Referring to FIG. 41, an audio mark analyzer consists of the following modules:

(1) An audio signal filter 4102 performing audio signal filtering, (2) A sync detector 4104 for detecting the sync signals in filtered signal corresponding to the audio mark pattern, (3) A signal removing module 4106 for removing cyclic extension signal from output signal of filtering module, (4) A Fourier transforming module 4108 for fourier transforming output signal of cyclic extension removing module to convert time-domain signal into frequency-domain signal (5) A spectrum band selecting module 4110 for choosing frequency band in which the audio mark information is embedded (6) A phase demodulation module 4112 which demodulates signals of aforementioned selected frequency (7) An ECC decoding module 4114 which decodes the audio mark information using ECC decoding.

Figure 42:
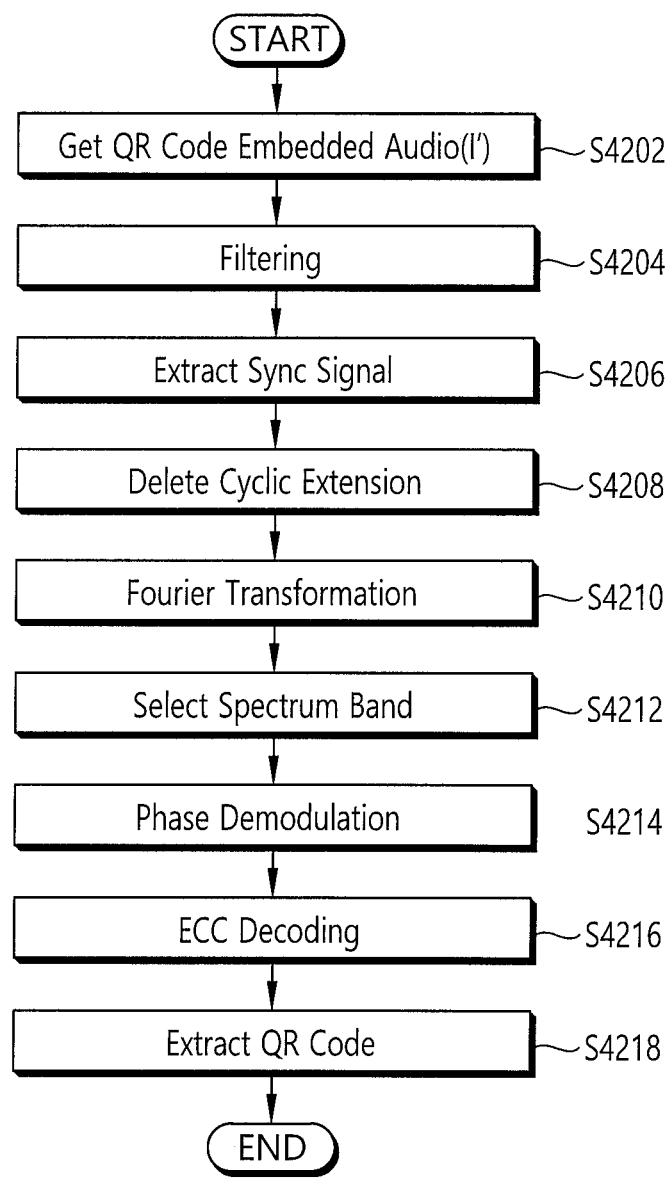
FIG. 42 depicts a flow chart illustrating audio mark extraction, corresponding to the watermark extraction in image watermarking process.

FIG. 42 depicts a flow chart illustrating audio mark extraction, corresponding to the watermark extraction in image watermarking process.

Referring to FIG. 42, the audio mark extraction goes through the following stages. At first, the audio mark extraction module get QR code embedded audio signal (I') (S4202). Then the audio signal can be filtered (S4204). A Sync signal detection module detects existence of audio marker signal by extracting sync signal from obtained audio/video file. Then, audio mark signal is extracted from the audio file and recovered (S4206). Information relevant to record meeting is identified and collected based on the extracted watermark information, such as date, location, and attendants.

Audio mark information recovery consists of the following steps: a process of deleting cyclic extension signal from the filtered audio signal (S4208), a process of transforming time-domain signals produced in previous process into frequency domain signals through fourier transformation (S4210), a process of selecting signals in the bandwidth where fourier transformed audio marker signal is embedded (S4212), a process of phase demodulating signals from selected bandwidth(S4214), a process of ECC decoding to decode the demodulated signal (S4216), and a process of extraction for QR code from the decoded signal (S4218).

Document Distribution

Referring to FIG. 11A and FIG. 11B, the content sharing tool may be used in various situations; in distributing enterprise content inside organization or sharing enterprise content with external partner organizations, in distributing commercial content to users or content reviews for pre-release, or in uploading created content to distribution center by content creators or copyright owners. An exemplary embodiment of the present invention is shown in FIG. 11A and FIG. 11B.

In designing content sharing tool 1030 depicted in FIG. 10, considered are (1) choosing target file, (2) choosing target group, (3) specifying access right for each user or group of users, and (4) choosing content delivery method, manual or through server.

In FIG. 11A, a user can select a content file or a group of content files from directory of user device. Then, the user can choose recipient a group or multiple group by clicking mouse. Because the exemplary embodiment of the present invention follows group key structure described in author's patent filing document, selection of sharing group is important. Some users in a specific group cannot share enterprise contents with users in another group, except cases of 'enterprise sharing'. For example, a user in group, accounting department cannot share enterprise content with users in group strategic planning department, except 'enterprise wise sharing'. However, the user in group, accounting department allows purposefully 'enterprise sharing', the other group users, such as group, strategic planning department, and user group R&D department to share the content. Specification of sharing group may be reflected in retrieving one step higher group information and selecting key index number. In the exemplary embodiment of present invention, the specification of access right for a user or a group of users is done with clicking box in content sharing tool menu, 'edit', 'save', 'blockcopy', 'watermark', 'capture', 'print ( ) times', 'open ( ) times', 'period ( ) days'. Also, an exchange policy can be specified: 'personal', 'dept', and 'company'. Based on this tool menu, the access right of a recipient can be strictly controlled. Exchange policy of the tool menu suggests ways of content distribution to the third party, person to person, a group-wide, or enterprise-wide. Once the enterprise content has specification of exchange policy as 'person to person', then the recipient cannot send the content to a group of users in next step. Only delivery of 'person to person' is allowed.

In the exemplary embodiment of present invention, the enterprise content can be delivered directly to recipient without going through the DRM server, for example, USB, CD, or SD. In case of direct delivery, the content sharing tool 1030 encrypts a base header of a file using an 'enterprise key'. Because everyone in an organization automatically receives the 'enterprise key' when he or she logs in the DRM server, and keeps it in the secure box. Therefore, the base header of delivered content is encrypted with the enterprise key and then it can be decrypted. In the aforementioned scheme of 'triple header' content file structure, the only commonly sharable key on user device is the 'enterprise key', and therefore, the base header should be encrypted with the enterprise key. Then, content header key can be encrypted with only a 'group key', meaning that a group of employees, belonging to a department or task team, can share the content.

In the indirect distribution with involvement of security server, the content file header will be opened and the access right of each recipient can be modified by the DRM server. The base header of the content is decrypted in the DRM server and encrypted with public key of recipient, or enterprise key. Based on sender's request, the content header can be encrypted with one of the four different categories: a personal key, a dept key, a team key, or an enterprise key. The access right of each recipient can be different depending on the position, department, and job assignment, and therefore it can be modified in the process of content delivery through the security server.

Content sharing based on enterprise-wide common key can be done through sharing the enterprise key. Because this mode of content sharing is based on common key, when a content is delivered to users in an organization, it can be opened by all employees. However, even if the key index number disclosed in the base header pointing to a group key in the secure box, the index number of the security header cannot be used for decrypting the content. Therefore, if the content encrypted with the enterprise key is delivered to malicious hacker, and if the hacker does not have the group key, the hacker cannot open the content header. Eventually, the hacker cannot properly use the content. That is why multiple layered encryption is employed in exemplary embodiment of the present invention. Also, because the encryption key of content body is randomly generated, even if external hackers possesses a key for decrypting a content, they cannot utilize the same key to decrypt another content.

In this content sharing scheme, the encrypted content can be delivered through portable devices, or e-mailing systems, or even security server. If the content is delivered to members of a group through security server, the file header and access right of each user need not be changed nor modified.

Document/Data Distribution System

Text watermark algorithm proposed in the embodiment of the present invention is implemented in document/data distribution system. In distributing authored document the algorithm can be employed as a part of information sharing module of the DRM system to trace possible information leakage. The same algorithm can be independently implemented as a part of a document distribution system which aims at sending securely digital document/data to colleagues for collaboration, while the same module can be adopted by a document repository system for public service, or for enterprise information sharing.

Referring to FIG. 13 through FIG. 19, the text watermarking module related to the DRM system can make contribution in protecting enterprise confidentiality by providing tracing function, discouraging malicious attempt. The DRM system provides preventive control, relying on encryption and access control of each user. When there was no other way to take digital document to malicious third party except wired internet, DRM may effectively prevent information leakage by tightly controlling user's activity depending on user's privilege.

However, with advent of tiny but powerful micro devices and introduction of high performance smart phones in daily life, the existing DRM technology alone is not enough to protect enterprise confidentiality. Furthermore, in the age of IOT (Internet of things), wearable devices, driverless car, and drone, many devices can be serious threat to enterprise security. Because of those technical advancement, the existing DRM technology should evolve to incorporate tracing capability of text watermarking into existing preventive functions. As shown in FIG. 13, text watermarking of the embodiment of the present invention may provide a tracing function as a part of the DRM system for enterprise security.

Thus, when text watermarking is integrated with the DRM system, there can be synergic effect between the DRM system and the text watermarking module. In the exemplary cases of text watermarking applications, 3 different systems are introduced.

First, text watermarking system is integrated in the DRM system as a part of secure information sharing module. As described above, the DRM system supports creations of important documents at user devices, while controlling user activities related to file editing, transferring, or printing. The DRM agent program keeps monitoring user's activity and prevents user's un-allowed access to the confidential information. If the user is not allowed to 'read' the confidential information, as the file is not encrypted with the user's key and delivered to the user, he or she cannot open the file to read. Because of the encryption with DRM controlled key, when the file is copied and delivered to malicious third party, it cannot be properly used. Then, there are many functions controlled by the DRM agent residing on user devices: 'print', 'transfer', 'expire date', 'edit', 'copy and paste', 'number of printing', 'number of opening', and etc. The access right of each user is determined by position, department, taskforce team, or job assignment for each document. Also, the confidentiality of each document should be determined by confidentiality class set by author, the DRM server, a department, task force team of document origin, and/or a general enterprise security policy.

However, when an author of confidential documents attempts to distribute them to colleagues or external partners, there should be sure ways to prevent illegal leakage, while letting internal users or employees of partner companies edit, print, copy & paste, or illegal transfer. The best advantage of this approach is that users can use the editing programs as it is, such as MS office, Google Docs, or others. However, in case a user or a group of users do not have any DRM agent program, the document should be converted into different file formats with invisible watermark for secure distribution.

Second, text watermarking system can be integrated with a document distribution server to distribute important documents to internal users or employees of partner companies. In this scheme, because the recipient of the document does not have any DRM agent, there should be a controlling mechanism.

Figure 43A:
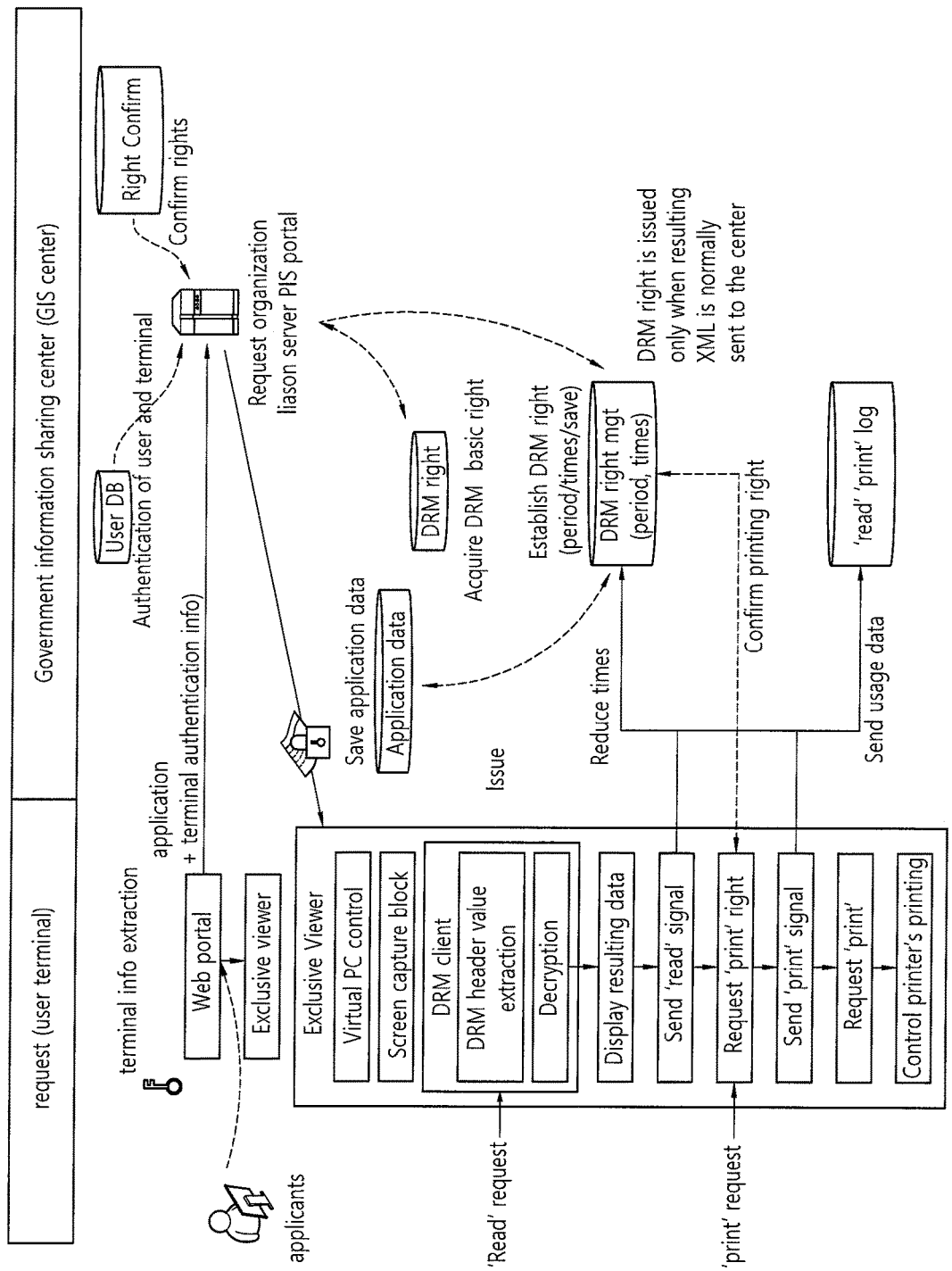
FIG. 43A and FIG. 43B depict a flow chart illustrating an example of content sharing user interface derived from an DRM system in which specification of user, user group with access right of each user, user group can be done with simple clicks.
Figure 43B:
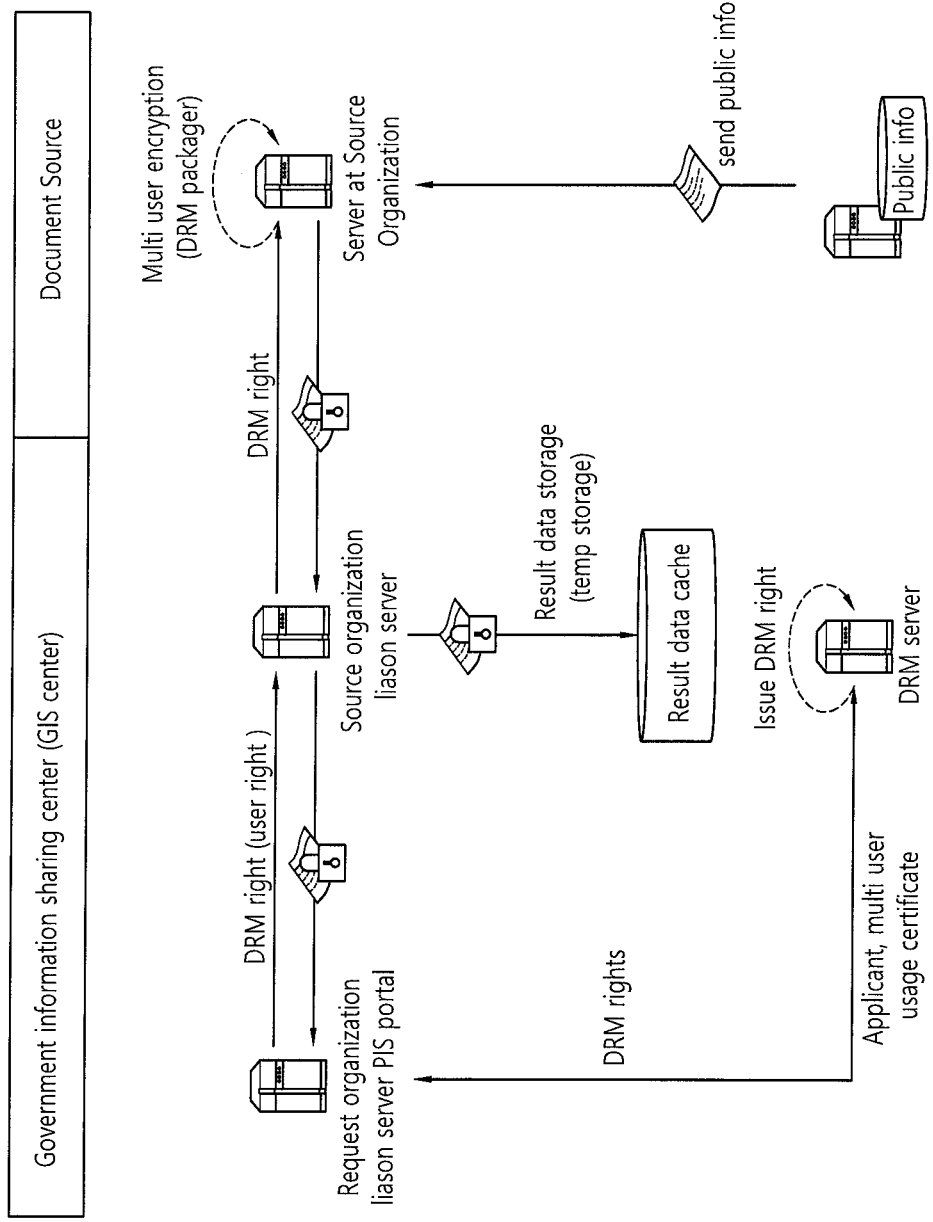
Figure 44:
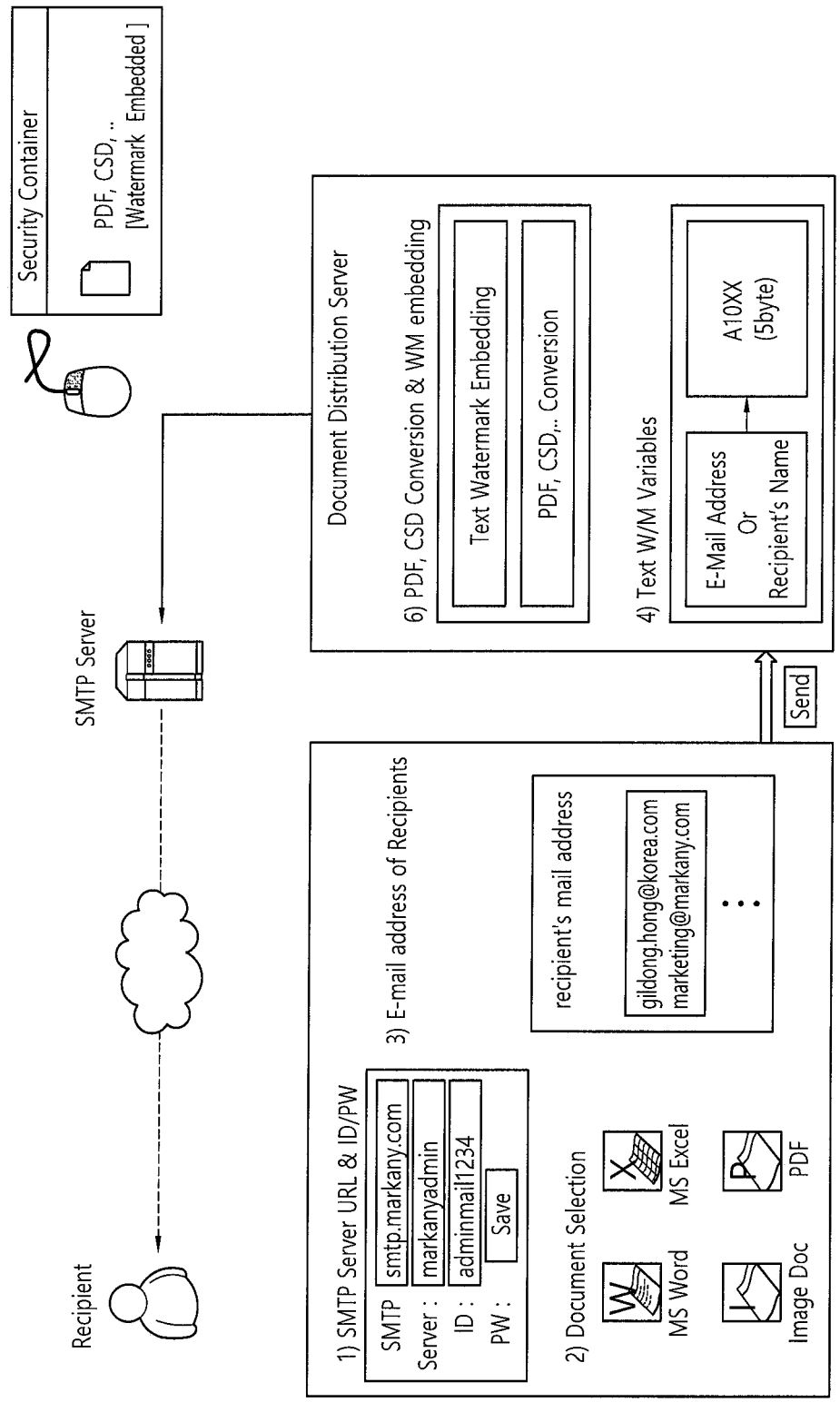
FIG. 44 depicts a schematic view illustrating an example of document distribution system in which text watermarking and image watermarking are comprehensively employed in government information sharing system.

In the exemplary case described in FIG. 43A, FIG. 43B and FIG. 44, it may be called 'secure container'. The secure container is a software package which is built on top of document viewing applications, for example PDF or CSD viewer, integrated with the DRM components. Because the secure container can control one or two file formats only, the program itself is much simpler, compared with the DRM agent, but controls use of document in strict way.

Addition of the DRM component on top of document viewer is considered. For example, as a PDF file viewer is very popular in the network environment, a user can send confidential information through the document distribution system, but would like to control of the access right of each recipient or recipient group. However, the PDF viewer does not provide detailed control of user' right, such as 'number of printing', 'number of retrieval', 'transfer to third party', 'copy and paste', 'expire date', and etc. which are available at the DRM system. Thus, in this scheme, with control of user' access right, the secure container enables enterprise security officers to distribute confidential information safely, while letting recipients enjoy excellent viewing mechanism provided by the PDF viewer.

Encryption and decryption of the files inside the secure container can be conducted in kernel level or in other secure locations, for example, virtualized personal area, TEE environment, or TPM chip in the embodiment of the present invention. As in the DRM system's information sharing tool, in this architecture, the information sharing function is added to support distribution of the confidential documents.

Third, text watermarking can be employed in the document repository system. As described in FIG. 45, it can be integrated with various business platforms. Many enterprises already installed business platforms, such as DMS (document management system), GW (group ware), or ERP (enterprise resource planning) system, to support collaborations between internal users and employee of external partner enterprises. In this situation, the text watermarking according to the embodiment of the present invention can be used as a part of business platform to provide tracing capability. In the document repository system, an author generates a document and then upload to the repository server where other users can download the document for review or comment. Because there is no DRM agent on user device which actively monitors user activity and aggressively control user's access to the document, the document repository system can be differentiated from the DRM system.

However, there are many variants in the document repository system integrated with text watermarking module, depending on the scope of access control of a user or user group. There can be no control at all, where only tracing function is included in repository. In other case, user's access control is executed by the secure container where document viewers, such as PDF viewer or CSD viewer, are fully supported. In this scheme, even if there is no active DRM agent, the secure container has mechanism of controlling user's access to the document, practically there can be the same effect to enterprise security as DRM system.

FIG. 43A and FIG. 43B depict a flow chart illustrating an example of content sharing user interface derived from an DRM system in which specification of user, user group with access right of each user, can be done with simple clicks. Using this content sharing tool, specifically the DRM document delivery tool, the confidential documents can be converted into target file formats to tracing with watermark information hiding and controlling access right of each users.

In FIG. 43A and FIG. 43B, a Government Information Sharing (GIS) center is described. Government organizations keep sensitive information and confidential data for its operations. For example, criminal records at national police agency and health-care data at Health-Insurance Management Office are very sensitive information. Likewise, information of district development plan at old city block has to be kept as confidential information for a time being before public release. Therefore, when information in government organization should be shared with other agencies, a risk of the information leakage and a social impact caused by the leakage may be too high. Furthermore, because most information at government organizations are currently stored in digital form, when it is delivered to the third organization through network, it can be very easily made copy, transferred to other parties with a simple click of internet browser button, or modified for malicious purposes. If the document can be 'read', or 'save on the computer' by wrong person, it can cause disastrous result, possibly leading to a number of lawsuits and public arguments.

To share government information in digital age, various schemes have been suggested mainly based on PKI system. For example, there are MD5 and PKI system for information sharing at government organizations. The framework may be used for secure information sharing, emphasizing on the importance of encryption, PKI, multi-factor authentication, federated ID management, role-based access control, etc. And, there is an internet based trust model architecture for information sharing in the government organizations. Regarding that, the trust is considered important, while a negotiation is more important than others. And there also are fear of revealing sources and losing autonomy and thus it results in costly and redundant efforts that make lower productivity, achieve limited data-reuse and integration. Therefore, a negotiation based information sharing system may be needed including effective and rewards and ensures due credit. And a DRM approach in the information sharing system to limit illegal access to sensitive information can exist.

Even if PKI scheme for sharing information between government organizations can provide very secure mechanism of authentication, confidentiality, and non-repudiation, still there remain several problems and potential risks. What PKI scheme can provide is to guarantee secure delivery of document between right parties and no illegal modification while a document is in transit. However, even when the document is delivered to the right person without any modification, it can be modified at right person's devices after delivery, or easily screen copied into a new file to transfer to the third parties. For example, a document of criminal record is delivered to person-B at organization-B from organization-A. The document is received using a symmetric key between the organization-A and the organization-B and then opened at B's computer. Using the function of 'cut and paste' and 'screen capture', the document can be easily copied into a new file, or modified. It means that the PKI scheme provides a secure delivery of a document between two parties or multi parties, but cannot guarantee secure 'use' of the document, protecting from misuse when it is delivered.

Government Information Sharing (GIS) center is designed and implemented to provide information service between government organizations (G2G). G2G (government organization to government organization) sharing is aiming to increase productivity and efficiency of public service by decreasing time spent in manual delivery of documents and also by decreasing errors caused by manual hands-over. For example, officers at national tax agency need various information and documents from Ministry of Foreign Affairs and Ministry of Commerce, when investigations of tax frauds are in progress for a specific business entity and person. Because of the urgent requirement of interaction and exchanges of information between government organizations, most governments believe that electronic transmission of the documents between government offices will provide faster and more accurate processing, leading to much higher productivity in public administration system. However, there have been serious concerns: for example, illegal access and leakage of the sensitive information, possible forgery, and illegal modification.

Government officers or employees at financial organizations can access information at government's organization through GIS center. Government information sharing process goes through the following steps:

(1) A user, government officers or employee at public financial organizations, sends requests of Public Certificates of GPKI systems after authentication process at GIC center.

(2) The user can login GIS center using GPKI certificate.

(3) The user requests documents or data which are stored in other government organizations.

(4) GIS center transmit user's request to the organization's server where requested data resides, after checking applicant's ID and certificates.

(5) The government organization (document source) owning the requested data reviews the request, retrieves text data/document, applies text watermarking and image watermarking, and encrypts with GPKI, and then transfers encrypted data with digital signature to GIS center.

(6) GIS center stores encrypted data with time stamp into storage in case of future validation check of the transaction, and then delivers encrypted data to applicant.

(7) The applicant receives requested documents in e-container, and uses viewer to read the documents.

The digital data can be not only easily copied and manipulated, but also indistinguishable from original document, and therefore there should be technical measures to keep original document safely in case of legal dispute and to prevent illegal manipulation. When a user of GIS system sends request to the center using a web application form with PKI certificates through web, an e-container is automatically generated with application of text watermarking. The request specifies the document, a purpose, a department and a person, requested operations ('read', 'print'), and expire date. Currently, two operations are possible: 'read', and 'print' documents at applicant terminal. When the e-container arrives at GIS center from applicant, validity of the request is checked with retrieval of employee (requester) information from the database. Based on the position, the department, and a job assignment, GIS system creates a 'DRM access right' package which is included in the e-container. Then, the e-container is delivered to document source in which requested document resides.

After the server system at document source finishes review of the request package, the requested document may be sent to the applicant through GIS center delivery, arriving at the terminal of applicants. The DRM agent program resides at applicant's terminal to control activities of applicant, according to the access right information. For example, the applicant does not have access right 'to print document', but tries to print document using a network printer or a virtual printer. In that case, printing should be blocked and in extreme case, the document should be erased from the applicant's terminal or device.

As discussed above, the request information is automatically packaged into e-container with PKI certificates and delivered to GIS center through web. GIS server checks the request and decides whether the requested access right is properly specified or not. The HR database in GIS system provides information of the applicants to GIS server: such as the position, the department, the assigned job, and a temporal assignment. Based on the applicant's information, GIS server generates access control list (ACL) and attaches the list to request form in the e-container.

After establishing access right of the applicant, DRM server in GIS system encrypts document and right object (access control information) using first encryption key, and then delivers it to DRM distribution management unit. This process is very similar to the job of right object server in DRM systems which creates a list of access control for a user and then encrypts before transferring control function to DRM agent at user side. In this stage, time stamp is used to prevent possible disputes over authenticity of the request and feedback.

When a document arrives at government officer's device, PC or mobile devices, it should be decrypted at first, and controlled by the DRM agent. Because e-container is encrypted with user's public key and delivered to the applicant, the package can be decrypted only by right person who has a private key. When an applicant successfully decrypts the package and opens the package, he or she can use it according to the predefined access right. First of all, if the user who receives the document package is not eligible for e-container, he or she cannot open the package in normal way and thus cannot read them. Even when the user opens the document in normal way but does not have the right of 'save on the user devices', he or she cannot save the document on the computer or other devices. Also, if the user does not have right of 'edit', he or she cannot edit the document. Control of 'print' function can be enforced in the same way of the other functions, 'save', 'read', and 'edit'. Screen capture function at user PC also can be deactivated when the user does not have right of 'screen capture'. As there are available so many capture programs in internet sites, users can create a new file by capturing each page of the decrypted documents and by editing them into a file. However, the screen capture function is completely blocked by the DRM agent and thus no other ways are possible to go around it.

FIG. 44 depicts a schematic view illustrating an example of document distribution system in which text watermarking and image watermarking are comprehensively employed in government information sharing system. For interoperability in a government system, a user of a government organization can request confidential and sensitive information from another ministry through government information sharing system. Then, based on the user information of requesting officer, the government information sharing center may get the information and put into a security container before delivery to the requesting officer with access right. The access right of the recipient is controlled by a document viewer.

Referring to FIG. 44, a document distribution system is depicted. In the document distribution system, whether it is integrated with other business platforms or e-mail systems, or whether it operates in stand-alone mode, an author of confidential document can send confidential information through a document sharing module to colleagues or external partners. Then, the original document should be converted into target file format, say PDF or CSD, and included into the safe container with specification of access right for final delivery. After original files are converted into target file format, such as PDF or CSD, text watermarking is applied for differentiation of each document delivered to each user. When the document is delivered to end-user, the access right is controlled by the DRM function of the secure container, even if the documented is read in target file viewer.

The document distribution system has simple structure, compared with DRM's encrypted file and the DRM agent. Because the DRM agent should handle various applications programs available on user device, generally structure and program interface is much more complex than the secure container, and heavy. However, the secure container controls only a single application or two application programs, depending on system configuration, and therefore takes much simpler structure and interface.

Because of the tracing capability of text watermarking, the document distribution system can be usefully used in financial analysis firms, investment firms, law firms, or pharmaceutical companies.

Figure 45:
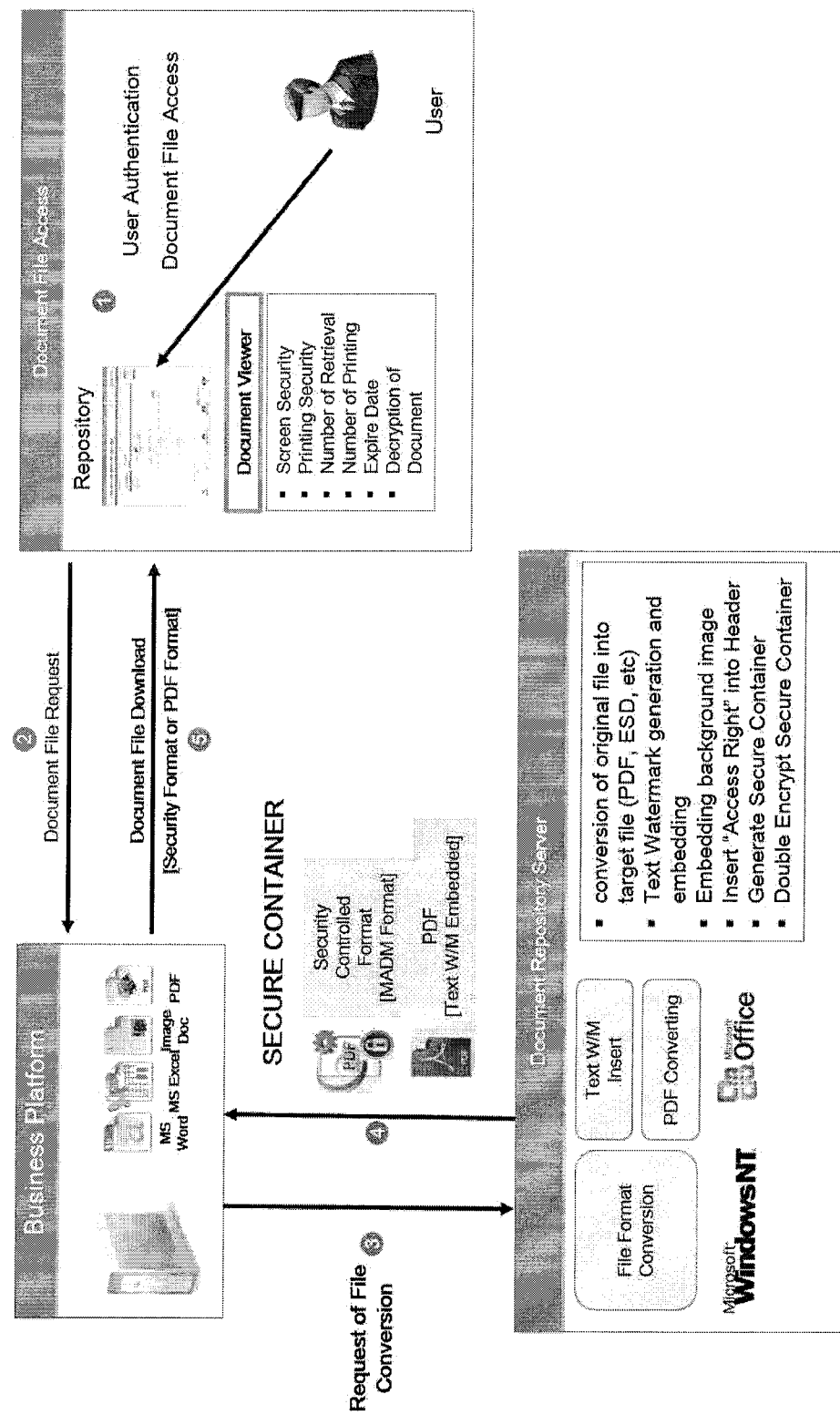
FIG. 45 depicts a schematic view illustrating an example of secure document delivery system which was built for public service organization in a country.

FIG. 45 depicts a schematic view illustrating an example of the secure document delivery system which is built for public service organization in a country. The system employs text watermarking module and image watermarking module before delivering a requested document to a limited number of civilians with information hidden into the document to prevent illegal leakage and prevent modification.

Referring to FIG. 45, a document repository system is described. In the document repository system, an author uploads documents to the repository system and other users can download the document, where a repository server system supports distribution of confidential information by converting the original uploaded document into target file format, embed watermark into the converted document, and put it into the secure container with specification of access right of each recipient. Even if file sharing and distribution function with the secure box is very similar to the document distribution system described above, it is differentiated in that documents are not directly delivered from a sender to recipients. Rather, the documents are delivered through downloading.

This architecture is very useful in distributing government documents which should not be altered and at the same time which should be strictly controlled. For example, a city government sets up a document repository system in order to disclose sensitive documents to civilians who want to retrieve data and a document relevant to a district renovation plan. There are so many people who are related to and involved in the district renovation project: house owner, house renter, project financer, city government officers, representative of district, district congressmen, and others. Agreement of the project takes several years with a lot of petitions, complains, negotiations, and decision making. Because of the complicated decision making process and so many participants, the city government may decide that all the relevant documents is uploaded and disclosed to all the participants. However, for security reason, most of documents uploaded should be 'read only', 'no transfer to third party', and 'no editing' with text watermarking function for tracing.

A person having ordinary skill in the art to which the present invention pertains may change and modify the present invention in various ways without departing from the technical spirit of the present invention. Accordingly, the present invention is not limited to the above-described embodiments and the accompanying drawings.

What is claimed is:

1. A client device for content security, comprising:
a processor to perform one or more instructions in a memory; and
memory storing the one or more instructions, the processor comprising:
an application execution unit configured to control content in response to a content control command requested by a user in a user level;
a DRM agent configured to communicate with a DRM server and the application execution unit in the user level, to detect the content control command generated by the application execution unit, to receive an encryption/decryption key and security policy for content of an associated user from the DRM server, to provide the received encryption/decryption key and security policy to a client kernel module, and to transmit an encryption/decryption request for the content according to the content control command to the client kernel module; and
the client kernel module configured to receive the encryption/decryption key and the security policy from the DRM agent, to store the received encryption/decryption key and security policy in a secure box of a kernel level, and to perform encryption or decryption on the content based on the encryption/decryption key and security policy stored in the secure box in response to the encryption/decryption request,
wherein the secure box of the kernel level comprises a storage region for preventing an access from an operating system (OS) by indicating that a specific empty region of a disk is used within a file system region,
wherein the DRM agent comprises:
an application control module configured to control the content based on whether the content control command according to the security policy and authority information of the user is suitable while monitoring the content control command, and
wherein the application control module comprises:
a session agent module configured to monitor the content control command, to transfer the content control command to a client interface manager, and to provide an encryption/decryption request related to the content control command to the client kernel module;
a client interface manager configured to manage a user authentication procedure, to manage the encryption/decryption key and security policy based on communication with the DRM server and log data, and to perform the security policy when access rights of a content recipient are confirmed;
an application monitoring module configured to confirm the access rights of the user for the content and to transmit the confirmed information to the session agent module; and
a security component module configured to manage a user request and menu manipulation for access memory for control of the content.

2. The client device of claim 1, wherein the client kernel module is configured to:
attach two encrypted headers comprising access rights and a security policy to encrypted content upon encryption, and
first decrypt the encrypted headers and then decrypt the encrypted content based on header information upon decryption.

3. The client device of claim 1, wherein a user personal key, an enterprise key or a set of group keys is stored in the secure box or extracted from the secure box in response to a request from the DRM agent.

4. The client device of claim 1, wherein the DRM agent further comprises:
a cipher module configured to perform control so that the encryption and decryption of the content is performed in the kernel level;
a tracing module configured to insert security information into the content in order to prevent and trace content leakage;
a DRM interface module configured to comprise a user interface between the user and the DRM agent and a server interface between the DRM agent and the DRM server; and
a DRM core configured to control an operation sequence of the cipher module, application control module, tracing module and DRM interface module, to allow data to be exchanged between the modules, and to confirm access rights of the user for the content based on the security policy and the authority information of the user.

5. The client device of claim 4, wherein:
the user interface traces a content control command according to a user input and provides the traced content control command to the DRM agent, and
the server interface provides user authentication information from the DRM agent to the DRM server and provides the encryption/decryption key and data related to the security policy from the DRM server to the DRM agent.

6. The client device of claim 1, further comprising a service launch module configured to install the application monitoring module on each application program.

7. The client device of claim 6, wherein the session agent initializes the service launch module in order to search for information about a user behavior and installs a command filter on each process.

8. The client device of claim 7, wherein the DRM agent is configured to:
execute operations of the command filter and the application monitoring module in response to an user request other than content distribution or login,
activate the session agent module for decryption of the content, and
adjust an operation of security components.

9. The client device of claim 1, wherein the session agent module is configured to:
drive the application monitoring module in response to an open request for a previously stored content file,
determine suitability of at least one of decryption, display, edit, capture, print, sharing, copy, and delete operations for content of a user in order to confirm access rights of the user for the content file, and
perform a content decryption procedure within the client kernel module using a personal key or an enterprise key.

10. The client device of claim 1, wherein the client interface manager is configured to:
execute a content sharing tool to specify a user group for content sharing in response to a user request related to the content sharing, and
manage access rights of each group for content received through a physical storage medium or the DRM server.

11. The client device of claim 1, wherein the DRM agent is configured to:
request that a plurality of steps for encryption be executed in the kernel level based on the encryption/decryption key extracted from the secure box when a user request related to content storage is permitted by the application monitoring module, and
request that a plurality of steps for decryption be executed in the kernel level based on the encryption/decryption key extracted from the secure box when a user request related to content read or print is permitted by the application monitoring module.

12. The client device of claim 1, wherein the client interface module performs user authentication, a transfer of the encryption/decryption key and the security policy, a management of user log data, and a management of content sharing through communication with the DRM server.

13. The client device of claim 1, wherein the content control command comprises at least one of a sharing command for sharing the content with another user apparatus, a capture command for capturing the content, a copy command for copying the content, a print command for printing the content, a read command for reading the content, and a playback command for playing back the content.

14. An operating method of a client device for content security, comprising:
controlling content in response to a content control command requested by a user in a user level;
detecting the content control command generated by an application execution unit in the user level;
receiving an encryption/decryption key and security policy for content of a user associated with the content control command from a DRM server and providing the received encryption/decryption key and security policy to a client kernel module;
receiving the encryption/decryption key and the security policy from a DRM agent and storing the received encryption/decryption key and security policy in a secure box of a kernel level;
transmitting an encryption/decryption request for the content according to the content control command to a client kernel module; and
performing encryption or decryption on the content based on the encryption/decryption key and security policy stored in the secure box in response to the encryption/decryption request,
wherein the secure box of the kernel level comprises a storage region for preventing an access from an operating system (OS) by indicating that a specific empty region of a disk is used within a file system region,
wherein the controlling the content comprises:
controlling the content based on whether the content control command according to the security policy and authority information of the user is suitable while monitoring the content control command,
wherein controlling the content based on whether the content control command according to the security policy and authority information of the user is suitable while monitoring the content control command comprises:
monitoring the content control command, to transfer the content control command to a client interface manager, and to provide an encryption/decryption request related to the content control command to the client kernel module;
managing a user authentication procedure, to manage the encryption/decryption key and security policy based on communication with the DRM server and log data, and to perform the security policy when access rights of a content recipient are confirmed;
confirming the access rights of the user for the content and to transmit the confirmed information to a session agent module; and
managing a user request and menu manipulation for access memory for control of the content.

15. A DRM server apparatus for content security, comprising:
a processor to perform one or more instructions in a memory; and
memory storing the one or more instructions, the processor comprising:
a server agent configured to perform user authentication based on user authentication information received from a client in a user level; and
a server kernel module configured to extract an encryption/decryption key and security policy for the authenticated user from a secure storage of a kernel level and to encrypt the extracted encryption/decryption key and security policy in the kernel level, wherein the server agent receives encrypted information from the server kernel module and transmits the received information to the client in the user level, wherein the client stores the encryption/decryption key and security policy in a secure box of a kernel level, wherein the secure box of the kernel level of the client comprises a storage region for preventing an access from an operating system (OS) by indicating that a specific empty region of a disk is used within a file system region, wherein the client controls the content based on whether the content control command according to the security policy and authority information of the user is suitable while monitoring the content control command, wherein the client monitors the content control command, and provides an encryption/decryption request related to the content control command to the client kernel module, wherein the client manages a user authentication procedure, to manage the encryption/decryption key and security policy based on communication with the DRM server and log data, and to perform the security policy when access rights of a content recipient are confirmed, wherein the client confirms the access rights of the user for the content, and wherein the client manages a user request and menu manipulation for access memory for control of the content.

16. The DRM server apparatus of claim 15, wherein the server kernel module is configured to:

generate personal keys, a group key, and a security policy for users in the kernel level, store generated information in the secure storage, and transmit the generated information to the client through the server agent of the user level.

17. The DRM server apparatus of claim 15, wherein user log data is stored in a database of the user level.

18. An operating method of a DRM server apparatus for content security, comprising:

performing user authentication based on user authentication information received from a client in a user level; and extracting an encryption/decryption key and security policy for the authenticated user from a secure storage of a kernel level and encrypting the extracted encryption/decryption key and security policy in the kernel level; and transmitting encrypted information received from a server kernel module to the client in the user level, wherein the client stores the encryption/decryption key and security policy in a secure box of a kernel level, wherein the secure box of the kernel level of the client comprises a storage region for preventing an access from an operating system (OS) by indicating that a specific empty region of a disk is used within a file system region, wherein the client controls the content based on whether the content control command according to the security policy and authority information of the user is suitable while monitoring the content control command, wherein the client monitors the content control command, and provides an encryption/decryption request related to the content control command to the client kernel module, wherein the client manages a user authentication procedure, to manage the encryption/decryption key and security policy based on communication with the DRM server and log data, and to perform the security policy when access rights of a content recipient are confirmed, wherein the client confirms the access rights of the user for the content, and wherein the client manages a user request and menu manipulation for access memory for control of the content.

\* \* \* \* \*